US011501492B1

(12) United States Patent
Li et al.

(10) Patent No.: US 11,501,492 B1
(45) Date of Patent: Nov. 15, 2022

(54) AUTOMATED ROOM SHAPE DETERMINATION USING VISUAL DATA OF MULTIPLE CAPTURED IN-ROOM IMAGES

(71) Applicant: Zillow, Inc, Seattle, WA (US)

(72) Inventors: Yuguang Li, Seattle, WA (US); Will Adrian Hutchcroft, Seattle, WA (US); Ivaylo Boyadzhiev, Seattle, WA (US); Christopher Buehler, Seattle, WA (US)

(73) Assignee: Zillow, Inc., Seattle, WA (US)

( * ) Notice: Subject to any disclaimer, the term of this patent is extended or adjusted under 35 U.S.C. 154(b) by 0 days.

(21) Appl. No.: 17/386,281

(22) Filed: Jul. 27, 2021

(51) Int. Cl.
| | | |
|---|---|---|
| *G06T 17/05* | (2011.01) | |
| *G06T 7/55* | (2017.01) | |
| *G06T 7/73* | (2017.01) | |
| *G06N 3/08* | (2006.01) | |
| *H04N 5/232* | (2006.01) | |

(52) U.S. Cl.
CPC ............... *G06T 17/05* (2013.01); *G06N 3/08* (2013.01); *G06T 7/55* (2017.01); *G06T 7/73* (2017.01); *H04N 5/23238* (2013.01)

(58) Field of Classification Search
CPC .. G06T 17/05; G06T 7/55; G06T 7/73; G06N 3/08; H04N 5/23238
See application file for complete search history.

(56) References Cited

U.S. PATENT DOCUMENTS 5,140,352 A    8/1992  Moore et al.
6,031,540 A    2/2000  Golin et al.
(Continued)

FOREIGN PATENT DOCUMENTS

EP    2413097 A2    2/2012
EP    2505961 A2    10/2012
(Continued)

OTHER PUBLICATIONS

CubiCasa | From video to floor plan in under 5 minutes, retrieved on Mar. 26, 2019, from https://www.cubi.casa/, 6 pages.
(Continued)

*Primary Examiner* — Grace Q Li
(74) *Attorney, Agent, or Firm* — VLP Law Group LLP; James A. D. White

(57) ABSTRACT

Techniques are described for automated operations to analyze visual data combined from multiple images captured in a room to determine the room shape, such as by iteratively refining alignment of the multiple images' visual data into a common coordinate system until alignment differences satisfy one or more defined criteria, and for subsequently using the determined room shape information in further automated manners. The images may be panorama images in an equirectangular or other spherical format, and determined room shapes for one or more rooms of a building may be fully closed three-dimensional shapes and used to improve navigation of the building (e.g., as part of a generated building floor plan)—the automated room shape determination may be further performed without having or using information from any distance-measuring devices about distances from an image's acquisition location to walls or other objects in the surrounding room.

28 Claims, 19 Drawing Sheets

(56) References Cited

U.S. PATENT DOCUMENTS

| | | |
|---|---|---|
| 6,141,034 A | 10/2000 | McCutchen |
| 6,317,166 B1 | 11/2001 | McCutchen |
| 6,320,584 B1 | 11/2001 | Golin et al. |
| 6,323,858 B1 | 11/2001 | Gilbert et al. |
| 6,337,683 B1 | 1/2002 | Gilbert et al. |
| 6,654,019 B2 | 11/2003 | Gilbert et al. |
| 6,683,608 B2 | 1/2004 | Golin et al. |
| 6,690,374 B2 | 2/2004 | Park et al. |
| 6,731,305 B1 | 5/2004 | Park et al. |
| 6,738,073 B2 | 5/2004 | Park et al. |
| 7,050,085 B1 | 5/2006 | Park et al. |
| 7,129,971 B2 | 10/2006 | McCutchen |
| 7,196,722 B2 | 3/2007 | White et al. |
| 7,525,567 B2 | 4/2009 | McCutchen |
| 7,620,909 B2 | 11/2009 | Park et al. |
| 7,627,235 B2 | 12/2009 | McCutchen et al. |
| 7,782,319 B2 | 8/2010 | Ghosh et al. |
| 7,791,638 B2 | 9/2010 | McCutchen |
| 7,909,241 B2 | 3/2011 | Stone et al. |
| 7,973,838 B2 | 7/2011 | McCutchen |
| 8,072,455 B2 | 12/2011 | Temesvari et al. |
| 8,094,182 B2 | 1/2012 | Park et al. |
| RE43,786 E | 11/2012 | Cooper |
| 8,463,020 B1 | 6/2013 | Schuckmann et al. |
| 8,517,256 B2 | 8/2013 | Stone et al. |
| 8,520,060 B2 | 8/2013 | Zomet et al. |
| 8,523,066 B2 | 9/2013 | Stone et al. |
| 8,523,067 B2 | 9/2013 | Stone et al. |
| 8,528,816 B2 | 9/2013 | Stone et al. |
| 8,540,153 B2 | 9/2013 | Stone et al. |
| 8,594,428 B2 | 11/2013 | Aharoni et al. |
| 8,654,180 B2 | 2/2014 | Zomet et al. |
| 8,666,815 B1 | 3/2014 | Chau |
| 8,699,005 B2 | 4/2014 | Likholyot |
| 8,705,892 B2 | 4/2014 | Aguilera et al. |
| RE44,924 E | 6/2014 | Cooper et al. |
| 8,854,684 B2 | 10/2014 | Zomet |
| 8,861,840 B2 | 10/2014 | Bell et al. |
| 8,861,841 B2 | 10/2014 | Bell et al. |
| 8,879,828 B2 | 11/2014 | Bell et al. |
| 8,953,871 B2 | 2/2015 | Zomet |
| 8,989,440 B2 | 3/2015 | Klusza et al. |
| 8,996,336 B2 | 3/2015 | Malka et al. |
| 9,021,947 B2 | 5/2015 | Landa |
| 9,026,947 B2 | 5/2015 | Lee et al. |
| 9,035,968 B2 | 5/2015 | Zomet |
| 9,041,796 B2 | 5/2015 | Malka et al. |
| 9,071,714 B2 | 6/2015 | Zomet |
| 9,129,438 B2 | 9/2015 | Aarts et al. |
| 9,151,608 B2 | 10/2015 | Malka et al. |
| 9,165,410 B1 | 10/2015 | Bell et al. |
| 9,171,405 B1 | 10/2015 | Bell et al. |
| 9,324,190 B2 | 4/2016 | Bell et al. |
| 9,361,717 B2 | 6/2016 | Zomet |
| 9,396,586 B2 | 7/2016 | Bell et al. |
| 9,438,759 B2 | 9/2016 | Zomet |
| 9,438,775 B2 | 9/2016 | Powers et al. |
| 9,489,775 B1 | 11/2016 | Bell et al. |
| 9,495,783 B1 | 11/2016 | Samarasekera et al. |
| 9,576,401 B2 | 2/2017 | Zomet |
| 9,619,933 B2 | 4/2017 | Spinella-Marno et al. |
| 9,635,252 B2 | 4/2017 | Accardo et al. |
| 9,641,702 B2 | 5/2017 | Bin-Nun et al. |
| 9,760,994 B1 | 9/2017 | Bell et al. |
| 9,786,097 B2 | 10/2017 | Bell et al. |
| 9,787,904 B2 | 10/2017 | Birkler et al. |
| 9,836,885 B1 | 12/2017 | Eraker et al. |
| 9,852,351 B2 | 12/2017 | Aguilera Perez et al. |
| 9,953,111 B2 | 4/2018 | Bell et al. |
| 9,953,430 B1 | 4/2018 | Zakhor |
| 9,990,760 B2 | 6/2018 | Aguilera Perez et al. |
| 9,990,767 B1 | 6/2018 | Sheffield et al. |
| 10,026,224 B2 | 7/2018 | Bell et al. |
| 10,030,979 B2 | 7/2018 | Bjorke et al. |
| 10,055,876 B2 | 8/2018 | Ford et al. |
| 10,068,344 B2 | 9/2018 | Jovanovic et al. |
| 10,083,522 B2 | 9/2018 | Jovanovic et al. |
| 10,102,639 B2 | 10/2018 | Bell et al. |
| 10,102,673 B2 | 10/2018 | Eraker et al. |
| 10,120,397 B1 | 11/2018 | Zakhor et al. |
| 10,122,997 B1 | 11/2018 | Sheffield et al. |
| 10,127,718 B2 | 11/2018 | Zakhor et al. |
| 10,127,722 B2 | 11/2018 | Shakib et al. |
| 10,139,985 B2 | 11/2018 | Mildrew et al. |
| 10,163,261 B2 | 12/2018 | Bell et al. |
| 10,163,271 B1 | 12/2018 | Powers et al. |
| 10,181,215 B2 | 1/2019 | Sedeffow |
| 10,192,115 B1 | 1/2019 | Sheffield et al. |
| 10,204,185 B2 | 2/2019 | Mrowca et al. |
| 10,210,285 B2 | 2/2019 | Wong et al. |
| 10,235,797 B1 | 3/2019 | Sheffield et al. |
| 10,242,400 B1 | 3/2019 | Eraker et al. |
| 10,339,716 B1 | 7/2019 | Powers et al. |
| 10,366,531 B2 | 7/2019 | Sheffield |
| 10,395,435 B2 | 8/2019 | Powers et al. |
| 11,024,079 B1* | 6/2021 | Chuah ................... G06T 7/246 |
| 2006/0256109 A1 | 11/2006 | Acker et al. |
| 2010/0232709 A1 | 9/2010 | Zhang et al. |
| 2012/0075414 A1 | 3/2012 | Park et al. |
| 2012/0293613 A1 | 11/2012 | Powers et al. |
| 2013/0050407 A1 | 2/2013 | Brinda et al. |
| 2013/0278755 A1* | 10/2013 | Starns ................. G01C 11/025 |
| | | 382/106 |
| 2013/0342533 A1 | 12/2013 | Bell et al. |
| 2014/0043436 A1 | 2/2014 | Bell et al. |
| 2014/0044343 A1 | 2/2014 | Bell et al. |
| 2014/0044344 A1 | 2/2014 | Bell et al. |
| 2014/0125658 A1 | 5/2014 | Bell et al. |
| 2014/0125767 A1 | 5/2014 | Bell et al. |
| 2014/0125768 A1 | 5/2014 | Bell et al. |
| 2014/0125769 A1 | 5/2014 | Bell et al. |
| 2014/0125770 A1 | 5/2014 | Bell et al. |
| 2014/0236482 A1 | 8/2014 | Dorum et al. |
| 2014/0267631 A1 | 9/2014 | Powers et al. |
| 2014/0307100 A1 | 10/2014 | Myllykoski et al. |
| 2014/0320674 A1 | 10/2014 | Kuang |
| 2015/0116691 A1 | 4/2015 | Likholyot |
| 2015/0189165 A1 | 7/2015 | Milosevski et al. |
| 2015/0262421 A1 | 9/2015 | Bell et al. |
| 2015/0269785 A1 | 9/2015 | Bell et al. |
| 2015/0302636 A1 | 10/2015 | Arnoldus et al. |
| 2015/0310596 A1 | 10/2015 | Sheridan et al. |
| 2015/0332464 A1 | 11/2015 | O'Keefe et al. |
| 2016/0055268 A1 | 2/2016 | Bell et al. |
| 2016/0134860 A1 | 5/2016 | Jovanovic et al. |
| 2016/0140676 A1 | 5/2016 | Fritze et al. |
| 2016/0148413 A1* | 5/2016 | Oh ........................ G06T 3/20 |
| | | 345/634 |
| 2016/0217225 A1 | 7/2016 | Bell et al. |
| 2016/0260250 A1 | 9/2016 | Jovanovic et al. |
| 2016/0286119 A1 | 9/2016 | Rondinelli |
| 2016/0300385 A1 | 10/2016 | Bell et al. |
| 2017/0034430 A1 | 2/2017 | Fu et al. |
| 2017/0067739 A1 | 3/2017 | Siercks et al. |
| 2017/0194768 A1 | 7/2017 | Powers et al. |
| 2017/0195654 A1 | 7/2017 | Powers et al. |
| 2017/0263050 A1 | 9/2017 | Ha et al. |
| 2017/0324941 A1 | 11/2017 | Birkler |
| 2017/0330273 A1 | 11/2017 | Holt et al. |
| 2017/0337737 A1 | 11/2017 | Edwards et al. |
| 2018/0007340 A1 | 1/2018 | Stachowski |
| 2018/0025536 A1 | 1/2018 | Bell et al. |
| 2018/0075168 A1 | 3/2018 | Tiwari et al. |
| 2018/0139431 A1 | 5/2018 | Simek et al. |
| 2018/0143023 A1 | 5/2018 | Bjorke et al. |
| 2018/0143756 A1 | 5/2018 | Mildrew et al. |
| 2018/0144487 A1 | 5/2018 | Bell et al. |
| 2018/0144535 A1 | 5/2018 | Ford et al. |
| 2018/0144547 A1 | 5/2018 | Shakib et al. |
| 2018/0144555 A1 | 5/2018 | Ford et al. |
| 2018/0146121 A1 | 5/2018 | Hensler et al. |
| 2018/0146193 A1 | 5/2018 | Safreed et al. |
| 2018/0146212 A1 | 5/2018 | Hensler et al. |
| 2018/0165871 A1 | 6/2018 | Mrowca |

(56) References Cited

U.S. PATENT DOCUMENTS

| | | | |
|---|---|---|---|
| 2018/0203955 A1 | 7/2018 | Bell et al. |
| 2018/0241985 A1 | 8/2018 | O'Keefe et al. |
| 2018/0293793 A1 | 10/2018 | Bell et al. |
| 2018/0300936 A1 | 10/2018 | Ford et al. |
| 2018/0306588 A1 | 10/2018 | Bjorke et al. |
| 2018/0348854 A1 | 12/2018 | Powers et al. |
| 2018/0365496 A1 | 12/2018 | Hovden et al. |
| 2019/0012833 A1 | 1/2019 | Eraker et al. |
| 2019/0026956 A1 | 1/2019 | Gausebeck et al. |
| 2019/0026957 A1 | 1/2019 | Gausebeck |
| 2019/0026958 A1 | 1/2019 | Gausebeck et al. |
| 2019/0035165 A1 | 1/2019 | Gausebeck |
| 2019/0041972 A1 | 2/2019 | Bae |
| 2019/0050137 A1 | 2/2019 | Mildrew et al. |
| 2019/0051050 A1 | 2/2019 | Bell et al. |
| 2019/0051054 A1 | 2/2019 | Jovanovic et al. |
| 2019/0087067 A1 | 3/2019 | Hovden et al. |
| 2019/0122422 A1 | 4/2019 | Sheffield et al. |
| 2019/0164335 A1 | 5/2019 | Sheffield et al. |
| 2019/0180104 A1 | 6/2019 | Sheffield et al. |
| 2019/0251645 A1 | 8/2019 | Winans |
| 2019/0287164 A1 | 9/2019 | Eraker et al. |

FOREIGN PATENT DOCUMENTS

| | | |
|---|---|---|
| EP | 2506170 A2 | 10/2012 |
| KR | 101770648 B1 | 8/2017 |
| KR | 101930796 B1 | 12/2018 |
| WO | 2005091894 A2 | 10/2005 |
| WO | 2016154306 A1 | 9/2016 |
| WO | 2018204279 A1 | 11/2018 |
| WO | 2019083832 A1 | 5/2019 |
| WO | 2019104049 A1 | 5/2019 |
| WO | 2019118599 A2 | 6/2019 |

OTHER PUBLICATIONS

CubiCasa FAQ & Manual, retrieved on Mar. 26, 2019, from https://www.cubi.casa/faq/, 5 pages.
Cupix Home, retrieved on Mar. 26, 2019, from https://www.cupix.com/, 1 page.
Cupix—FAQ, retrieved on Mar. 26, 2019, from https://www.cupix.com/faq.html, 3 pages.
IGUIDE: 3D Virtual Tours, retrieved on Mar. 26, 2019, from https://goiguide.com/, 6 pages.
immoviewer.com | Automated Video Creation & Simple Affordable 3D 360 Tours, retrieved on Mar. 26, 2019, from https://www.immoviewer.com/, 5 pages.
MagicPlan | #1 Floor Plan App, Construction & Surveying Samples, retrieved on Mar. 26, 2019, from https://www.magicplan.app/, 9 pages.
EyeSpy360 Virtual Tours | Virtual Tour with any 360 camera, retrieved on Mar. 27, 2019, from https://www.eyespy360.com/en-us/, 15 pages.
Indoor Reality, retrieved on Mar. 27, 2019, from https://www.indoorreality.com/, 9 pages.
InsideMaps, retrieved on Mar. 27, 2019, from https://www.insidemaps.com/, 7 pages.
IStaging | Augmented & Virtual Reality Platform For Business, retrieved on Mar. 27, 2019, from https://www.istaging.com/en/, 7 pages.
Metareal, retrieved on Mar. 27, 2019, from https://www.metareal.com/, 4 pages.
PLNAR—The AR 3D Measuring / Modeling Platform, retrieved on Mar. 27, 2019, from https://www.plnar.co, 6 pages.
YouVR Global, retrieved on Mar. 27, 2019, from https://global.youvr.io/, 9 pages.
GeoCV, retrieved on Mar. 28, 2019, from https://geocv.com/, 4 pages.
Biersdorfer, J.D., "How To Make A 3-D Model Of Your Home Renovation Vision," in The New York Times, Feb. 13, 2019, retrieved Mar. 28, 2019, 6 pages.
Chen et al. "Rise of the indoor crowd: Reconstruction of building interior view via mobile crowdsourcing." In: Proceedings of the 13th ACM Conference on Embedded Networked Sensor Systems. Nov. 4, 2015, 13 pages.
Immersive 3D for the Real World, retrieved from https://matterport.com/, on Mar. 27, 2017, 5 pages.
Learn About Our Complete 3D System, retrieved from https://matterport.com/how-it-works/, on Mar. 27, 2017, 6 pages.
Surefield FAQ, retrieved from https://surefield.com/faq, on Mar. 27, 2017, 1 page.
Why Surefield, retrieved from https://surefield.com/why-surefield, on Mar. 27, 2017, 7 pages.
Schneider, V., "Create immersive photo experiences with Google Photo Sphere," retrieved from http://geojournalism.org/2015/02/create-immersive-photo-experiences-with-google-photo-sphere/, on Mar. 27, 2017, 7 pages.
Tango (platform), Wikipedia, retrieved from https://en.wikipedia.org/wiki/Tango_(platform), on Jun. 12, 2018, 5 pages.
Zou et al. "LayoutNet: Reconstructing the 3D Room Layout from a Single RGB Image" in arXiv:1803.08999, submitted Mar. 23, 2018, 9 pages.
Lee et al. "RoomNet: End-to-End Room Layout Estimation" in arXiv:1703.00241v2, submitted Aug. 7, 2017, 10 pages.
Time-of-flight camera, Wikipedia, retrieved from https://en.wikipedia.org/wiki/Time-of-flight_camera, on Aug. 30, 2018, 8 pages.
Magicplan—Android Apps on Go . . . , retrieved from https://play.google.com/store/apps/details?id=com.sensopia.magicplan, on Feb. 21, 2018, 5 pages.
Pintore et al., "AtlantaNet: Inferring the 3D Indoor Layout from a Single 360 Image beyond the Manhattan World Assumption", ECCV 2020, 16 pages.
Cowles, Jeremy, "Differentiable Rendering", Aug. 19, 2018, accessed Dec. 7, 2020 at https://towardsdatascience.com/differentiable-rendering-d00a4b0f14be, 3 pages.
Yang et al., "DuLa-Net: A Dual-Projection Network for Estimating Room Layouts from a Single RGB Panorama", in arXiv:1811.11977[cs.v2], submitted Apr. 2, 2019, 14 pages.
Sun et al., "HoHoNet: 360 Indoor Holistic Understanding with Latent Horizontal Features", in arXiv:2011.11498[cs.v2], submitted Nov. 24, 2020, 15 pages.
Nguyen-Phuoc et al., "RenderNet: A deep convolutional network for differentiable rendering from 3D shapes", in arXiv:1806.06575[cs.v3], submitted Apr. 1, 2019, 17 pages.
Convolutional neural network, Wikipedia, retrieved from https://en.wikipedia.org/wiki/Convolutional_neural_network, on Dec. 7, 2020, 25 pages.

* cited by examiner

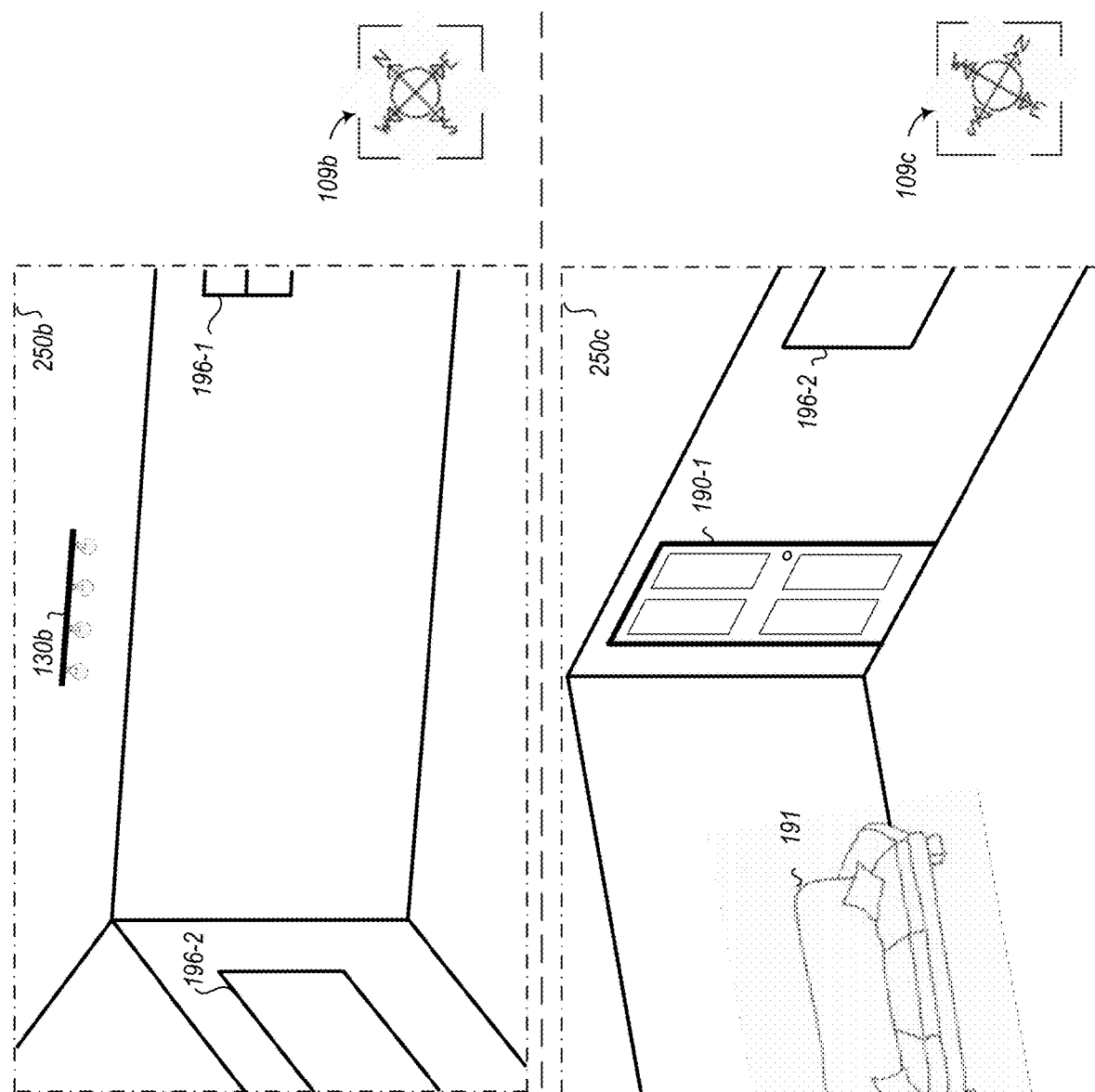

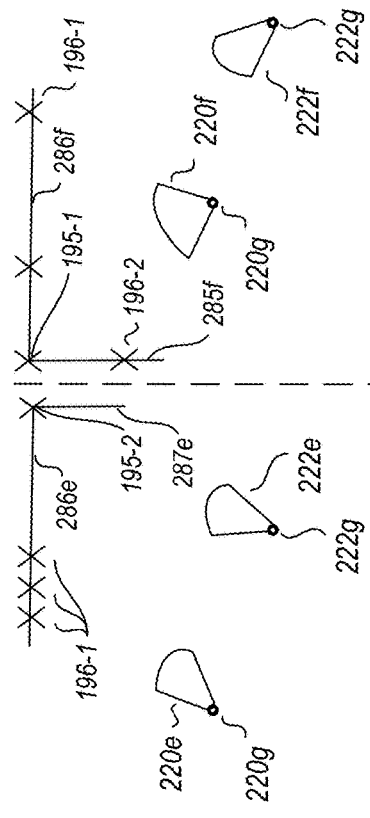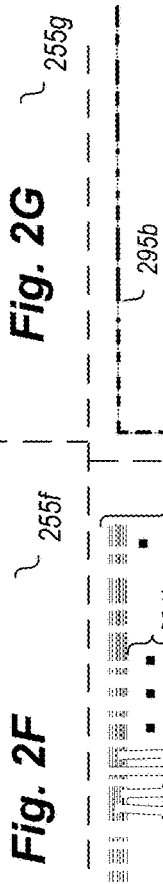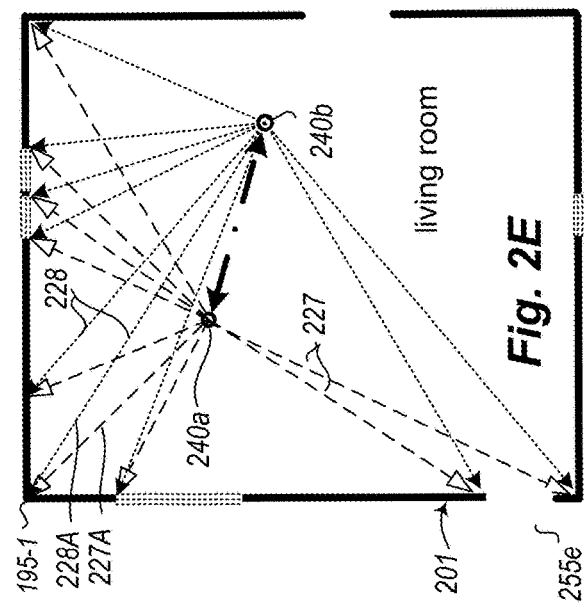

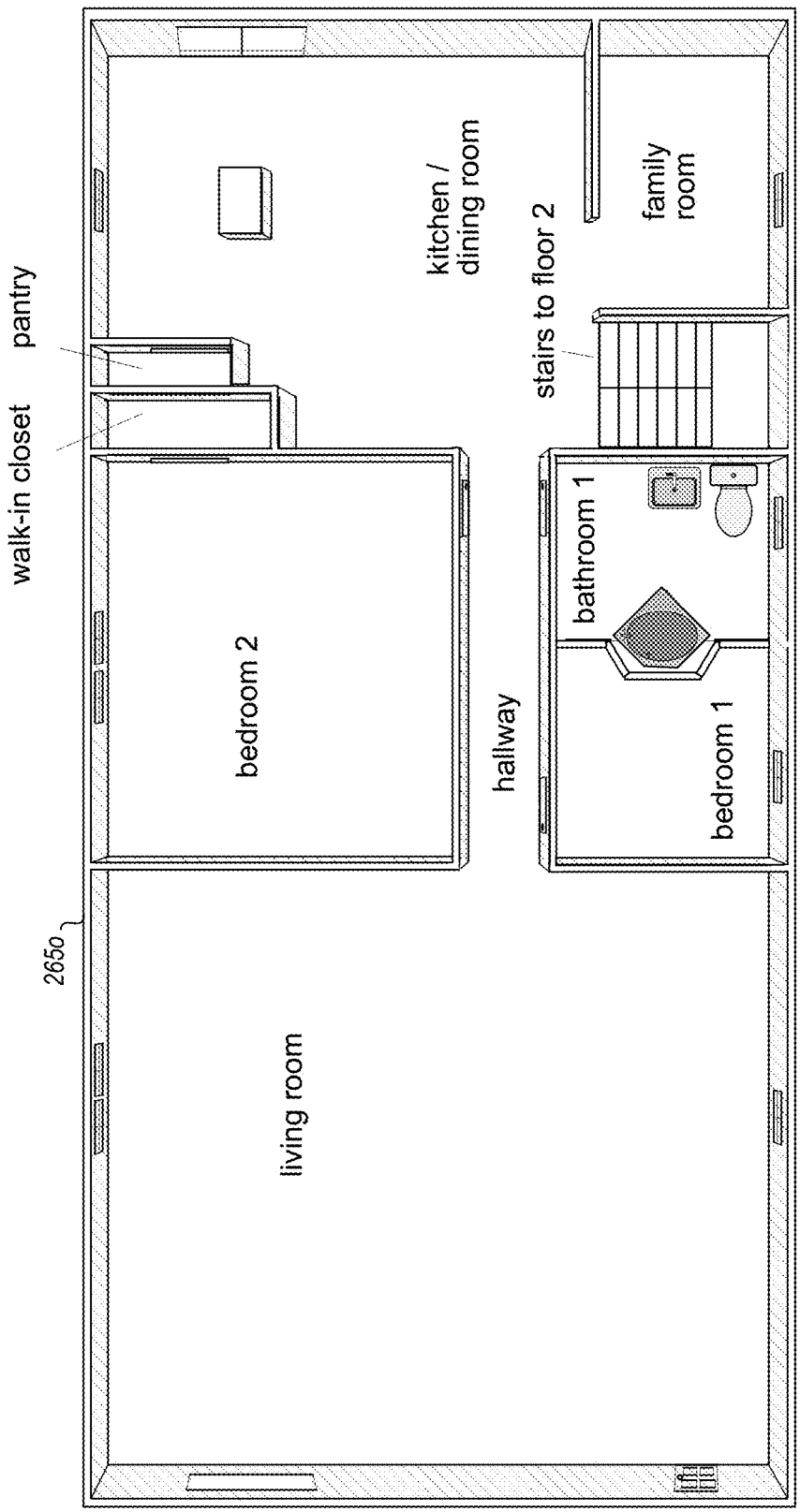
Fig. 2-O

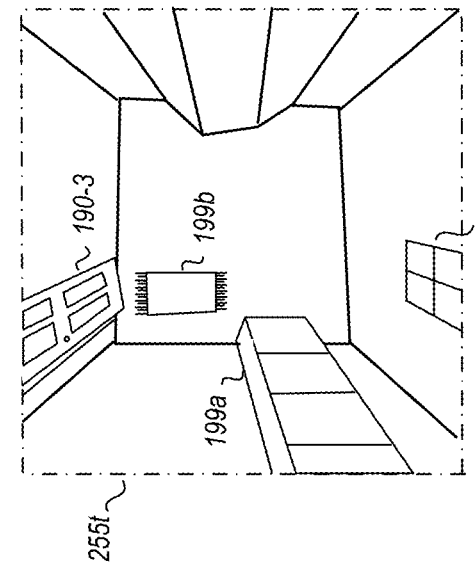
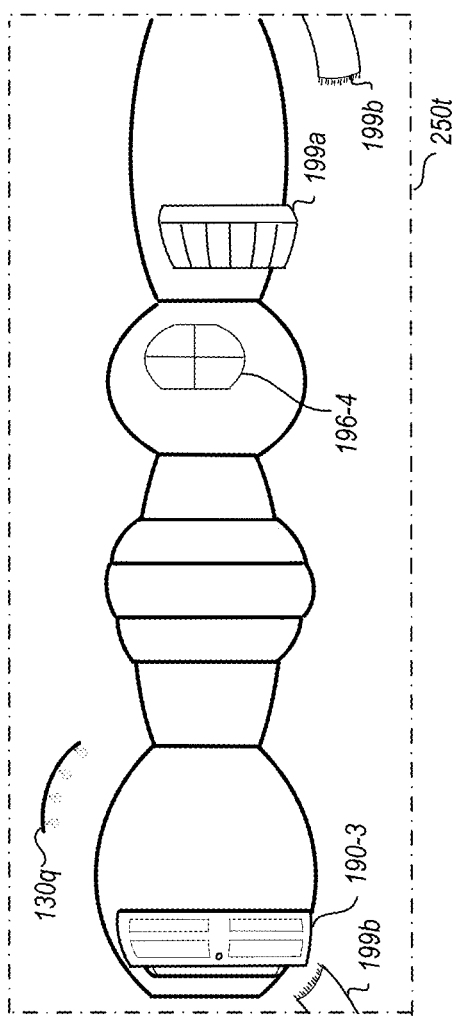
Fig. 2T
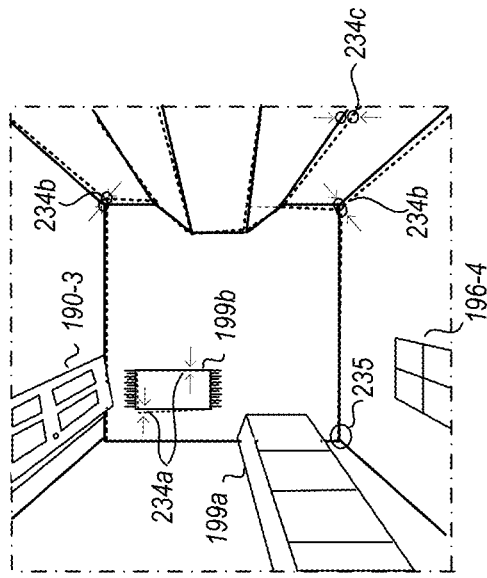
Fig. 2V
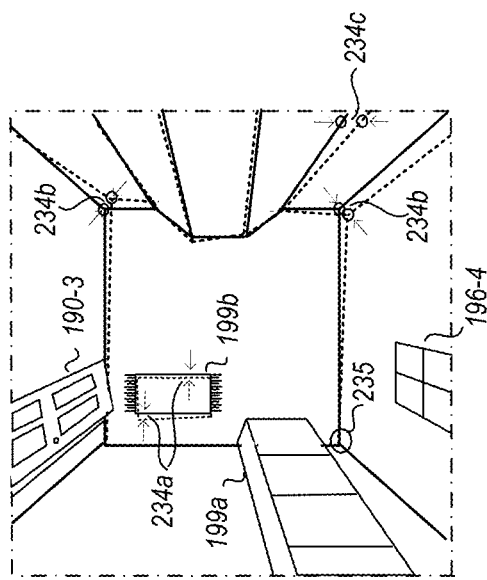
Fig. 2U

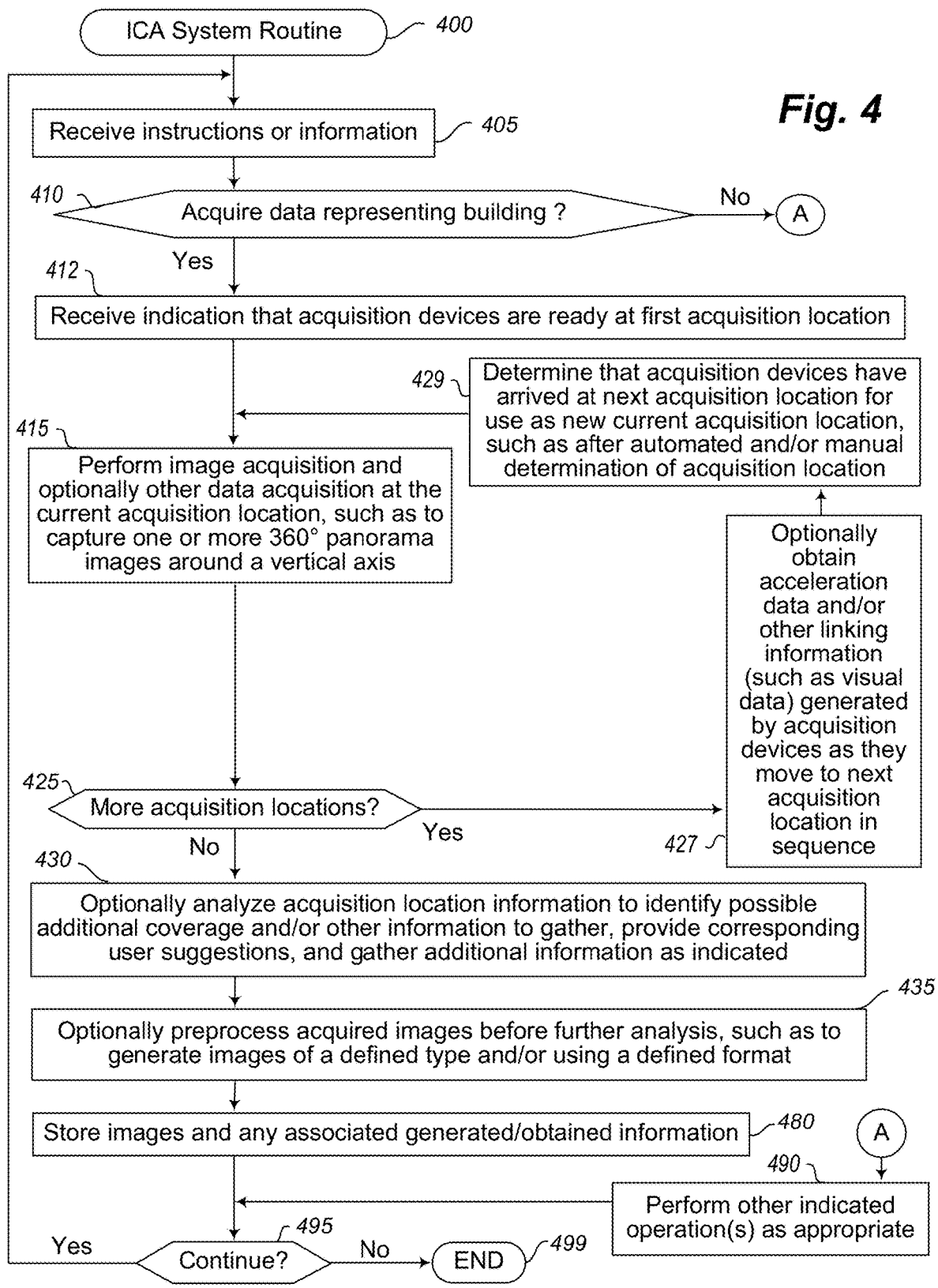

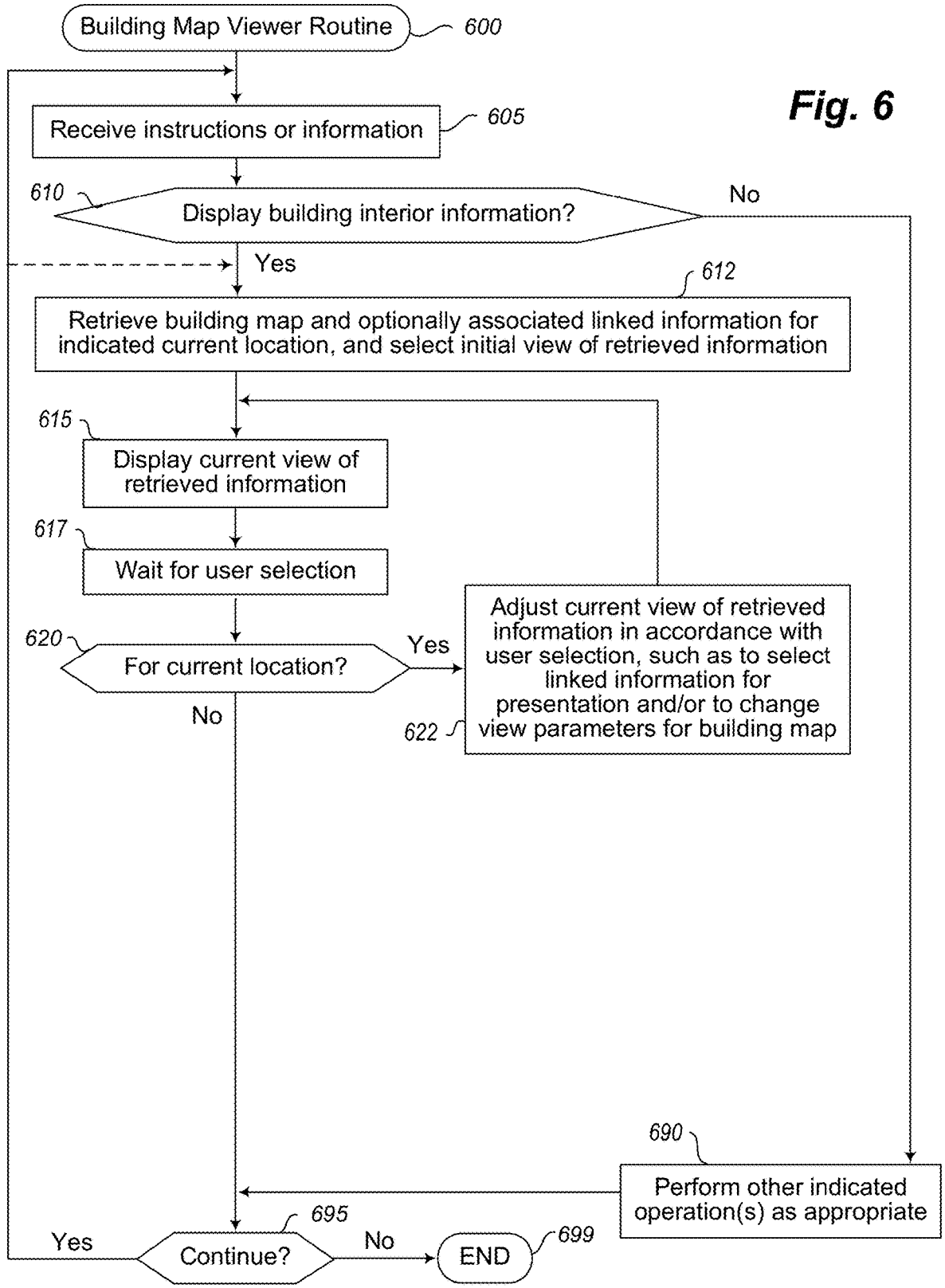

US 11,501,492 B1

AUTOMATED ROOM SHAPE DETERMINATION USING VISUAL DATA OF MULTIPLE CAPTURED IN-ROOM IMAGES

TECHNICAL FIELD

The following disclosure relates generally to techniques for automatically analyzing visual data combined from multiple images captured in a room of a building to determine a shape of the room, and for subsequently using the determined room shape information in one or more manners, such as to iteratively refine the alignment of the visual data of the multiple images until a three-dimensional room shape of fully closed planar surfaces is generated from the aligned combined visual data of the multiple images, and to use the determined room shape to improve navigation of the building.

BACKGROUND

In various fields and circumstances, such as architectural analysis, property inspection, real estate acquisition and development, remodeling and improvement services, general contracting and other circumstances, it may be desirable to view information about the interior of a house, office, or other building without having to physically travel to and enter the building, including to determine actual as-built information about the building rather than design information from before the building is constructed. However, it can be difficult to effectively capture, represent and use such building interior information, including to display visual information captured within building interiors to users at remote locations (e.g., to enable a user to fully understand the layout and other details of the interior, including to control the display in a user-selected manner). In addition, while a floor plan of a building may provide some information about layout and other details of a building interior, such use of floor plans has some drawbacks in certain situations, including that floor plans can be difficult to construct and maintain, to accurately scale and populate with information about room interiors, to visualize and otherwise use, etc.

BRIEF DESCRIPTION OF THE DRAWINGS

FIG. 4 illustrates an example flow diagram for an Image Capture and Analysis (ICA) system routine in accordance with an embodiment of the present disclosure.

FIG. 6 illustrates an example flow diagram for a Building Map Viewer system routine in accordance with an embodiment of the present disclosure.

DETAILED DESCRIPTION

Figure 1A:
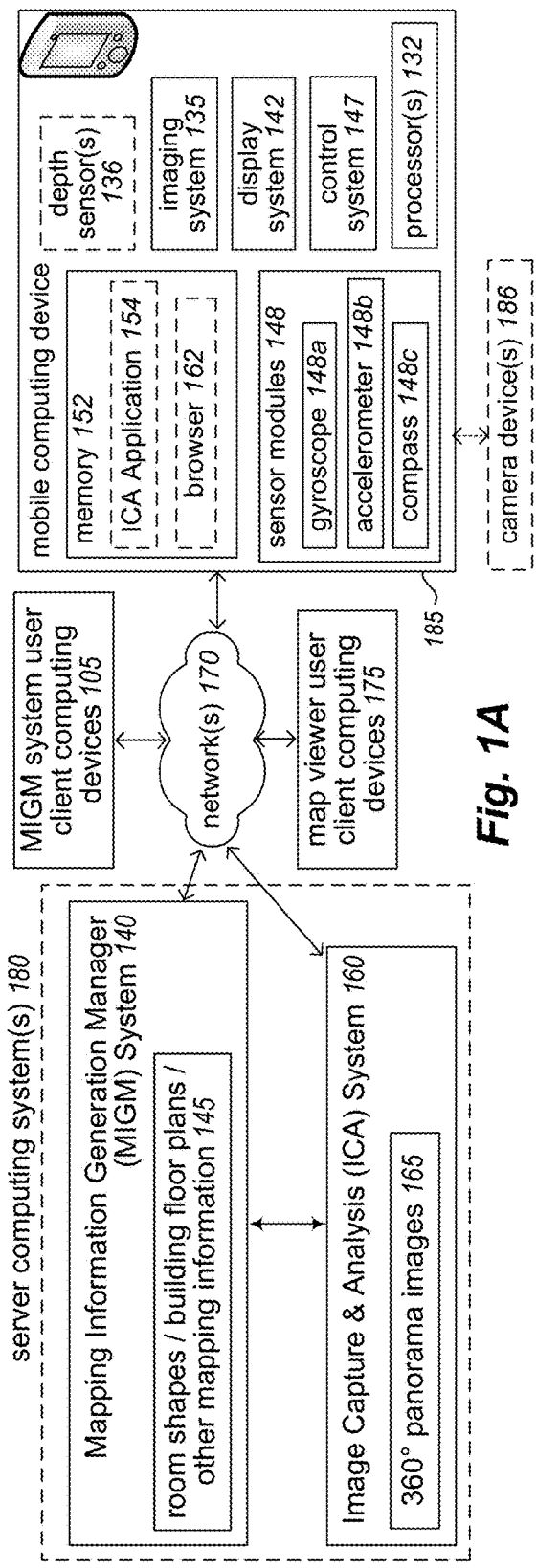
FIGS. 1A-1B are diagrams depicting an exemplary building environment and computing system(s) for use in embodiments of the present disclosure, such as for performing automated operations to determine a shape of a room by iteratively combining visual data from multiple images captured in the room and to subsequently use the determined room shape information in one or more manners.

The present disclosure describes techniques for using computing devices to perform automated operations related to analyzing visual data combined from multiple images captured in a room of a building to determine a shape of the room, and for subsequently using the determined room shape information in one or more further automated manners. The images may, for example, include panorama images (e.g., in an equirectangular or other spherical format) and/or other types of images (e.g., in a rectilinear perspective format) that are acquired at acquisition locations in or around a multi-room building (e.g., a house, office, etc.), referred to generally herein as 'target images'— in addition, in at least some such embodiments, the automated room shape determination is further performed without having or using information from any depth sensors or other distance-measuring devices about distances from a target image's acquisition location to walls or other objects in the surrounding building. The determined room shape information for one or more rooms of a building may be further used in various manners in various embodiments, such as in conjunction with generating a corresponding building floor plan and/or other generated mapping-related information for the building, including for controlling navigation of mobile devices (e.g., autonomous vehicles), for display or other presentation over one or more computer networks on one or more client devices in corresponding GUIs (graphical user interfaces), etc. Additional details are included below regarding the automated determination and use of room shape information, and some or all of the techniques described herein may be performed via automated operations of a Mapping Information Generation Manager ("MIGM") system in at least some embodiments, as discussed further below.

As noted above, automated operations of an MIGM system may include determining a shape of a room based on analyzing visual data combined from multiple target images captured in the room, such as multiple panorama images captured at multiple acquisition locations in the room—in at least some embodiments, the multiple panorama images each includes 360° of horizontal visual coverage around a vertical axis and visual coverage of some or all of the floor and/or ceiling in the room (e.g., 180° or more of vertical visual coverage), and each has an equirectangular format or other spherical format (e.g., represented in a spherical coordinate system, with vertical lines in a surrounding environment being straight in the image and with horizontal lines in the surrounding environment being increasingly curved in the image in a convex manner away from horizontal the farther they are away from the vertical midpoint of the image). In at least some embodiments, the automated operations of the MIGM system include performing an iterative operation to refine the alignment of the visual data of the multiple target images in a room into a common coordinate system, such as until the differences in the visual data alignment is below a defined threshold or otherwise satisfies one or more defined criteria, and then using the aligned combined visual data of the multiple target images to generate a three-dimensional ("3D") room shape of the room—such a 3D room shape may use planar surfaces that represent the walls and floor and ceiling of the room are that are fully connected to form a closed 3D geometrical shape, and in at least some embodiments further include indications of the locations and shapes of windows and/or doorways and/or other wall openings.

As part of the automated iterative operations of the MIGM system to refine the alignment of the visual data of multiple target panorama images captured in a room into a common coordinate system, the MIGM system may use initial pose information for the capturing of a target panorama image by a camera device or other image acquisition device to generate one or more projected perspective images in rectilinear format that each includes a subset of the visual data of the target panorama image, such as a perspective image in rectilinear format that includes visual data of some or all of the floor and parts of the walls connected to the floor (referred to at times herein as a "floor view image" or "floor image"), and/or a perspective image in rectilinear format that includes visual data of some or all of the ceiling and parts of the walls connected to the ceiling (referred to at times herein as a "ceiling view image" or "ceiling image"). Such pose information for the target panorama image may include the acquisition location of the target panorama image within the room (such as in three dimensions or degrees of freedom, and sometimes represented in a three-dimensional grid as an X, Y, Z tuple) and the orientation of the target panorama image (such as in three additional dimensions or degrees of freedom, and sometimes represented as a three-dimensional rotational tuple or other directional vector), and is also referred to at times herein as an 'acquisition pose' or an 'acquisition position' or merely 'position' of the target panorama image. The image acquisition device that captures the target panorama images may in some embodiments be a mobile computing device that includes one or more cameras or other imaging systems (optionally including one or more fisheye lenses), and optionally includes additional hardware sensors to capture non-visual data, such as one or more inertial measurement unit (or "IMU") sensors that capture data reflecting the motion of the device, while in other embodiments may be a camera device that lacks computing capabilities and is optionally associated with a nearby mobile computing device.

After generating one or more projected perspective images from a target panorama image, the automated operations of the MIGM system further include analyzing the visual contents of each target panorama image and its projected perspective image(s) to identify elements (e.g., two-dimensional, or 2D, elements) that are visible in the visual contents, such as to identify structural elements of walls and the floor and the ceiling of the surrounding room (e.g., windows and/or sky-lights; passages into and/or out of the room, such as doorways and other openings in walls, stairways, hallways, etc.; borders between adjacent walls; borders between walls and a floor; borders between walls and a ceiling; borders between a floor and a ceiling; corners (or solid geometry vertices) where at least three surfaces or planes meet; etc.), and to optionally identify other fixed structural elements (e.g., countertops, bath tubs, sinks, islands, fireplaces, etc.), as well as to optionally generate 3D bounding boxes for the identified elements or otherwise track locations of the identified elements. The automated analysis of the visual data for each target panorama image and its projected perspective image(s) may further include generating an estimated partial room shape for the room from the visual data and optionally from additional data captured during or near the acquisition of that panorama image (e.g., IMU motion data of the image acquisition device and/or accompanying mobile computing device), and determining the locations of the identified elements within that estimated partial room shape. In at least some such embodiments, the partial room shape that is estimated from a target panorama image and its projected perspective image(s) may be a 3D point cloud (with a plurality of 3D data points corresponding to locations on the walls and optionally the floor and/or ceiling) and/or disconnected partial planar surfaces (corresponding to portions of the walls and optionally the floor and/or ceiling) and/or wireframe structural lines (e.g., to show one or more of borders between walls, borders between walls and ceiling, borders between walls and floor, outlines of doorways and/or other inter-room wall openings, outlines of windows, etc.), such as based at least in part on performing a SLAM (Simultaneous Localization And Mapping) and/or SfM (Structure from Motion) and/or MVS (multiple-view stereovision) analysis (e.g., by using motion data from IMU sensors of the image acquisition device and/or an associated nearby mobile computing device in the same room, in combination with visual data from one or more image sensors of the image acquisition device) and/or ICP (Iterative Closest Point) analysis. In at least some embodiments, additional manipulation of the generated projected perspective images may be performed before their further automated analysis, such as to scale and rotate corresponding areas in corresponding images (e.g., layouts of the floor and ceiling), with additional details regarding the generation of projected perspective images included below.

After generating the information for each target panorama image from an analysis of its visual data (including from the visual data of the target panorama image that is included in its one or more projected perspective images), the automated operations of the MIGM system further include analyzing the differences between the generated information for each target panorama image in the room, and determining whether the differences are sufficiently small (e.g., are below a defined threshold, or otherwise satisfy one or more defined criteria). If the differences are not sufficiently small, the automated operations further include adjusting the pose information for at least some of the target panorama images based on that difference information (so as to reduce or remove the differences), and performing a next iterative analysis by projecting one or more new perspective images for each of those target panorama images, and by identifying elements and their locations in the new perspective images for those target panorama images and optionally determining a new estimated partial room shape based in part on the visual data in those new perspective images, and by determining difference information based in part on that identified information for those new perspective images, with that iterative process continuing until the determined differences are sufficiently small.

In at least some embodiments, the adjustment of the pose information is performed for all target panorama images acquired in a room except for one target panorama image that is selected as a first or reference target image, and with the adjusted pose information for those other second target panorama images being determined relative to the initial pose information for that first/reference target image. The difference analysis may be performed by, for example, use of one or more trained convolutional neural networks, such as neural networks trained to identify differences in determined locations for different target panorama images of identified elements and/or differences in a layout of the floor and/or ceiling in the projected perspective images from different target panorama images. If the differences are identified in determined locations of identified elements between the first/reference panorama image and another second target panorama image, such as based at least in part on offsets of positions for corresponding parts of the identified features themselves and/or of determined bounding boxes for the identified features, the output of the one or more trained convolutional neural networks may include changes in location and orientation (e.g., rotation) for some or all identified elements from the visual data of those two target panorama images, which may be aggregated and then used to adjust the current pose information (in the first iteration, the initial pose information) for that other second target panorama image. If the differences are identified in the layouts of the floor and/or ceiling from the visual data of the first/reference panorama image (e.g., based at least in part on the one or more projected perspective images for that first panorama image) and the visual data of another second target panorama image (e.g., based at least in part on the one or more current projected perspective images for that second panorama image from a most recent iterative analysis), such as based at least in part on offsets of positions for corresponding parts of the layouts of the floor and/or ceiling, the output of the one or more trained convolutional neural networks may include changes in the layout of the floor and/or ceiling in the visual data of the second target panorama image to match the layout of the floor and/or ceiling in the visual data of the first/reference target panorama image, with new pose information determined for the second target panorama image that would produce the changed layout (e.g., by performing a differentiable rendering analysis and using back propagation to directly adjust the current pose information for that other second target panorama image, which in the first iteration is the initial pose information for that second target panorama image).

If the difference analysis indicates that the current pose information after one or more iterations for the one or more second target panorama images produces differences that are sufficiently small, the automated operations of the MIGM system further include using the information from the analysis of the visual data of the target panorama images in the room to determine a final room shape for the room. In particular, these further automated operations of the MIGM system may include using the information from an analysis of the visual data of the first/reference target panorama image (including from the visual data of the first/reference target panorama image that is included in its one or more projected perspective images, such as the identified elements and their determined locations and optionally the determined estimated partial room shape of the room), and from an analysis of the most recent iteration of the visual data of each second target panorama image (including from the visual data of the second target panorama image that is included in its one or more most recent projected perspective images for the most recent iteration, such as the identified elements and their determined locations and optionally the determined estimated partial room shape of the room), such as to supply that information from the analysis of the visual data of the multiple target panorama images to one or more trained convolutional neural networks for further analysis. The output of the one or more trained convolutional neural networks includes, in at least some embodiments, a fully closed 3D room shape that includes fully connected planar surfaces for each of the walls and at least one of the floor and ceiling (e.g., both the floor and the ceiling if both floor and ceiling perspective images are projected for at least some of the target panorama images).

Additional details are included below regarding automated operations of the MIGM system for determining the room shape of a room based on an analysis of combined visual data from multiple target panorama images captured in that room.

In addition, in some embodiments, the automated operations of the MIGM system include obtaining input information of one or more types from one or more users (e.g., system operator users of the MIGM system that assist in its operations, end users that obtain results of information from the MIGM system, etc.), and using that input information to facilitate some operations of the MIGM system. As non-exclusive examples, user-supplied input may include one or more of the following: input to specify initial pose information for a target panorama image for a first iteration or to refine an initial automated determination of pose information for a target panorama image for a first iteration; input to specify adjusted pose information for a target panorama image for a later iteration or to refine an initial automated determination of pose information for a target panorama image for a later iteration; input to specify elements in visual data of a target panorama image (including in one or more projected perspective images from that target panorama image) or to refine an initial automated identification of such elements in visual data of a target panorama image; input to specify locations of elements in visual data of a target panorama image (including in one or more projected perspective images from that target panorama image) or to refine an initial automated determination of such element locations in visual data of a target panorama image; input to specify an estimated partial room shape from the visual data of a target panorama image (including in one or more projected perspective images from that target panorama image) or to refine an initial automated generation of such an estimated partial room shape from the visual data of a target panorama image; input to specify a final room shape by merging or otherwise combining estimated partial room shapes based on visual data from multiple target panorama images (including in projected perspective images from those target panorama images) or to refine an initial automated generation of such a final room shape from such merging or other combining; input to specify a final room shape based on a combination of visual data from multiple target panorama images (including in projected perspective images from those target panorama images) or to refine an initial automated generation of such a final room shape based on a combination of visual data from multiple target panorama images; etc. In addition, in some embodiments and situations, user-provided input may be incorporated into subsequent automated analyses in various manners, including to replace or supplement automatically generated information of the same type, to be used as constraints and/or prior probabilities during later automated analysis (e.g., by a trained neural network), etc.

Furthermore, in some embodiments, the automated operations of the MIGM system further include obtaining and using additional types of information during its analysis activities. Non-exclusive examples of such additional types of information uses include the following: obtaining and using names or other tags for particular rooms, such as to group images acquired in the same room; obtaining information to use as initial pose information for a target panorama image during a first iteration, such as from automated analyses that may include SLAM and/or SfM and/or MVS;

obtaining and using other image acquisition metadata to group images or to otherwise assist in image analysis, such as to use image acquisition time information and/or order information to identify consecutive images that may be captured in the same room; etc. Additional details are included below regarding other automated operations of the MIGM system in some embodiments and situations.

The described techniques provide various benefits in various embodiments, including to allow partial or complete floor plans of multi-room buildings and other structures to be automatically generated from target image(s) acquired for the building or other structure, including to provide more complete and accurate room shape information and in greater varieties of environmental conditions (e.g., in situations in which objects in a room occlude a single image's view of at least some of the walls and/or floor and/or ceiling but in which the combination of the views from multiple images eliminates or reduces that problem, in situations in which at least some wall and/or ceiling and/or floor surfaces are largely constant in color and texture and lack extensive visible 3D features, etc.), and including in some embodiments without having or using information from depth sensors or other distance-measuring devices about distances from images' acquisition locations to walls or other objects in a surrounding building or other structure. Non-exclusive examples of additional such benefits of the described techniques include the following: the ability to analyze the visual data of a target image to detect objects of interest in the enclosing room (e.g., structural wall elements, such as windows, doorways and other wall openings, etc.) and to determine locations of those detected objects in a determined room shape for the enclosing room; the ability to analyze additional captured data (e.g., movement data from one or more IMU sensors, visual data from one or more image sensors, etc.) to determine a travel path of an image acquisition device in multiple rooms, to identify wall openings (e.g., doorways, staircases, etc.) of the multiple rooms based at least in part on that additional data (and optionally on visual data of one or more target images acquired in the one or more rooms), and to optionally further use such information about identified wall openings to position together determined 3D room shapes of the multiple rooms; the ability to inter-connect multiple target images and display at least one of the target images with user-selectable visual indicators in the directions of other linked target images that when selected cause the display of a respective other one of the linked target images, such as by placing the various target images in a common coordinate system that shows their relative locations, or to otherwise determine at least directions between pairs of target images (e.g., based at least in part on an automated analysis of the visual contents of the target images in the pair, and optionally based on further movement data from the mobile computing device along a travel path between the target images), and to link the various target images using the determined inter-image directions; etc. Furthermore, the described automated techniques allow such room shape information to be determined more quickly than previously existing techniques, and in at least some embodiments with greater accuracy, including by using information acquired from the actual building environment (rather than from plans on how the building should theoretically be constructed), as well as enabling the capture of changes to structural elements that occur after a building is initially constructed. Such described techniques further provide benefits in allowing improved automated navigation of a building by mobile devices (e.g., semi-autonomous or fully-autonomous vehicles), based at least in part on the determined acquisition locations of images, including to significantly reduce computing power and time used to attempt to otherwise learn a building's layout. In addition, in some embodiments, the described techniques may be used to provide an improved GUI in which a user may more accurately and quickly obtain information about a building's interior (e.g., for use in navigating that interior) and/or other associated areas, including in response to search requests, as part of providing personalized information to the user, as part of providing value estimates and/or other information about a building to a user, etc. Various other benefits are also provided by the described techniques, some of which are further described elsewhere herein.

As noted above, in at least some embodiments and situations, some or all of the images acquired for a building may be panorama images that are each acquired at one of multiple acquisition locations in or around the building, such as to generate a panorama image at each such acquisition location from one or more of a video captured at that acquisition location (e.g., a 360° video taken from a smartphone or other mobile device held by a user turning at that acquisition location), or multiple images captured in multiple directions from the acquisition location (e.g., from a smartphone or other mobile device held by a user turning at that acquisition location; from automated rotation of a device at that acquisition location, such as on a tripod at that acquisition location; etc.), or a simultaneous capture of all the image information for a particular acquisition location (e.g., using one or more fisheye lenses), etc. It will be appreciated that such a panorama image may in some situations be represented in a spherical coordinate system and provide up to 360° coverage around horizontal and/or vertical axes (e.g., 360° of coverage along a horizontal plane and around a vertical axis), while in other embodiments the acquired panorama images or other images may include less than 360° of vertical coverage (e.g., for images with a width exceeding a height by more than a typical aspect ratio, such as at or exceeding 21:9 or 16:9 or 3:2 or 7:5 or 4:3 or 5:4 or 1:1, including for so-called 'ultrawide' lenses and resulting ultrawide images). In addition, it will be appreciated that a user viewing such a panorama image (or other image with sufficient horizontal and/or vertical coverage that only a portion of the image is displayed at any given time) may be permitted to move the viewing direction within the panorama image to different orientations to cause different subset images (or "views") to be rendered within the panorama image, and that such a panorama image may in some situations be represented in a spherical coordinate system (including, if the panorama image is represented in a spherical coordinate system and a particular view is being rendered, to convert the image being rendered into a planar coordinate system, such as for a perspective image view before it is displayed). Furthermore, acquisition metadata regarding the capture of such panorama images may be obtained and used in various manners, such as data acquired from IMU sensors or other sensors of a mobile device as it is carried by a user or otherwise moved between acquisition locations—non-exclusive examples of such acquisition metadata may include one or more of acquisition time; acquisition location, such as GPS coordinates or other indication of location; acquisition direction and/or orientation; relative or absolute order of acquisition for multiple images acquired for a building or that are otherwise associated; etc., and such acquisition metadata may further optionally be used as part of determining the images' acquisition locations in at least some embodiments and situations, as discussed further below. Additional details are included below regarding automated operations of device(s) implementing an Image Capture and Analysis (ICA) system involved in acquiring images and optionally acquisition metadata, including with respect to FIGS. 1A-1B and 2A-2D and elsewhere herein.

As is also noted above, a building floor plan having associated room shape information for some or all rooms of the building may be generated in at least some embodiments, and further used in one or more manners, such as in the subsequent automated determination of an image's acquisition location within the building. A building floor plan with associated room shape information may have various forms in various embodiments, such as a 2D (two-dimensional) floor map of the building (e.g., an orthographic top view or other overhead view of a schematic floor map that does not include or display height information) and/or a 3D (three-dimensional) or 2.5D (two and a half-dimensional) floor map model of the building that does display height information. In addition, shapes of rooms of a building may be automatically determined in various manners in various embodiments, including in some embodiments at a time before automated determination of a particular image's acquisition location within the building. For example, in at least some embodiments, a Mapping Information Generation Manager (MIGM) system may analyze various images acquired in and around a building in order to automatically determine room shapes of the building's rooms (e.g., 3D room shapes, 2D room shapes, etc., such as to reflect the geometry of the surrounding structural elements of the building)—the analysis may include, for example, automated operations to 'register' the camera positions for the images in a common frame of reference so as to 'align' the images and to estimate 3D locations and shapes of objects in the room, such as by determining features visible in the content of such images (e.g., to determine the direction and/or orientation of the acquisition device when it took particular images, a path through the room traveled by the acquisition device, etc., such as by using SLAM techniques for multiple video frame images and/or other SfM techniques for a 'dense' set of images that are separated by at most a defined distance (such as 6 feet) to generate a 3D point cloud for the room including 3D points along walls of the room and at least some of the ceiling and floor of the room and optionally with 3D points corresponding to other objects in the room, etc.) and/or by determining and aggregating information about planes for detected features and normal (orthogonal) directions to those planes to identify planar surfaces for likely locations of walls and other surfaces of the room and to connect the various likely wall locations (e.g., using one or more constraints, such as having 90° angles between walls and/or between walls and the floor, as part of the so-called 'Manhattan world assumption') and form an estimated partial room shape for the room. After determining the estimated partial room shapes of the rooms in the building, the automated operations may, in at least some embodiments, further include positioning the multiple room shapes together to form a floor plan and/or other related mapping information for the building, such as by connecting the various room shapes, optionally based at least in part on information about doorways and staircases and other inter-room wall openings identified in particular rooms, and optionally based at least in part on determined travel path information of a mobile computing device between rooms. Additional details are included below regarding automated operations of device(s) implementing an MIGM system involved in determining room shapes and combining room shapes to generate a floor plan, including with respect to FIGS. 1A-1B and 2E-2V and elsewhere herein.

For illustrative purposes, some embodiments are described below in which specific types of information are acquired, used and/or presented in specific ways for specific types of structures and by using specific types of devices—however, it will be understood that the described techniques may be used in other manners in other embodiments, and that the invention is thus not limited to the exemplary details provided. As one non-exclusive example, while floor plans may be generated for houses that do not include detailed measurements for particular rooms or for the overall houses, it will be appreciated that other types of floor plans or other mapping information may be similarly generated in other embodiments, including for buildings (or other structures or layouts) separate from houses, and including to determine detailed measurements for particular rooms or for the overall buildings (or other structures or layouts). As another non-exclusive example, while floor plans for houses or other buildings may be used for display to assist viewers in navigating the buildings, generated mapping information may be used in other manners in other embodiments. As yet another non-exclusive example, while some embodiments discuss obtaining and using data from one or more types of image acquisition devices (e.g., a mobile computing device and/or a separate camera device), in other embodiments the one or more devices used may have other forms, such as to use a mobile device that acquires some or all of the additional data but does not provide its own computing capabilities (e.g., an additional 'non-computing' mobile device), multiple separate mobile devices that each acquire some of the additional data (whether mobile computing devices and/or non-computing mobile devices), etc. In addition, the term "building" refers herein to any partially or fully enclosed structure, typically but not necessarily encompassing one or more rooms that visually or otherwise divide the interior space of the structure—non-limiting examples of such buildings include houses, apartment buildings or individual apartments therein, condominiums, office buildings, commercial buildings or other wholesale and retail structures (e.g., shopping malls, department stores, warehouses, etc.), etc. The term "acquire" or "capture" as used herein with reference to a building interior, acquisition location, or other location (unless context clearly indicates otherwise) may refer to any recording, storage, or logging of media, sensor data, and/or other information related to spatial and/or visual characteristics and/or otherwise perceivable characteristics of the building interior or other location or subsets thereof, such as by a recording device or by another device that receives information from the recording device. As used herein, the term "panorama image" may refer to a visual representation that is based on, includes or is separable into multiple discrete component images originating from a substantially similar physical location in different directions and that depicts a larger field of view than any of the discrete component images depict individually, including images with a sufficiently wide-angle view from a physical location to include angles beyond that perceivable from a person's gaze in a single direction (e.g., greater than 120° or 150° or 180°, etc.). The term "sequence" of acquisition locations, as used herein, refers generally to two or more acquisition locations that are each visited at least once in a corresponding order, whether or not other non-acquisition locations are visited between them, and whether or not the visits to the acquisition locations occur during a single continuous period of time or at multiple different times, or by a single user and/or device or by multiple different users and/or devices. In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Furthermore, identical reference numbers may be used in the drawings to identify similar elements or acts.

Figure 1B:
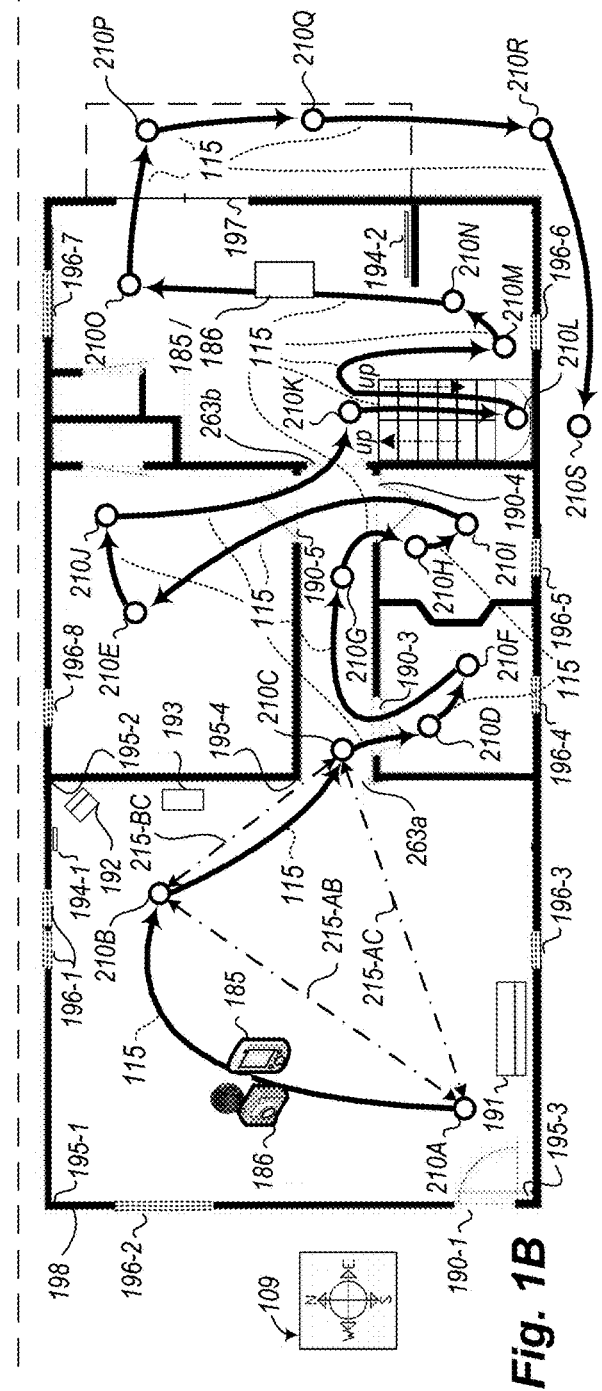

FIG. 1A is an example block diagram of various devices and systems that may participate in the described techniques in some embodiments. In particular, target panorama images 165 are illustrated in FIG. 1A that have been captured by one or more mobile computing devices 185 with imaging systems and/or by one or more separate camera devices 186 (e.g., without onboard computing capabilities), such as with respect to one or more buildings or other structures and under control of an Interior Capture and Analysis ("ICA") system 160 executing in this example on one or more server computing systems 180—FIG. 1B shows one example of such panorama image acquisition locations 210 for a particular house 198, as discussed further below, and additional details related to the automated operation of the ICA system are included elsewhere herein, including with respect to FIG. 4. In at least some embodiments, at least some of the ICA system may execute in part on mobile computing device 185 (e.g., as part of ICA application 154, whether in addition to or instead of ICA system 160 on the one or more server computing systems 180) to control acquisition of target images and optionally additional non-visual data by that mobile computing device and/or by one or more nearby (e.g., in the same room) optional separate camera devices 186 operating in conjunction with that mobile computing device, as discussed further with respect to FIG. 1B.

Figure 2A:
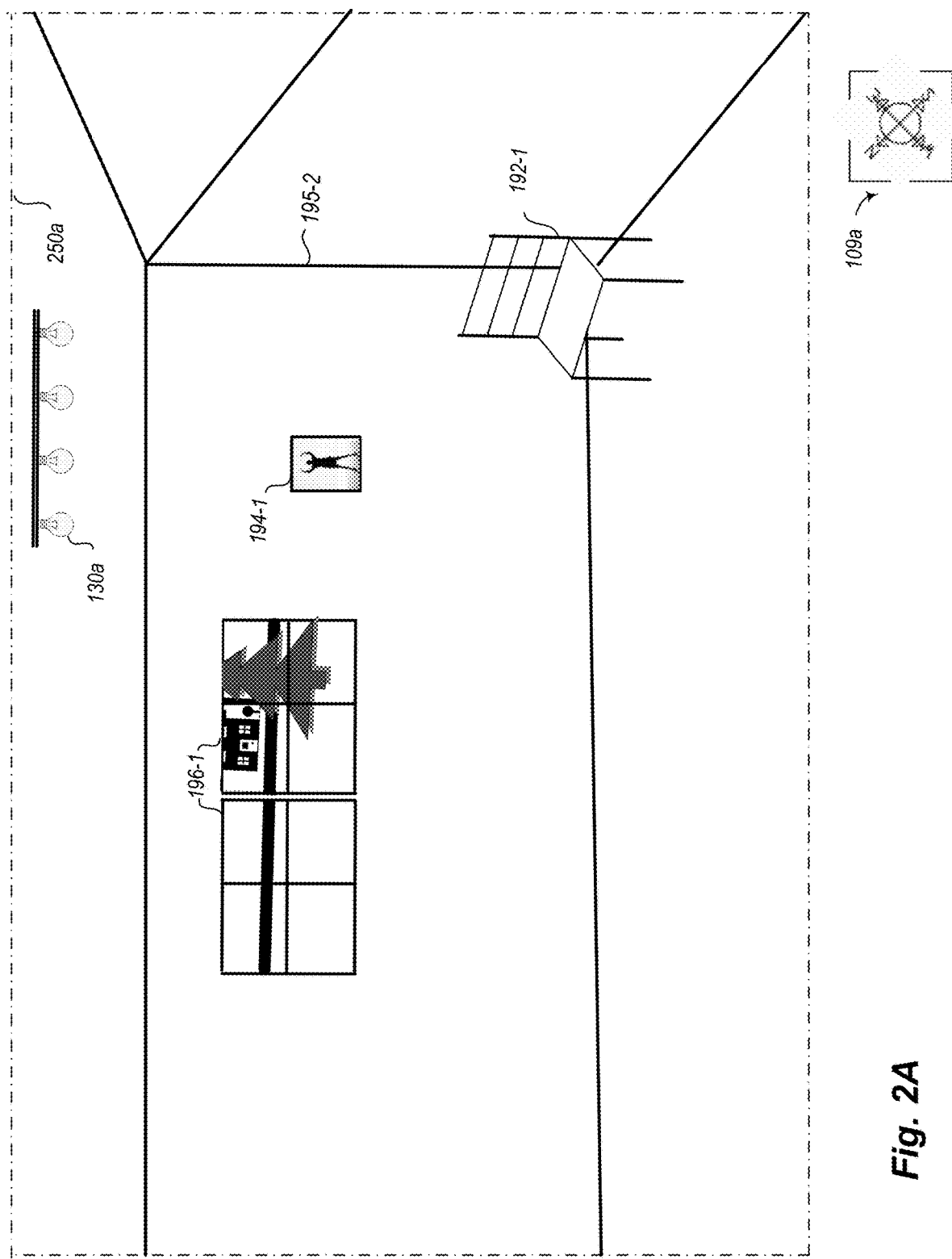
FIGS. 2A-2V illustrate examples of automated operations to determine a shape of a room of a building by iteratively combining visual data from multiple images captured in the room and to subsequently use the determined room shape information in one or more manners, including for generating and presenting information about a floor plan for the building.
Figure 2D:
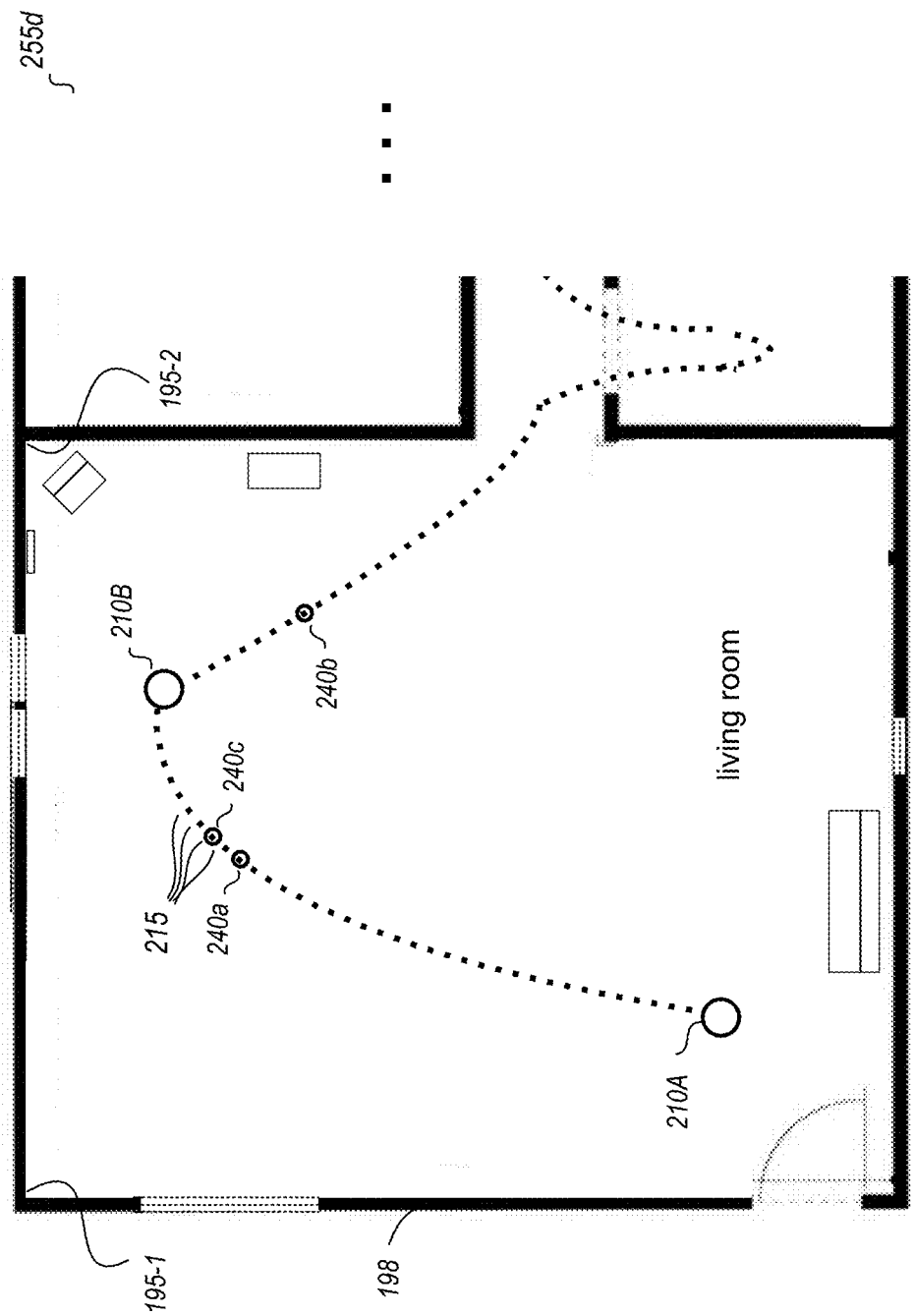
Figure 2K:
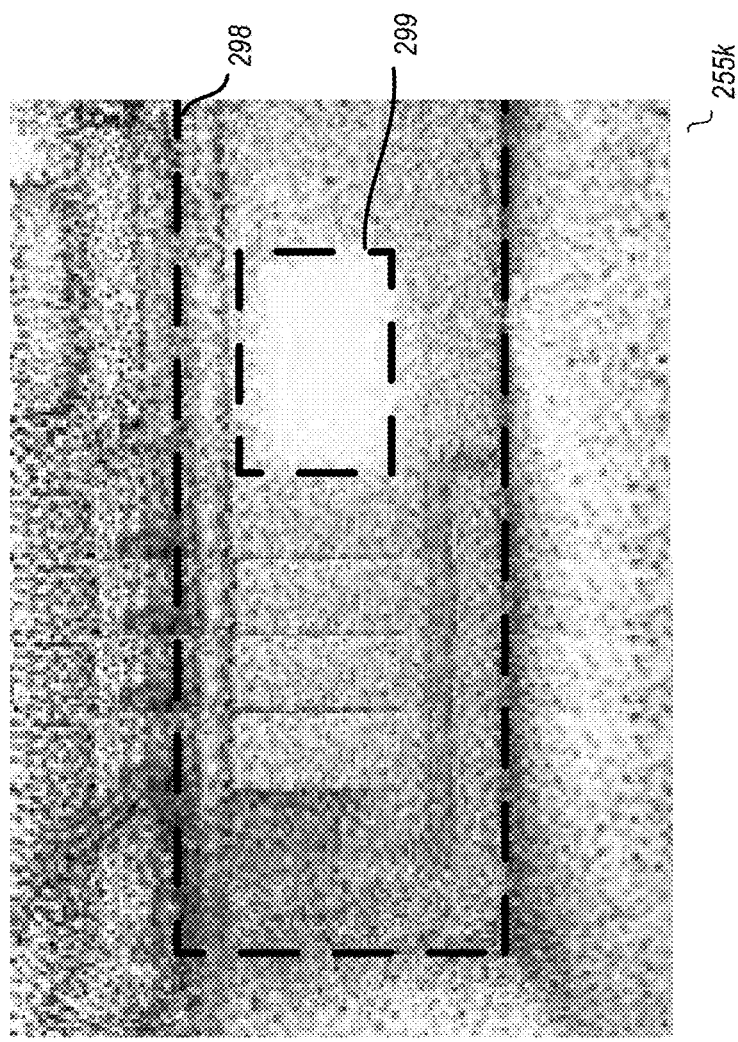
Figure 2L:
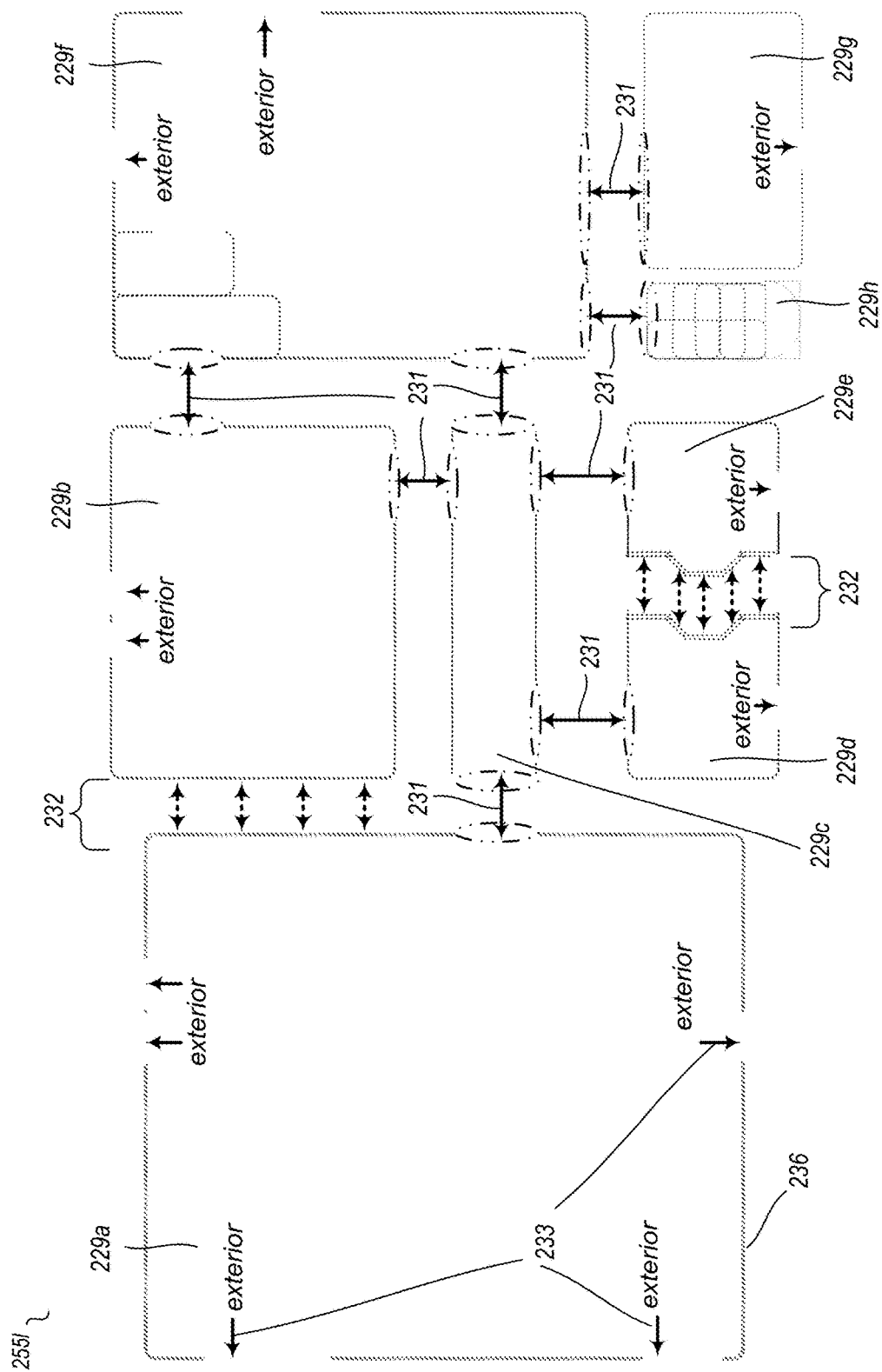
Figure 2M:
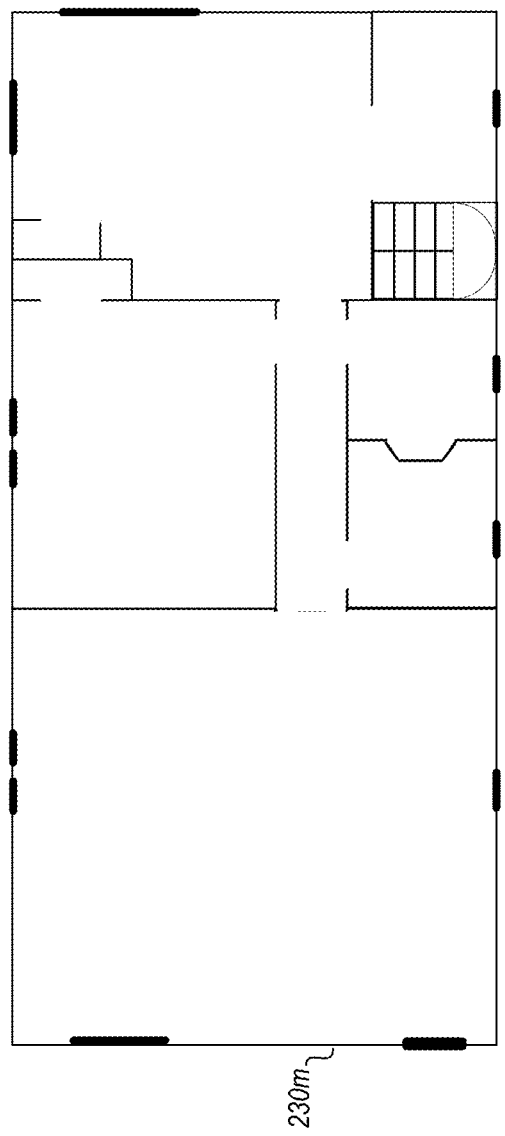
Figure 2N:
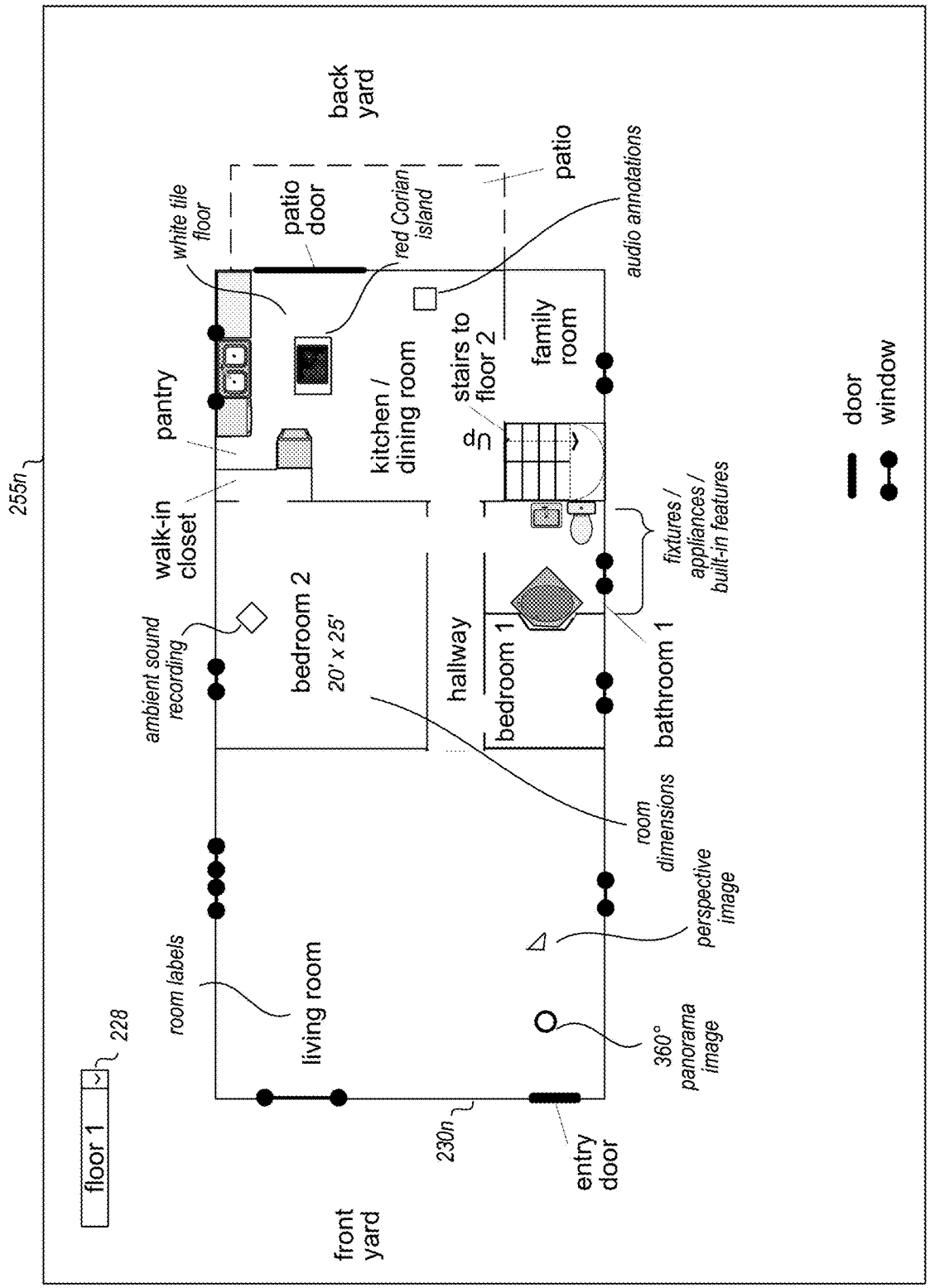
Figure 5A:
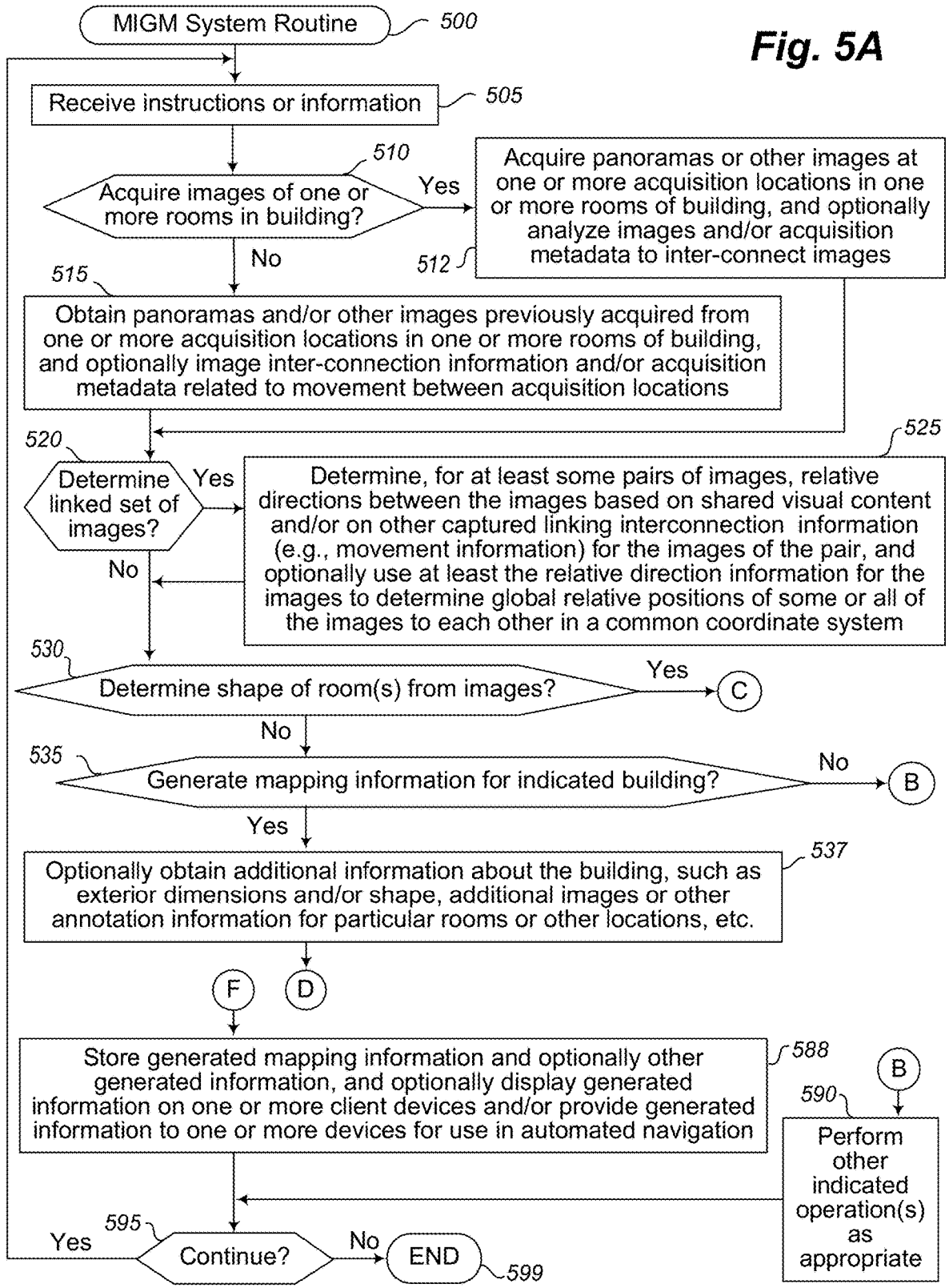
FIGS. 5A-5C illustrate an example flow diagram for a Mapping Information Generation Manager (MIGM) system routine in accordance with an embodiment of the present disclosure.
Figure 5B:
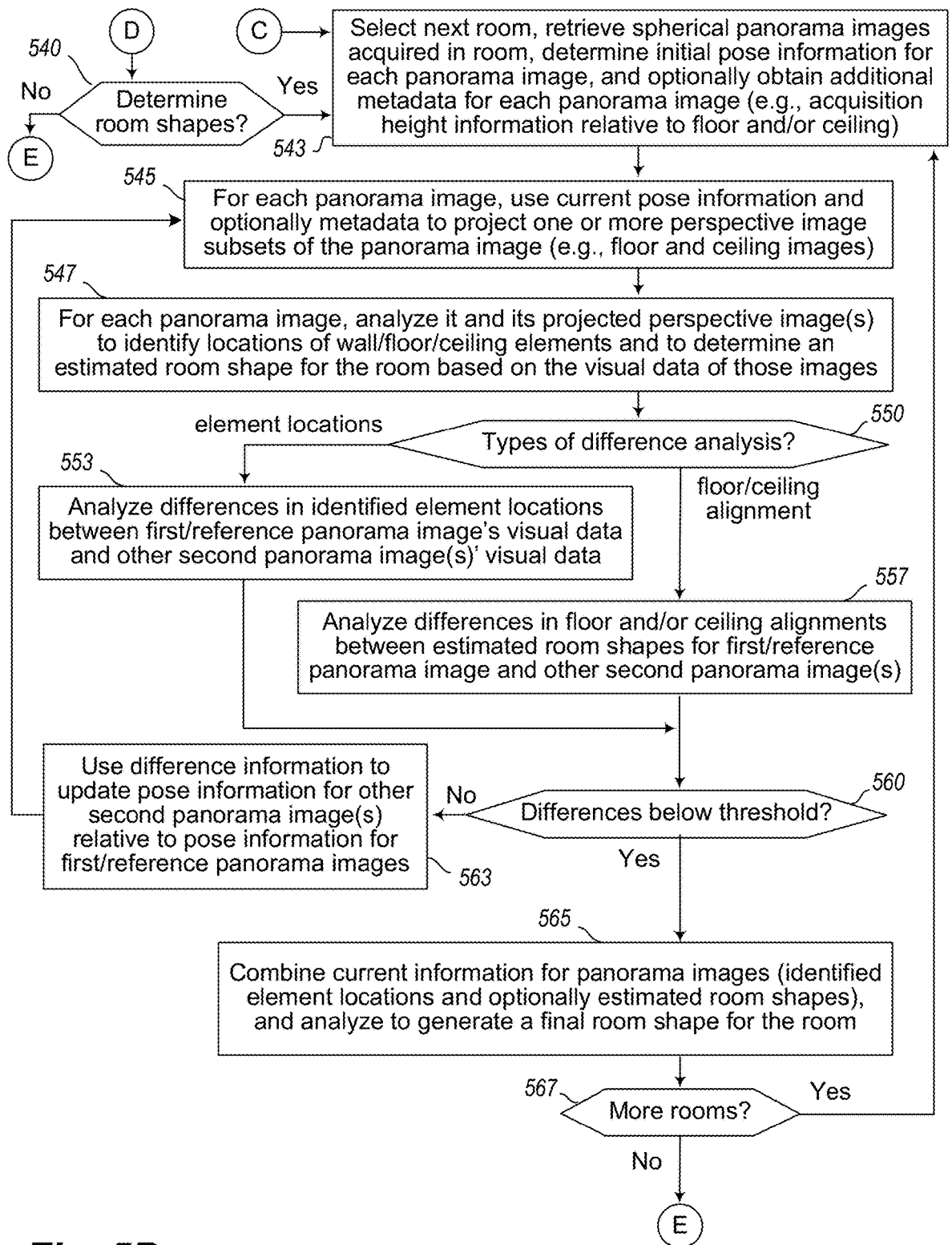
Figure 5C:
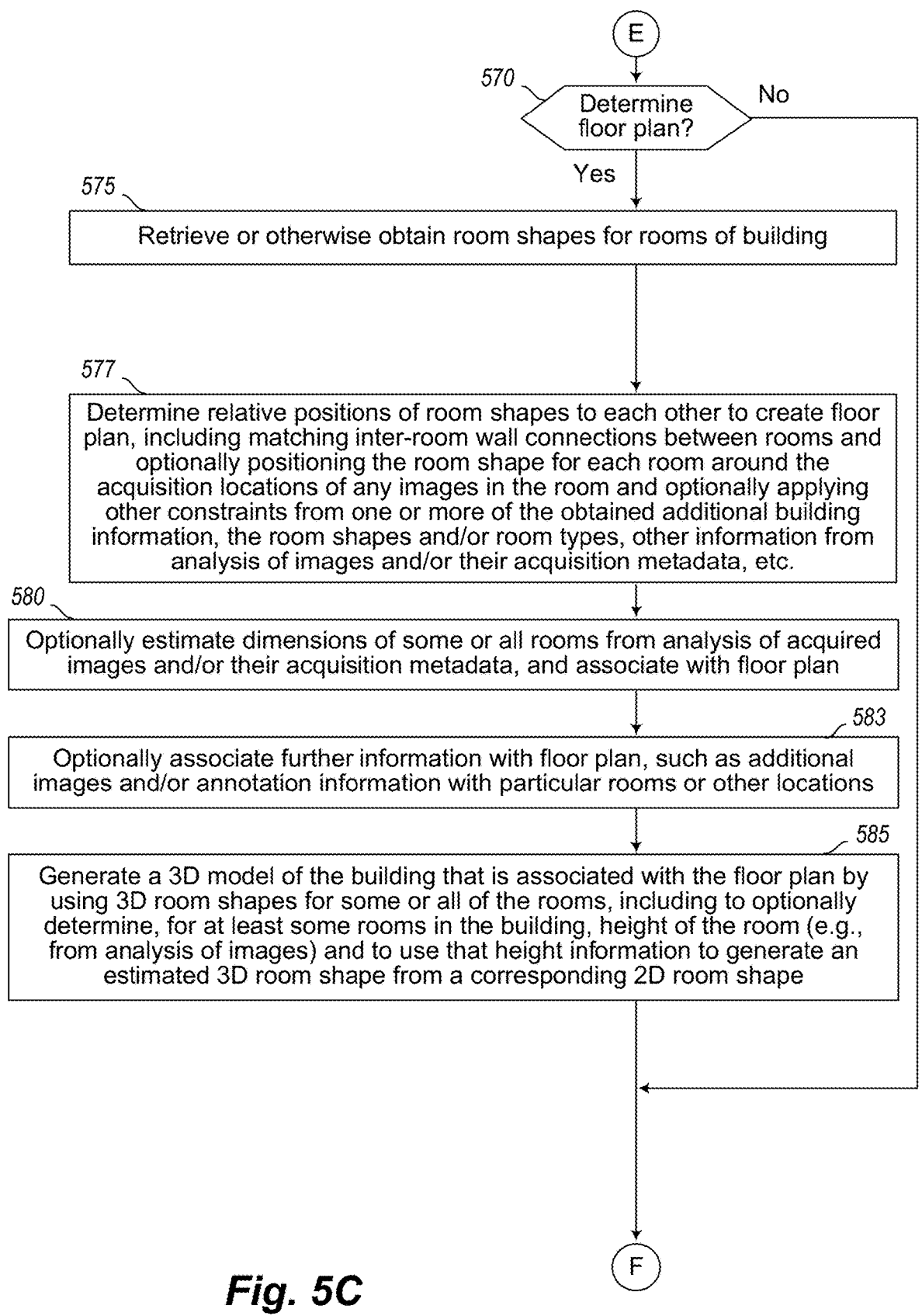

FIG. 1A further illustrates an MIGM (Mapping Information Generation Manager) system 140 that is executing on one or more server computing systems 180 to determine room shapes for rooms based on a combination of visual data from multiple target images (e.g., panorama images 165) acquired in each of those rooms, and to optionally further generate and provide building floor plans 155 and/or other mapping-related information (e.g., linked panorama images, etc.) based on use of the target images and optionally associated metadata about their acquisition and linking—FIGS. 2M through 2O (referred to herein as '2-O' for clarity) show examples of such floor plans, as discussed further below, and additional details related to the automated operation of the MIGM system are included elsewhere herein, including with respect to FIGS. 5A-5C. In some embodiments, the ICA system 160 and/or MIGM system 140 may execute on the same server computing system(s), such as if multiple or all of those systems are operated by a single entity or are otherwise executed in coordination with each other (e.g., with some or all functionality of those systems integrated together into a larger system), while in other embodiments the MIGM system may instead operate separately from the ICA system (e.g., without interacting with the ICXA system), such as to obtain target images and/or optionally other information (e.g., other additional images, etc.) from one or more external sources and optionally store them locally (not shown) with the MIGM system for further analysis and use.

In at least some embodiments and situations, one or more system operator users of MIGM client computing devices 105 may further interact over the network(s) 170 with the MIGM system 140, such as to assist with some of the automated operations of the MIGM system for determining room shapes and/or generating floor plans and other mapping information and/or for subsequently using the determined and generated information in one or more further automated manners. One or more other end users (not shown) of one or more other client computing devices 175 may further interact over one or more computer networks 170 with the MIGM system 140 and optionally the ICA system 160, such as to obtain and use determined room shape information based on target images, and/or to obtain and optionally interact with a corresponding generated floor plan, and/or to obtain and optionally interact with additional information such as one or more associated target images (e.g., to change between a floor plan view and a view of a particular target image at an acquisition location within or near the floor plan; to change the horizontal and/or vertical viewing direction from which a corresponding view of a panorama image is displayed, such as to determine a portion of a panorama image to which a current user viewing direction is directed, etc.). In addition, while not illustrated in FIG. 1A, a floor plan (or portion of it) may be linked to or otherwise associated with one or more other types of information, including for a floor plan of a multi-story or otherwise multi-level building to have multiple associated sub-floor plans for different stories or levels that are interlinked (e.g., via connecting stairway passages), for a two-dimensional ("2D") floor plan of a building to be linked to or otherwise associated with a three-dimensional ("3D") rendering floor plan of the building, etc.—in other embodiments, a floor plan of a multi-story or otherwise multi-level building may instead include information for all of the stories or other levels together and/or may display such information for all of the stories or other levels simultaneously. In addition, while not illustrated in FIG. 1A, in some embodiments the client computing devices 175 (or other devices, not shown) may receive and use determined room shape information and/or generated floor plan information in additional manners, such as to control or assist automated navigation activities by those devices (e.g., by autonomous vehicles or other devices), whether instead of or in addition to display of the generated information.

In the depicted computing environment of FIG. 1A, the network 170 may be one or more publicly accessible linked networks, possibly operated by various distinct parties, such as the Internet. In other implementations, the network 170 may have other forms. For example, the network 170 may instead be a private network, such as a corporate or university network that is wholly or partially inaccessible to non-privileged users. In still other implementations, the network 170 may include both private and public networks, with one or more of the private networks having access to and/or from one or more of the public networks. Furthermore, the network 170 may include various types of wired and/or wireless networks in various situations. In addition, the client computing devices 175 and server computing systems 180 may include various hardware components and stored information, as discussed in greater detail below with respect to FIG. 3.

In the example of FIG. 1A, ICA system 160 may perform automated operations involved in generating multiple target panorama images (e.g., each a 360 degree panorama around a vertical axis) at multiple associated acquisition locations (e.g., in multiple rooms or other locations within a building or other structure and optionally around some or all of the exterior of the building or other structure), such as for use in generating and providing a representation of an interior of the building or other structure. In some embodiments, further automated operations of the ICA system may further include analyzing information to determine relative positions/directions between each of two or more acquisition locations, creating inter-panorama positional/directional links in the panoramas to each of one or more other panoramas based on such determined positions/directions, and then providing information to display or otherwise present multiple linked panorama images for the various acquisition locations within the building, while in other embodiments some or all such further automated operations may instead be performed by the MIGM system. Additional details related to embodiments of a system providing at least some such functionality are included in U.S. Non-Provisional patent application Ser. No. 17/064,601, filed Oct. 7, 2020 and entitled "Connecting And Using Building Data Acquired From Mobile Devices" (which includes disclosure of an example BICA system that is generally directed to obtaining and using panorama images from within one or more buildings or other structures); in U.S. Non-Provisional patent application Ser. No. 17/082,044, filed Oct. 28, 2020 and entitled "Automated Control Of Image Acquisition Via Acquisition Location Determination" (which includes disclosure of an example ICA system that is generally directed to obtaining and using panorama images from within one or more buildings or other structures); in U.S. Non-Provisional patent application Ser. No. 17/019,247, filed Sep. 12, 2020 and entitled "Automated Mapping Information Generation From Inter-Connected Images"; in U.S. Non-Provisional patent application Ser. No. 17/080,604, filed Oct. 26, 2020 and entitled "Generating Floor Maps For Buildings From Automated Analysis Of Visual Data Of The Buildings' Interiors"; and in U.S. Provisional Patent Application No. 63/035,619, filed Jun. 5, 2020 and entitled "Automated Generation On Mobile Devices Of Panorama Images For Buildings Locations And Subsequent Use"; each of which is incorporated herein by reference in its entirety.

FIG. 1B depicts a block diagram of an exemplary building environment in which target panorama images have been analyzed by a copy of the MIGM system (not shown) to determine room shapes of one or some or all rooms within a building 198 (in this example, a house 198), and optionally further analyzed by the MIGM system to generate and provide (e.g., present) a corresponding building floor plan and/or other mapping-related information (e.g., a linked group of target panorama images, etc.). In particular, multiple panorama images are captured at a sequence of multiple acquisition locations 210 associated with the house 198 (e.g., the interior and exterior of the house) in the example of FIG. 1B, such as by a user (not shown) carrying one or more mobile computing devices 185 and/or one or more separate camera devices 186 to capture the target images and optionally additional non-visual data for the multiple acquisition locations 210. An embodiment of the ICA system (e.g., ICA system 160 on server computing system(s) 180; a copy of some or all of the ICA system executing on a mobile computing device of the user, such as ICA application system 154 executing in memory 152 on device 185; etc.) may automatically perform or assist in the capturing of the data representing the building, as well as to in some embodiments further analyze the captured data to generate linked panorama images providing a visual representation of the building. While the mobile computing device of the user may include various hardware components, such as memory 152, a display 142, one or more hardware processors 132, one or more image sensors or other imaging systems 135 (e.g., with one or more lenses, associated lights, etc.), optionally one or more depth sensors or other distance-measuring sensors 136, one or more other sensors 148 (e.g., a gyroscope 148a, an accelerometer 148b, a magnetometer or other compass 148c, etc., such as part of one or more IMUs, or inertial measurement units, of the mobile device; an altimeter; light detector; etc.), optionally a GPS receiver, and optionally other components that are not shown (e.g., additional non-volatile storage; transmission capabilities to interact with other devices over the network(s) 170 and/or via direct device-to-device communication, such as with an associated camera device 186 or a remote server computing system 180; a microphone; one or more external lights; etc.), the mobile computing device in some embodiments does not include the distance-measuring sensors 136 or otherwise have access to or use other specialized equipment to measure the depth of objects in the building relative to a location of the mobile computing device, such that relationships between different target panorama images and their acquisition locations may be determined in part or in whole in such embodiments based on analyzing visual data in different images and/or by using information from other of the listed hardware components, but without using any data from any such distance-measuring sensors 136. While not illustrated for the sake of brevity, the one or more camera devices 186 may similarly each include at least one or more image sensors and storage on which to store acquired target images and transmission capabilities to transmit the captured target images to other devices (e.g., an associated mobile computing device 185, a remote server computing system 180, etc.), optionally along with one or more lenses and lights, and optionally in some embodiments some or all of the other components shown for the mobile computing device. In addition, while directional indicator 109 is provided in FIG. 1B for reference of the viewer and discussion of subsequent examples, the mobile computing device and/or ICA system may not use such absolute directional information in at least some embodiments, such as to instead determine relative directions and distances between panorama images 210 without regard to actual geographical positions or directions.

In operation, the mobile computing device 185 and/or camera device 186 (hereinafter for the example of FIG. 1B, "one or more image acquisition devices") arrive at a first acquisition location 210A within a first room of the building interior (in this example, via an entryway from an external door 190-1 to the living room), and capture visual data for a portion of the building interior that is visible from that acquisition location 210A (e.g., some or all of the first room, and optionally small portions of one or more other adjacent or nearby rooms, such as through doorways, halls, stairways or other connecting passages from the first room)—in at least some situations, the one or more image acquisition devices may be carried by or otherwise accompanied by one or more users, while in other embodiments and situations may be mounted on or carried by one or more self-powered devices that move through the building under their own power. In addition, the capture of the visual data from the acquisition location may be performed in various manners in various embodiments (e.g., by using one or more lenses that capture all of the image data simultaneously, by an associated user turning his or her body in a circle while holding the one or more image acquisition devices stationary relative to the user's body, by an automated device on which the one or more image acquisition devices are mounted or carried rotating the one or more image acquisition devices, etc.), and may include recording a video at the acquisition location and/or taking a succession of one or more images at the acquisition location, including to capture visual information depicting a number of objects or other elements (e.g., structural details) that may be visible in images (e.g., video frames) captured from or near the acquisition location. In the example of FIG. 1B, such objects or other elements include various elements that are structurally part of the walls (or structural "wall elements") of rooms of the house, such as the doorways 190 and 197 and their doors (e.g., with swinging and/or sliding doors), windows 196, inter-wall borders (e.g., corners or edges) 195 (including corner 195-1 in the northwest corner of the house 198, corner 195-2 in the northeast corner of the first room (living room), and corner 195-3 in the southwest corner of the first room)—in addition, such objects or other elements in the example of FIG. 1B may further include other elements within the rooms, such as furniture 191-193 (e.g., a couch 191; chair 192; table 193; etc.), pictures or paintings or televisions or other objects 194 (such as 194-1 and 194-2) hung on walls, light fixtures, etc. The one or more image acquisition devices further capture additional data (e.g., additional visual data using imaging system 135, additional motion data using sensor modules 148, optionally additional depth data using distance-measuring sensors 136, etc.) at or near the acquisition location 210A, optionally while being rotated, as well as to further optionally capture further such additional data while the one or more image acquisition devices move to and/or from acquisition locations. The actions of the one or more image acquisition devices may in some embodiments be controlled or facilitated via use of one or more programs executing on the mobile computing device 185 (e.g., via automated instructions to one or more image acquisition devices or to another mobile device, not shown, that is carrying those devices through the building under its own power; via instructions to an associated user in the room; etc.), such as ICA application system 154 and/or optional browser 162, control system 147 to manage I/O (input/output) and/or communications and/or networking for the device 185 (e.g., to receive instructions from and present information to its user), etc. The user may also optionally provide a textual or auditory identifier to be associated with an acquisition location, such as "entry" for acquisition location 210A or "living room" for acquisition location 210B, while in other embodiments the ICA system may automatically generate such identifiers (e.g., by automatically analyzing video and/or other recorded information for a building to perform a corresponding automated determination, such as by using machine learning) or the identifiers may not be used.

After the first acquisition location 210A has been adequately captured, the one or more image acquisition devices (and the user, if present) may proceed to a next acquisition location (such as acquisition location 2106 along travel path 115), optionally recording movement data by the one or more image acquisition devices during movement between the acquisition locations, such as visual data and/or other non-visual data from the hardware components (e.g., from one or more IMUs 148, from the imaging system 135, from the distance-measuring sensors 136, etc.). At the next acquisition location, the one or more image acquisition devices may similarly capture one or more target images from that acquisition location, and optionally additional data at or near that acquisition location. This process may repeat from some or all rooms of the building and optionally external to the building, as illustrated for acquisition locations 210C-210S. The video and/or other images acquired for each acquisition location by the one or more image acquisition devices are further analyzed to generate a target panorama image for each of acquisition locations 210A-210S, including in some embodiments to stitch together multiple constituent images to create a panorama image and/or to match objects and other elements in different images.

In addition to generating such panorama images, further analysis may be performed in at least some embodiments by the MIGM system (e.g., concurrently with the image capture activities or subsequent to the image capture) to determine room shapes for each of the rooms (and optionally for other defined areas, such as a deck or other patio outside of the building or other external defined area), including to optionally determine acquisition position information for each target image, and to optionally further determine a floor plan for the building and/or other related mapping information for the building (e.g., an interconnected group of linked panorama images, etc.)—for example, in order to 'link' at least some of the panoramas and their acquisition locations together (with some corresponding directional lines 215 between example acquisition locations 210A-210C being shown for the sake of illustration), a copy of the MIGM system may determine relative positional information between pairs of acquisition locations that are visible to each other, store corresponding inter-panorama links (e.g., links 215-AB, 215-BC and 215-AC between acquisition locations 210A and 210B, 210B and 210C, and 210A and 210C, respectively), and in some embodiments and situations further link at least some acquisition locations that are not visible to each other (e.g., a link 215-BE, not shown, between acquisition locations 210B and 210E; a link 215-CS, not shown, between acquisition locations 210C and 210S, etc.). Additional details related to embodiments of generating and using linking information between panorama images, including using travel path information and/or elements or other features visible in multiple images, are included in U.S. Non-Provisional patent application Ser. No. 17/064,601, filed Oct. 7, 2020 and entitled "Connecting And Using Building Data Acquired From Mobile Devices" (which includes disclosure of an example BICA system that is generally directed to obtaining and using linking information to inter-connect multiple panorama images captured within one or more buildings or other structures); in U.S. Non-Provisional patent application Ser. No. 17/080,604, filed Oct. 26, 2020 and entitled "Generating Floor Maps For Buildings From Automated Analysis Of Visual Data Of The Buildings' Interiors"; and in U.S. Provisional Patent Application No. 63/035,619, filed Jun. 5, 2020 and entitled "Automated Generation On Mobile Devices Of Panorama Images For Buildings Locations And Subsequent Use"; each of which is incorporated herein by reference in its entirety.

Various details are provided with respect to FIGS. 1A-1B, but it will be appreciated that the provided details are non-exclusive examples included for illustrative purposes, and other embodiments may be performed in other manners without some or all such details.

FIGS. 2A-2V illustrate examples of automatically analyzing visual data combined from multiple images captured in a room of a building to determine a shape of the room, such as based on target images captured within the building 198 discussed in FIG. 1B, and for subsequently using the determined room shape information in one or more manners, such as within a floor plan of the building that is based in part on determined room shapes of the building's rooms, including in some embodiments and situations to further determine and present information on the floor plan for the building.

In particular, FIG. 2A illustrates an example image 250a, such as a non-panorama perspective image captured by one or more image acquisition devices in a northeasterly direction from acquisition location 210B in the living room of house 198 of FIG. 1B (or a northeasterly facing subset view of a 360-degree panorama image taken from that acquisition location and formatted in a rectilinear manner)—the directional indicator 109a is further displayed in this example to illustrate the northeasterly direction in which the image is taken. In the illustrated example, the displayed image includes several visible elements (e.g., light fixture 130a), furniture (e.g., chair 192-1), two windows 196-1, and a picture 194-1 hanging on the north wall of the living room. No passages into or out of the living room (e.g., doorways or other wall openings) are visible in this image. However, multiple room borders are visible in the image 250a, including horizontal borders between a visible portion of the north wall of the living room and the living room's ceiling and floor, horizontal borders between a visible portion of the east wall of the living room and the living room's ceiling and floor, and the inter-wall vertical border 195-2 between the north and east walls.

FIG. 2B continues the example of FIG. 2A, and illustrates an additional perspective image 250b captured by the one or more image acquisition devices in a northwesterly direction from acquisition location 210B in the living room of house 198 of FIG. 1B—the directional indicator 109b is further displayed to illustrate the northwesterly direction in which the image is taken. In this example image, a small portion of one of the windows 196-1 continues to be visible, along with a portion of window 196-2 and a new lighting fixture 130b. In addition, horizontal and vertical room borders are visible in image 250b in a manner similar to that of FIG. 2A.

FIG. 2C continues the examples of FIGS. 2A-2B, and illustrates a third perspective image 250c captured by the one or more image acquisition devices in a southwesterly direction in the living room of house 198 of FIG. 1B, such as from acquisition location 210B—the directional indicator 109c is further displayed to illustrate the southwesterly direction in which the image is taken. In this example image, a portion of window 196-2 continues to be visible, as is a couch 191 and visual horizontal and vertical room borders in a manner similar to that of FIGS. 2A and 2B. This example image further illustrates a wall opening passage into/out of the living room, which in this example is a doorway 190-1 to enter and leave the living room (which FIG. 1B identifies as a door to the exterior of the house). It will be appreciated that a variety of other perspective images may be taken from acquisition location 210B and/or other acquisition locations and displayed in a similar manner.

FIG. 2D illustrates further information 255d for a portion of the house 198 of FIG. 1B, including the living room and limited portions of the further rooms to the east of the living room. As discussed with respect to FIGS. 1B and 2A-2C, in some embodiments, target panorama images may be captured at various locations in the house interior, such as at locations 210A and 210B in the living room, with corresponding visual contents of one or both such resulting target panorama images subsequently used to determine a room shape of the living room. In addition, in at least some embodiments, additional images may be captured, such as if the one or more image acquisition devices (not shown) are capturing video or one or more other sequences of continuous or near-continuous images as they move through the interior of the house. In this example, information is illustrated for a portion of the path 115 illustrated in FIG. 1B, and in particular illustrates a sequence of locations 215 along the path at which one or more video frame images (or other sequence of continuous or near-continuous images) may be captured (e.g., if video data is being captured) of the surrounding interior of the house while the one or more image acquisition devices are moved—examples of such locations include capture locations 240a-c, with further information related to video frame images captured from those locations shown in FIGS. 2E-2J. In this example, the locations 215 along the path are shown as being separated by short distances (e.g., a foot, an inch, a fraction of an inch, etc.), although it will be appreciated that video capture may be substantially continuous—thus, in at least some embodiments, only a subset of such captured video frame images (or other images from a sequence of continuous or near-continuous images) may be selected and used for further analysis, such as images that are separated by defined distances and/or that are separated by a defined amount of time between their capture (e.g., a second, a fraction of a second, multiple seconds, etc.) and/or based on other criteria.

FIGS. 2E-2J continue the examples of FIGS. 2A-2D, and illustrate additional information about the living room and about analyzing 360° image frames from the video captured along the path 155 as part of determining one type of estimate of a partial likely shape of the room. While not illustrated in these figures, similar techniques could be performed for target panorama images captured at two or more of acquisition locations 210A, 210B and 210C by the camera device, whether in addition to analysis of the additional image frames illustrated in FIG. 2D (e.g., to generate an additional estimate of the likely shape of the room using the visual data of the target images) or instead of the analysis of the additional image frames illustrated in FIG. 2D. In particular, FIG. 2E includes information 255e illustrating that a 360° image frame taken from location 240b will share information about a variety of visible 2D features with that of a 360° image frame taken from location 240a, although only a limited subset of such features are illustrated in FIG. 2E for a portion of the living room for the sake of simplicity. In FIG. 2E, example lines of sight 228 from location 240b to various example features in the room are shown, and similar example lines of sight 227 from location 240a to corresponding features are shown, which illustrate degrees of difference between the views at significantly spaced capture locations. Accordingly, analysis of the sequence of images corresponding to locations 215 of FIG. 2D using SLAM and/or MVS and/or SfM techniques may provide a variety of initial information about the features of the living room, as illustrated further with respect to FIGS. 2F-2I.

In particular, FIG. 2F illustrates information 255f about the northeast portion of the living room that is visible in subsets of 360° image frames taken from locations 240a and 240b, and FIG. 2G illustrates information 255g about the northwest portion of the living room that is visible in other subsets of 360° image frames taken from locations 240a and 240b, with various example features in those portions of the living room being visible in both 360° image frames (e.g., corners 195-1 and 195-2, windows 196-1 and 196-2, etc.). As part of the automated analysis of the 360° image frames using SLAM and/or MVS and/or SfM techniques, partial information about planes 286e and 286f corresponding to portions of the northern wall of the living room may be determined from the features that are detected, and partial information 287e and 285f about portions of the east and west walls of the living room may be similarly determined from corresponding features identified in the images. In addition to identifying such partial plane information for detected features (e.g., for each point in a determined sparse 3D point cloud from the image analysis), the SLAM and/or MVS and/or SfM techniques may further determine information about likely locations and orientations/directions 220 for the image subsets from capture location 240a, and likely locations and orientations/directions 222 for the image subsets from capture location 240b (e.g., locations 220g and 222g in FIG. 2F of the capture locations 240a and 240b, respectively, and optionally directions 220e and 222e for the image subsets shown in FIG. 2F; and corresponding locations 220g and 222g in FIG. 2G of the capture locations 240a and 240b, respectively, and optionally directions 220f and 222f for the image subsets shown in FIG. 2G). While only features for part of the living room are illustrated in FIGS. 2F and 2G, it will be appreciated that the other portions of the 360° image frames corresponding to other portions of the living room may be analyzed in a similar manner, in order to determine possible information about possible planes for the various walls of the room, as well as for other features (not shown) in the living room. In addition, similar analyses may be performed between some or all other images at locations 215 in the living room that are selected for use, resulting in a variety of determined feature planes from the various image analyses that may correspond to portions of the walls of the room.

FIG. 2H continues the examples of FIGS. 2A-2G, and illustrates information 255h about a variety of determined feature planes that may correspond to portions of the west and north walls of the living room, from analyses of the 360° image frames captured at locations 240a and 240b. The illustrated plane information includes determined planes 286g near or at the northern wall (and thus corresponding possible locations of parts of the northern wall), and determined planes 285g near or at the western wall (and thus corresponding possible locations of parts of the western wall). As would be expected, there are a number of variations in different determined planes for the northern and western walls from different features detected in the analysis of the two 360° image frames, such as differences in position, angle and/or length, as well as missing data for some portions of the walls, causing uncertainty as to the actual exact position and angle of each of the walls. While not illustrated in FIG. 2H, it will be appreciated that similar determined feature planes for the other walls of the living room would similarly be detected, along with determined feature planes corresponding to features that are not along the walls (e.g., furniture).

FIG. 2I continues the examples of FIGS. 2A-2H, and illustrates information 255i about additional determined feature plane information that may correspond to portions of the west and north walls of the living room, from analyses of various additional 360° image frames selected from additional locations 215 along the path 115 in the living room—as would be expected, the analyses of the further images provides even greater variations in different determined planes for the northern and western walls in this example. FIG. 2I further illustrates additional determined information that is used to aggregate information about the various determined feature planes portions in order to identify likely partial locations 295a and 295b of the west and north walls, as illustrated in information 255j of FIG. 2J. In particular, FIG. 2I illustrates information 291a about normal orthogonal directions for some of the determined feature planes corresponding to the west wall, along with additional information 288a about those determined feature planes. In the example embodiment, the determined feature planes are clustered to represent hypothesized wall locations of the west wall, and the information about the hypothesized wall locations is combined to determine the likely wall location 295a, such as by weighting information from the various clusters and/or the underlying determined feature planes. In at least some embodiments, the hypothesized wall locations and/or normal information is analyzed via use of machine learning techniques to determine the resulting likely wall location, optionally by further applying assumptions or other constraints (such as a 90° corner, as illustrated in information 289 of FIG. 2H, and/or having flat walls) as part of the machine learning analysis or to results of the analysis. Similar analysis may be performed for the north wall using information 288b about corresponding determined feature planes and additional information 291b about resulting normal orthogonal directions for at least some of those determined feature planes. FIG. 2J illustrates the resulting likely partial wall locations 295a and 295b for the west and north walls of the living room, respectively.

While not illustrated in FIG. 2I, it will be appreciated that similar determined feature planes and corresponding normal directions for the other walls of the living room will similarly be detected and analyzed to determine their likely locations, resulting in an estimated partial overall room shape for the living room that is based on visual data acquired by the one or more image acquisition devices in the living room. In addition, similar analyses are performed for each of the rooms of the building, providing estimated partial room shapes of each of the rooms. Furthermore, while not illustrated in FIG. 2D-2J, the analysis of the visual data captured by the one or more image acquisition devices may be supplemented and/or replaced in some embodiments by analysis of depth data (not shown) captured by the one or more image acquisition devices in the living room, such as to directly generate an estimated 3D point cloud from the depth data that represents the walls and optionally ceiling and/or floor of the living room. While also not illustrated in FIGS. 2D-2J, other room shape estimation operations may be performed in at least some embodiments using only a single target panorama image, such as via an analysis of the visual data of that target panorama image by one or more trained neural networks, as discussed in greater detail elsewhere herein.

FIG. 2K continues the examples of FIGS. 2A-2J, and illustrates information 255k about additional information that may be generated from one or more images in a room and used in one or more manners in at least some embodiments. In particular, images (e.g., video frames) captured in the living room of the house 198 may be analyzed in order to determine an estimated 3D shape of the living room, such as from a 3D point cloud of features detected in the video frames (e.g., using SLAM and/or SfM and/or MVS techniques, and optionally further based on IMU data captured by the one or more image acquisition devices). In this example, information 255k reflects an example portion of such a point cloud for the living room, such as in this example to correspond to a northwesterly portion of the living room (e.g., to include northwest corner 195-1 of the living room, as well as windows 196-1) in a manner similar to image 250c of FIG. 2C. Such a point cloud may be further analyzed to detect features such as windows, doorways and other inter-room openings, etc.—in this example, an area 299 corresponding to windows 196-1 is identified, as well as borders 298 corresponding to the north wall of the living room. It will be appreciated that in other embodiments such an estimated 3D shape of the living room may be determined by using depth data captured by the one or more image acquisition devices in the living room, whether in addition to or instead of using visual data of one or more images captured by the one or more image acquisition devices in the living room. In addition, it will be appreciated that various other walls and other features may be similarity identified in the living room and in the other rooms of the house 198.

FIG. 2L illustrates additional information 255*l* corresponding to, after final estimated room shapes are determined for the rooms of the illustrated floor of the house 198 (e.g., 2D room shape 236 for the living room), positioning the rooms' estimated room shapes relative to each other, based at least in part in this example on connecting inter-room passages between rooms and matching room shape information between adjoining rooms—in at least some embodiments, such information may be treated as constraints on the positioning of the rooms, and an optimal or otherwise preferred solution is determined for those constraints. Examples of such constraints in FIG. 2L include matching 231 connecting passage information (e.g., passages detected in the automated image analyses discussed with respect to FIGS. 2E-2J and/or FIGS. 2P-2V) for adjacent rooms so that the locations of those passages are co-located, and matching 232 shapes of adjacent rooms in order to connect those shapes (e.g., as shown for rooms 229*d* and 229*e*, and for rooms 229*a* and 229*b*). Various other types of information may be used in other embodiments for room shape positions, whether in addition to or instead of passage-based constraints and/or room shape-based constraints, such as exact or approximate dimensions for an overall size of the house (e.g., based on additional metadata available regarding the building, analysis of images from one or more image acquisition locations external to the building, etc.). House exterior information 233 may further be identified and used as constraints (e.g., based at least in part of automated identification of passages and other features corresponding to the building exterior, such as windows), such as to prevent another room from being placed at a location that has been identified as the building's exterior. In the example of FIG. 2L, the final estimated room shapes that are used may be 2D room shapes, or instead 2D versions of 3D final estimated room shapes may be generated and used (e.g., by taking a horizontal slice of a 3D room shape).

FIGS. 2M through 2-O continue the examples of FIG. 2A-2L, and illustrate mapping information that may be generated from the types of analyses discussed in FIGS. 2A-2L and FIGS. 2P-2V. In particular, FIG. 2M illustrates an example floor plan 230*m* that may be constructed based on the positioning of determined final estimated room shapes, which in this example includes walls and indications of doorways and windows. In some embodiments, such a floor plan may have further information shown, such as about other features that are automatically detected by the analysis operations and/or that are subsequently added by one or more users. For example, FIG. 2N illustrates a modified floor plan 230*n* that includes additional information of various types, such as may be automatically identified from analysis operations of visual data from images and/or from depth data, and added to the floor plan 230*m*, including one or more of the following types of information: room labels (e.g., "living room" for the living room), room dimensions, visual indications of fixtures or appliances or other built-in features, visual indications of positions of additional types of associated and linked information (e.g., of panorama images and/or perspective images acquired at specified acquisition positions, which an end user may select for further display; of audio annotations and/or sound recordings that an end user may select for further presentation; etc.), visual indications of doorways and windows, etc.—in other embodiments and situations, some or all such types of information may instead be provided by one or more MIGM system operator users and/or ICA system operator users. In addition, when the floor plans 230*m* and/or 230*n* are displayed to an end user, one or more user-selectable controls may be added to provide interactive functionality as part of a GUI (graphical user interface) screen 255*n*, such as to indicate a current floor that is displayed, to allow the end user to select a different floor to be displayed, etc., with a corresponding example user-selectable control 228 added to the GUI in this example—in addition, in some embodiments, a change in floors or other levels may also be made directly from the displayed floor plan, such as via selection of a corresponding connecting passage (e.g., a stairway to a different floor), and other visual changes may be made directly from the displayed floor plan by selecting corresponding displayed user-selectable controls (e.g., to select a control corresponding to a particular image at a particular location, and to receive a display of that image, whether instead of or in addition to the previous display of the floor plan from which the image is selected). In other embodiments, information for some or all different floors may be displayed simultaneously, such as by displaying separate sub-floor plans for separate floors, or instead by integrating the room connection information for all rooms and floors into a single floor plan that is shown together at once. It will be appreciated that a variety of other types of information may be added in some embodiments, that some of the illustrated types of information may not be provided in some embodiments, and that visual indications of and user selections of linked and associated information may be displayed and selected in other manners in other embodiments.

FIG. 2-O continues the examples of FIGS. 2A-2N, and illustrates additional information 265*o* that may be generated from the automated analysis techniques disclosed herein and displayed (e.g., in a GUI similar to that of FIG. 2N), which in this example is a 2.5D or 3D model floor plan of the house. Such a model 265*o* may be additional mapping-related information that is generated based on the floor plan 230*m* and/or 230*n*, with additional information about height shown in order to illustrate visual locations in walls of features such as windows and doors, or instead by combined final estimated room shapes that are 3D shapes. While not illustrated in FIG. 2-O, additional information may be added to the displayed walls in some embodiments, such as from images taken during the video capture (e.g., to render and illustrate actual paint, wallpaper or other surfaces from the house on the rendered model 265), and/or may otherwise be used to add specified colors, textures or other visual information to walls and/or other surfaces.

Additional details related to embodiments of a system providing at least some such functionality of an MIGM system or related system for generating floor plans and associated information and/or presenting floor plans and associated information, and/or of a system providing at least some such functionality of an ILDM (Image Location Determination Manager) system for determining acquisition positions of images, are included in U.S. Non-Provisional patent application Ser. No. 16/190,162, filed Nov. 14, 2018 and entitled "Automated Mapping Information Generation From Inter-Connected Images" (which includes disclosure of an example Floor Map Generation Manager, or FMGM, system that is generally directed to automated operations for generating and displaying a floor map or other floor plan of a building using images acquired in and around the building); in U.S. Non-Provisional patent application Ser. No. 16/681, 787, filed Nov. 12, 2019 and entitled "Presenting Integrated Building Information Using Three-Dimensional Building Models" (which includes disclosure of an example FMGM system that is generally directed to automated operations for displaying a floor map or other floor plan of a building and associated information); in U.S. Non-Provisional patent application Ser. No. 16/841,581, filed Apr. 6, 2020 and entitled "Providing Simulated Lighting Information For Three-Dimensional Building Models" (which includes disclosure of an example FMGM system that is generally directed to automated operations for displaying a floor map or other floor plan of a building and associated information); in U.S. Non-Provisional patent application Ser. No. 17/080,604, filed Oct. 26, 2020 and entitled "Generating Floor Maps For Buildings From Automated Analysis Of Visual Data Of The Buildings' Interiors" (which includes disclosure of an example Video-To-Floor Map, or VTFM, system that is generally directed to automated operations for generating a floor map or other floor plan of a building using video data acquired in and around the building); in U.S. Provisional Patent Application No. 63/035,619, filed Jun. 5, 2020 and entitled "Automated Generation On Mobile Devices Of Panorama Images For Buildings Locations And Subsequent Use"; in U.S. Non-Provisional patent application Ser. No. 17/069,800, filed Oct. 13, 2020 and entitled "Automated Tools For Generating Building Mapping Information"; in U.S. Non-Provisional patent application Ser. No. 16/807,135, filed Mar. 2, 2020 and entitled "Automated Tools For Generating Mapping Information For Buildings" (which includes disclosure of an example MIGM system that is generally directed to automated operations for generating a floor map or other floor plan of a building using images acquired in and around the building); in U.S. Non-Provisional patent application Ser. No. 17/013,323, filed Sep. 4, 2020 and entitled "Automated Analysis Of Image Contents To Determine The Acquisition Location Of The Image" (which includes disclosure of an example Image Location Mapping Manager, or ILMM, system that is generally directed to automated operations for determining acquisition positions of images); in U.S. Non-Provisional patent application Ser. No. 17/150,958, filed Jan. 15, 2021 and entitled "Automated Determination Of Image Acquisition Locations In Building Interiors Using Multiple Data Capture Devices" (which includes disclosure of an example Image Location Determination Manager, or ILDM, system that is generally directed to automated operations for determining room shapes and acquisition positions of images); and in U.S. Provisional Patent Application No. 63/117,372, filed Nov. 23, 2020 and entitled "Automated Determination Of Image Acquisition Locations In Building Interiors Using Determined Room Shapes" (which includes disclosure of an example Mapping Information Generation Manager, or MIGM, system that is generally directed to automated operations for determining acquisition positions of images); each of which is incorporated herein by reference in its entirety. In addition, further details related to embodiments of a system providing at least some such functionality of a system for using acquired images and/or generated floor plans are included in U.S. Non-Provisional patent application Ser. No. 17/185,793, filed Feb. 25, 2021 and entitled "Automated Usability Assessment Of Buildings Using Visual Data Of Captured In-Room Images" (which includes disclosure of an example Building Usability Assessment Manager, or BUAM, system that is generally directed to automated operations for analyzing visual data from images captured in rooms of a building to assess room layout and other usability information for the building's rooms and optionally for the overall building, and to subsequently using the assessed usability information in one or more further automated manners); which is incorporated herein by reference in its entirety.

Figure 2P:
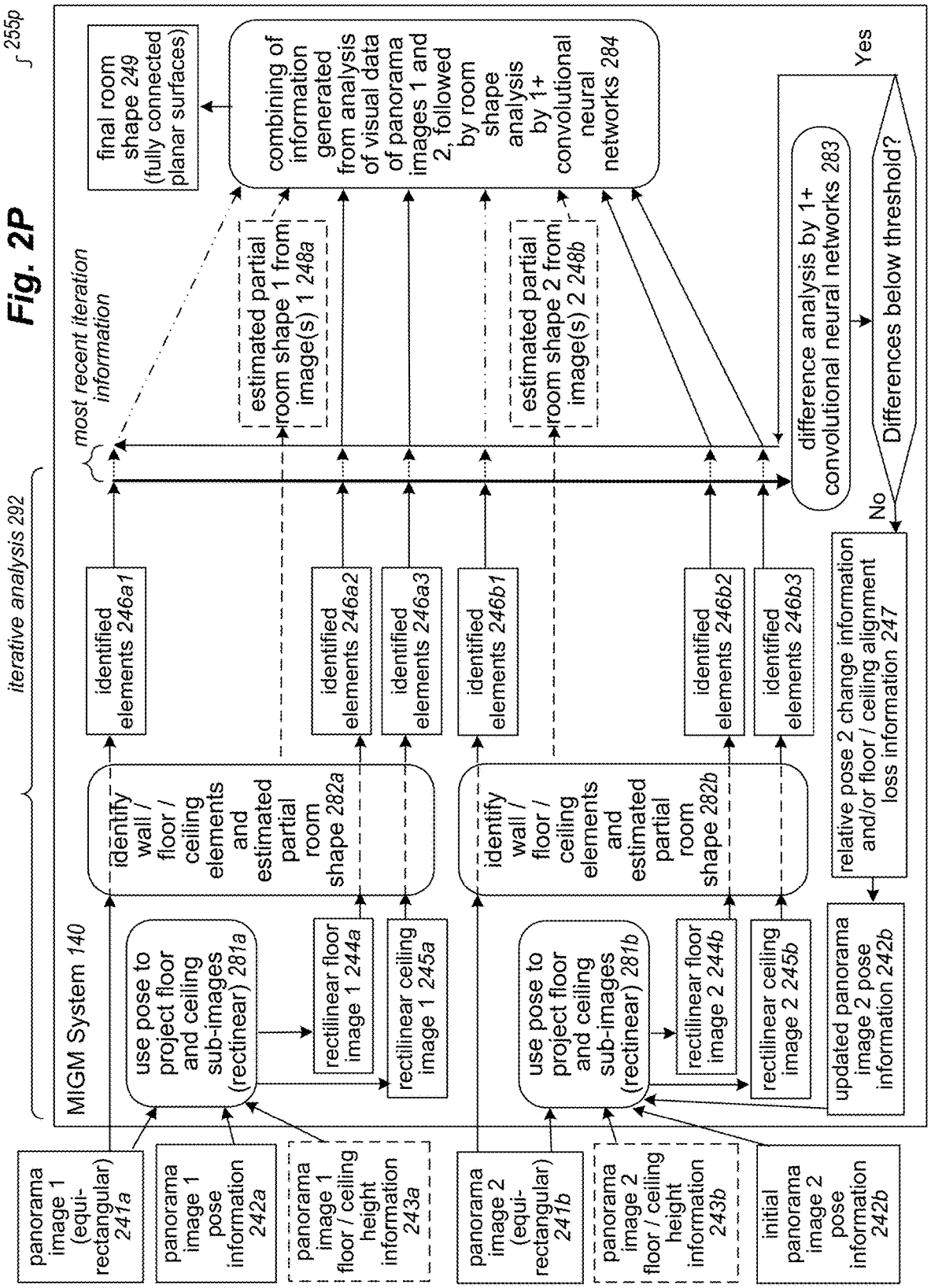

FIGS. 2P-2V continue the examples of FIGS. 2A through 2-0, with FIG. 2P illustrating further information 255p that shows an example flow of information processing during automated operations of the MIGM system in at least some embodiments, including a portion 292 that is performed repeatedly as part of an iterative refinement of the alignment of visual data in multiple target images. In particular, in the example of FIG. 2P, two panorama images are captured in a particular room (not shown), such as at acquisition locations 210D and 210F in bedroom 1 of the example house 198 of FIG. 1B—in this example, the two panorama images are each in an equirectangular format, and are labeled as panorama image 1 241a and panorama image 2 241b in the example of FIG. 2P. In this example, the automated operations of the MIGM system also use an initial estimated pose information for each of the panorama images as input, including initial pose information 242a for panorama image 1 241a and an initial pose information 242b for panorama image 2 241b, and optionally with height information of the image acquisition device at the time of capturing each of the two panorama images also provided as input, including height information 243a for panorama image 1 241a and height information 243b for panorama image 2 241b-such height information may be expressed in various manners, such as a relative distance between the floor and ceiling, an absolute distance from the floor and/or from the ceiling, etc. In this example, panorama image 1 241a is chosen as a first/reference image, with panorama image 2 241b subsequently having its initial pose information adjusted to reflect the pose information for panorama image 1 241a as part of the iterative analysis 292.

In particular, the MIGM system 140 of FIG. 2P receives the information 241, 242 and optionally 243 as input, and performs processing 281a to analyze the panorama image 1 information (information 241a, 242a and optionally 243a), including to use the initial pose information 242a to project two rectilinear perspective images in this example that each includes a subset of the visual data of the panorama image 1, including rectilinear floor image 1 244a and rectilinear ceiling image 1 245a, and to further optionally scale and/or rotate the visual data in one or both of the two rectilinear images so that corresponding elements in the two rectilinear images are the same size (e.g., when the camera height information indicates that the image acquisition device was closer to the floor or to the ceiling, to reduce the size of that closer surface to correspond to the size of the father surface) and at the same degree of rotation to assist in subsequent comparison and difference analysis. If height information 243a is not available as input to use in scaling the rectilinear image(s), the automated operations may further in some embodiments obtain corresponding information in other manners that is uses for the scaling activities, such as via an analysis of the visual data of the panorama image 1 and/or based at least in part on input from one or more users (not shown). The processing for the information for panorama image 1 further includes performing processing 282a to analyze panorama image 1 and the rectilinear floor and ceiling images 1 to identify structural elements of the walls and floor and ceiling (e.g., 2D elements) and to determine locations of those identified elements in those images' visual data, such as with respect to an estimated partial room shape determined in the processing 282a for the room based on the information for panorama image 1, resulting in identified element information 246a1 for panorama image 1, identified element information 246a2 for floor image 1, and identified element information 246a3 for ceiling image 1, as well as an estimated partial room shape 1 248a. The processing 282a may include, for example, use of one or more trained neural networks (not shown) to identify the elements and/or to determine their locations and/or to estimate the partial room shape, as discussed in greater detail elsewhere herein. In a manner similar to that of processing 281a and 282a for the information for panorama image 1, the automated operations of the MIGM system further performs processing 281b and 282b for the information for panorama image 2 to produce identified element information 246b1 for panorama image 2, identified element information 246b2 for rectilinear floor image 2 244b, and identified element information 246b3 for rectilinear ceiling image 2 245b, as well as an estimated partial room shape 2 248b, with the initial pose information 242b used to project those two rectilinear perspective images in this example to each include a subset of the visual data of the panorama image 2 and to further optionally scale and/or rotate the visual data in one or both of those two rectilinear images so that corresponding elements in the two rectilinear images are the same size and at the same degree of rotation.

After the various identified element information 246 is generated, the automated operations of the MIGM system further perform processing 283 to analyze differences between the information 246 generated from the visual data of the two panorama images (including from the rectilinear perspective images generated from those panorama images to include a subset of their visual data). In at least some embodiments, the difference analysis includes identifying differences in the identified element location information, such as to determine offsets in the projected locations of the elements. In addition, in at least some embodiments, the difference analysis includes determining differences in layouts of corresponding areas of the room, such as a loss measurement of differences in alignment of the floor and/or ceiling layout, whether in addition to or instead of the identified element location difference determination. The processing 283 may include, for example, use of one or more trained convolutional neural networks (not shown), as discussed in greater detail elsewhere herein. After that difference analysis, the automated operations continue to determine if that difference information is below a defined threshold or otherwise satisfies one or more defined criteria, and if not proceeds to generate updated pose information 242b for the panorama image 2 to use in a next iteration of the analysis 292, such as using relative difference information 247 with respect to that of the panorama image 1 pose information 242a and/or using information 247 about alignment loss information from the floor/ceiling alignment. In at least some embodiments, the updated pose information for panorama image 2 may be generated based at least in part on change or delta information in three degrees of freedom (e.g., location or orientation) or six degrees of freedom (location and orientation) between the identified element locations from the panorama image 1 visual data and the identified element locations from the panorama image 2 visual data, such as if the difference analysis is based at least in part on the identified element locations. In addition, in at least some embodiments, the updated pose information may be generated based at least in part on alignment loss information if the difference analysis is based at least in part on the floor/ceiling alignment loss (whether in addition to or instead of the identified element location differences), such as to modify the layout of the corresponding areas (e.g., floor and/or ceiling) in one or more of the images 2 (e.g., floor image 2 and/or ceiling image 2) to reflect those areas of the images 1 (e.g., floor image 1 and/or ceiling image 1), and to update or otherwise adjust the pose information 242b to produce the modified layout for the corresponding areas. After the updated pose information 242b is available, a next iteration begins of analyzing at least the information from panorama image 2, such as by performing processing 281b to protect new rectilinear floor and ceiling images 244b and 245b using the updated pose information 242b, and then proceeding with processing 282b and 283 using those new rectilinear images, with the process continuing until the panorama image 2 pose information is eventually updated to produce difference information that is below a defined threshold. The results of the updating of the pose information may be thought of as shifting the center of the new projected floor and ceiling images.

Once it is determined that the difference information from the analysis 283 is below the defined threshold, the automated operations of the MIGM system instead include proceeding to perform processing 284 to analyze combined information from the visual data of both panorama image 1 and panorama image 2 in order to generate a final room shape 249 for the room in which the two panorama images were captured, such as a fully closed three-dimensional shape with planar surfaces to represent each of the room walls and to represent the room floor and ceiling (e.g., with one or more planar surfaces for each wall, and with one or more planar surfaces for each of the floor and ceiling). As part of the processing 284, output from the most recent iteration of the processing 282b (e.g., the last of multiple iterations) and from the most recent iteration of the processing 282a (e.g., a first iteration, if the processing 282a is not repeated during the additional iterations) may be obtained and used, such as the identified element location information 246, and optionally estimated partial room shapes 248a and 248b from the visual data of panorama images 1 and 2, respectively. In some embodiments and situations, the processing 284 may be supplemented or replaced by input provided from one or more users, such as input in which the one or more users blend or otherwise combine estimated partial room shapes 248a and 248b in order to generate the final room shape 249.

While the example processing of FIG. 2P is shown for only a single room and using only two panorama images captured in that room, it will be appreciated that similar processing can be performed for multiple rooms (each room of a multi-room building), and can be performed for more than two panorama images, such as for N panorama images and with panorama images 2-N each having a respective processing 281b-281N and processing 282b-282N being performed, and with the difference analysis and pose information updating being performed separately for each of the panorama images 2-N until some or all of the panorama images 2-N have updated pose information that produces difference information between that panorama image and the first/reference panorama image 1 that is below the defined threshold, at which time the information from the analysis of the visual data of all of those panorama images is combined and used for the processing 284 to generate the final room shape 249 for that room.

Figure 2Q:
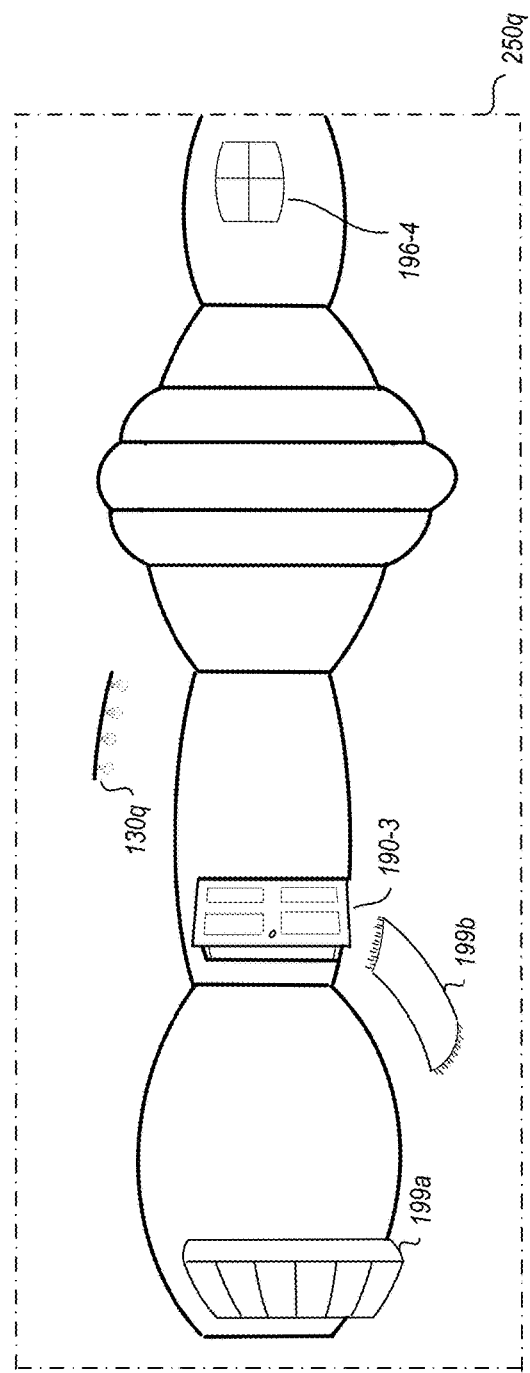
Figure 2S:
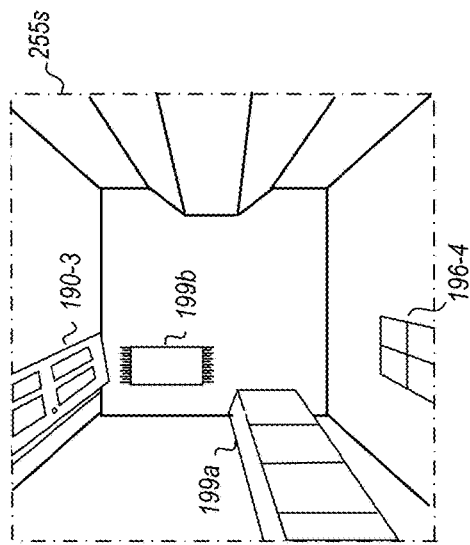
Figure 2R:
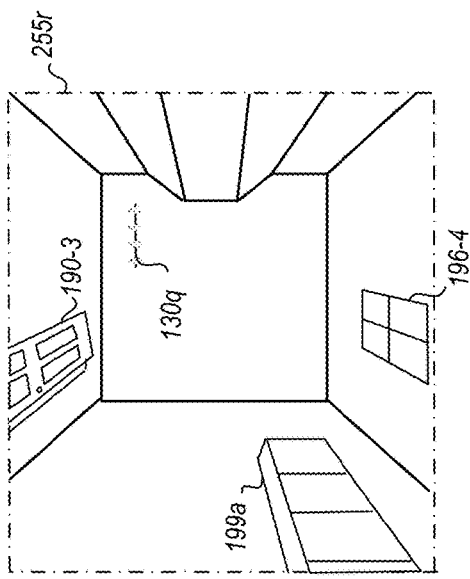

FIGS. 2Q-2S continue the example of FIG. 2P, with FIG. 2Q illustrating an example of a target panorama image 250q (e.g., panorama image 1 of FIG. 2P) that is acquired at a first acquisition location in bedroom 1 (e.g., acquisition location 210D of FIG. 1B), and which in this example is a 360° panorama image that is shown in FIG. 2Q using a spherical format to simultaneously show all visual content of the target panorama image. As is illustrated, the visual data of the target panorama image 250*q* includes visual representations of a doorway 190-3, ceiling lighting 130*q*, a window 196-4, a bookcase 199*a*, and a rug 199*b*, as well as other parts of bedroom 1—in this example, the eastern wall of the room includes multiple planar surfaces, with a protrusion in the middle of the eastern wall extending into the room. FIGS. 2R and 2S continue the example of FIG. 2Q, and illustrate example rectilinear perspective images 255*r* and 255*s*, respectively, such as may be projected from the target panorama image 250*q* of FIG. 2Q using pose information for the capture of that target panorama image, optionally after scaling and/or rotating. In this example, image 255*r* of FIG. 2R is an example ceiling image (e.g., corresponding to ceiling image 1 245*a* of FIG. 2P), and includes visual data showing the ceiling lights 130*q*, as well as the window 196-4, and portions of the bookcase 199*a* and doorway 190-3. In an analogous manner, image 255*s* of FIG. 2S is an example floor image (e.g., corresponding to floor image 1 244*a* of FIG. 2P), and includes visual data showing the rug 199*b*, as well as portions of the window 196-4, bookcase 199*a* and doorway 190-3.

FIG. 2T continues the examples of FIGS. 2P-2S, and illustrates an additional second example target panorama image 250*t* (e.g., panorama image 2 of FIG. 2P) that is acquired at a second acquisition location in bedroom 1 (e.g., acquisition location 210F of FIG. 1B), and which in this example is another 360° panorama image that shown in FIG. 2T using a spherical format to simultaneously show all visual content of the target panorama image. As is illustrated, the visual data of the second target panorama image 250*t* illustrates similar information to that of the first target panorama image 250*q*, but with the different acquisition location of the second target panorama image 250*t* causing some differences relative to that of the first target panorama image 250*q* (e.g., to show more of the southwest corner of the room that was partially blocked in the first target panorama image 250*q* by the bookcase 199*a*). FIG. 2T further illustrates an additional example rectilinear perspective image 255*t*, such as may be projected from the second target panorama image 250*t* using pose information for the capture of that target panorama image, optionally after scaling and/or rotating, and in this example is a second floor image for bedroom 1 (e.g., corresponding to floor image 2 244*b* of FIG. 2P)—while a second ceiling image projected from the second target panorama image 250*t* is not shown in this example, such a second ceiling image (e.g., corresponding to ceiling image 2 245*b* of FIG. 2P) could similarly be generated and used in a manner similar to that discussed with respect to FIGS. 2U-2V.

In particular, FIGS. 2U and 2V continue the examples of FIGS. 2P-2T, and illustrate difference information that may be determined between the visual data of two floor images generated from two different target panorama images captured in the same room. In particular, FIG. 2U includes information 255*u* that shows floor image 255*s* of FIG. 2S, with some additional information from floor image 255*t* of FIG. 2T overlaid on the floor image 255*s* using dotted lines to illustrate non-exclusive examples of alignment differences corresponding to different identified element locations. For example, in the example information 255*u*, the rug 199*b* may have location offsets 234*a* for one or more parts of the road in the visual data of the two projected floor images, such as in this example to correspond to the west and east sides of the rug, and optionally to reflect that the location and/or shape of the rug in one of the projected rectilinear floor images differs from that in the other projected rectilinear floor image. Similarly, while the southwest corner of the floor in the two projected rectilinear floor images may be aligned 235, the northeast and northwest corners of the floors in the two projected rectilinear floor images differ by offsets 234*b*, such as to reflect differences in the locations of those corners and/or shapes of the floor in those two floor images. Similarly, other identified element location differences may occur for borders between walls or for other identified elements, such as offset information 234*c* shown for an inter-wall section border that is part of the eastern wall of bedroom 1. It will be appreciated that similar location difference information may be determined for all of the elements identified in the two rectilinear floor images, with similar location difference information able to be determined in the visual data of two rectilinear ceiling images projected from two different target panorama images and/or in the visual data of the two different target panorama images themselves. In addition, in embodiments and situations in which loss information is determined between layouts of areas in the room such as the floor and/or the ceiling, offset information such as for offsets 234*b* and other differences in the layouts of the floor between the two projected rectilinear floor images may be determined, with the floor layout in the second floor image being subsequently modified to reduce or eliminate the differences with the floor layout in the first floor image, and with that modified layout in the second floor image used to determine new adjusted second pose information to use with the second target panorama image in a next analysis iteration.

FIG. 2V includes information 255*v* that is similar to that of FIG. 2U, and again shows floor image 255*s* of FIG. 2T, but with the additional information shown in FIG. 2V using the dotted lines being from an updated second rectilinear floor image (not shown) that is projected from the second target panorama image using updated pose information after the difference analysis discussed with respect to FIG. 2U. In this example, differences such as with respect to offsets 234*a*, 234*b* and/or 234*c* are reduced or eliminated in FIG. 2V relative to that of FIG. 2U, based on the updated second pose information for the second target panorama image being closer to aligning the visual data of the two target panorama images (e.g., being closer to reflect the actual differences between the locations of acquisition locations 210D and 210F, and to reflect the actual differences, if any, between the orientations of the image acquisition device(s) when capturing the target panorama images at acquisition locations 210D and 210F). It will be appreciated that multiple iterations may be performed to further reduce or eliminate other differences in identified element locations and/or alignment loss from layouts of the floor and/or ceiling (and/or other areas), although example information corresponding to additional iterations is not shown in this example. After a last iteration, the combined aligned visual data of the two target panorama images may be used to generate a 3D room shape for bedroom 1, as discussed in greater detail elsewhere herein.

Various details have been provided with respect to FIGS. 2A-2V, but it will be appreciated that the provided details are non-exclusive examples included for illustrative purposes, and other embodiments may be performed in other manners without some or all such details.

Figure 3:
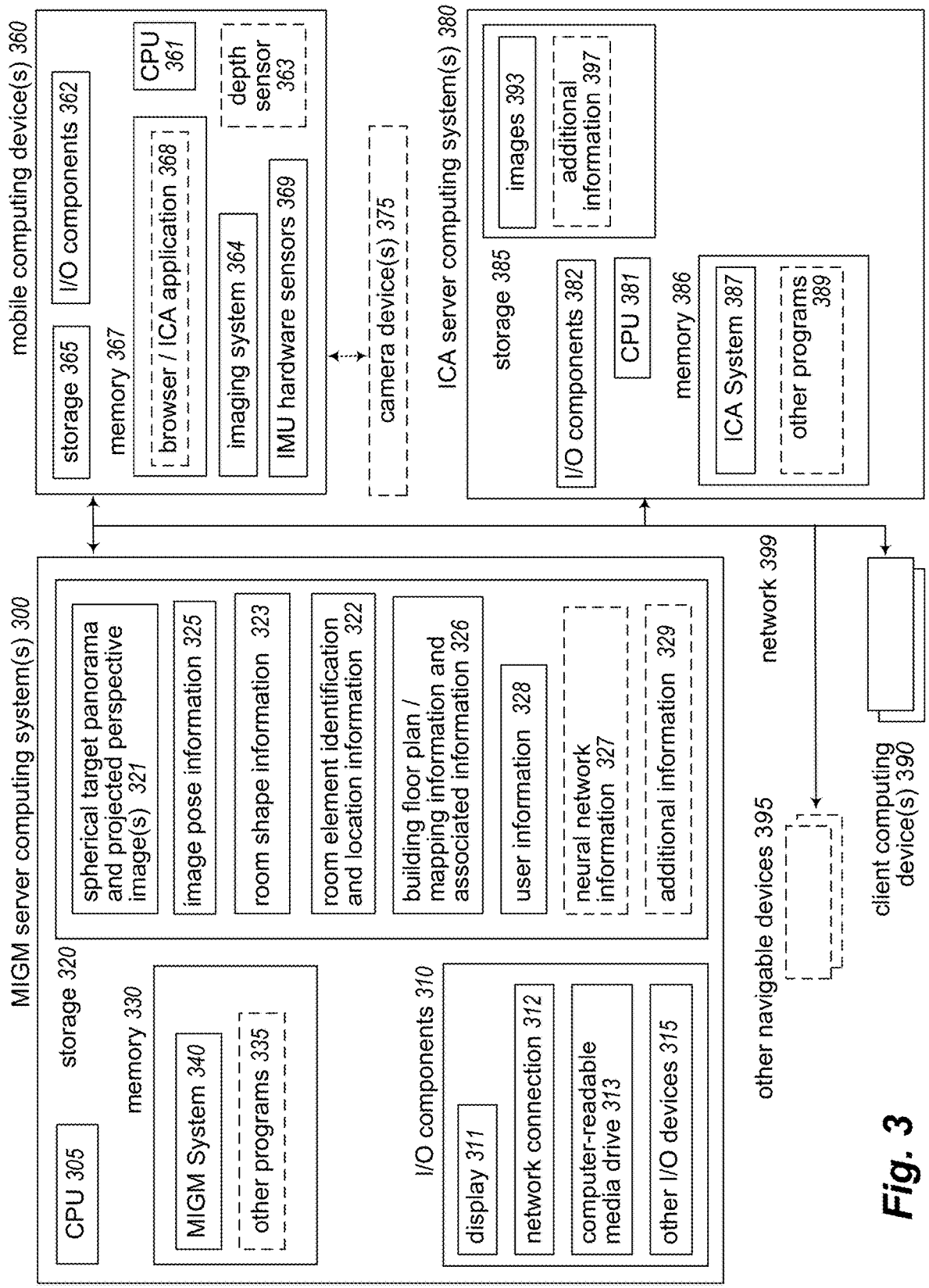
FIG. 3 is a block diagram illustrating computing systems suitable for executing embodiments of one or more systems that perform at least some of the techniques described in the present disclosure.

FIG. 3 is a block diagram illustrating an embodiment of one or more server computing systems 300 executing an implementation of an MIGM system 340, and one or more server computing systems 380 executing an implementation of an ICA system 387—the server computing system(s) and MIGM system may be implemented using a plurality of hardware components that form electronic circuits suitable for and configured to, when in combined operation, perform at least some of the techniques described herein. In the illustrated embodiment, each server computing system 300 includes one or more hardware central processing units ("CPU") or other hardware processors 305, various input/output ("I/O") components 310, storage 320, and memory 330, with the illustrated I/O components including a display 311, a network connection 312, a computer-readable media drive 313, and other I/O devices 315 (e.g., keyboards, mice or other pointing devices, microphones, speakers, GPS receivers, etc.). Each server computing system 380 may include hardware components similar to those of a server computing system 300, including one or more hardware CPU processors 381, various I/O components 382, storage 385 and memory 386, but with some of the details of server 300 being omitted in server 380 for the sake of brevity.

The server computing system(s) 300 and executing MIGM system 340 may communicate with other computing systems and devices via one or more networks 399 (e.g., the Internet, one or more cellular telephone networks, etc.), such as user client computing devices 390 (e.g., used to view floor plans, associated images and/or other related information), ICA server computing system(s) 380, one or more mobile computing devices 360, optionally one or more camera devices 375, optionally other navigable devices 395 that receive and use floor plans and/or determined room shapes and optionally other generated information for navigation purposes (e.g., for use by semi-autonomous or fully autonomous vehicles or other devices), and optionally other computing systems that are not shown (e.g., used to store and provide additional information related to buildings; used to capture building interior data; used to store and provide information to client computing devices, such as additional supplemental information associated with images and their encompassing buildings or other surrounding environment; etc.). In some embodiments, some or all of the one or more camera devices 375 may directly communicate (e.g., wirelessly and/or via a cable or other physical connection, and optionally in a peer-to-peer manner) with one or more associated mobile computing devices 360 in their vicinity (e.g., to transmit captured target images, to receive instructions to initiate a target image acquisition, etc.), whether in addition to or instead of performing communications via network 399, and with such associated mobile computing devices 360 able to provide captured target images and optionally other captured data that is received from one or more camera devices 375 over the network 399 to other computing systems and devices (e.g., server computing systems 380 and/or 300).

In the illustrated embodiment, an embodiment of the MIGM system 340 executes in memory 330 in order to perform at least some of the described techniques, such as by using the processor(s) 305 to execute software instructions of the system 340 in a manner that configures the processor(s) 305 and computing system(s) 300 to perform automated operations that implement those described techniques. The illustrated embodiment of the MIGM system may include one or more components, not shown, to each perform portions of the functionality of the MIGM system, and the memory may further optionally execute one or more other programs 335—as one specific example, a copy of the ICA system may execute as one of the other programs 335 in at least some embodiments, such as instead of or in addition to the ICA system 387 on the server computing system(s) 380. The MIGM system 340 may further, during its operation, store and/or retrieve various types of data on storage 320 (e.g., in one or more databases or other data structures), such as information 321 about target panorama images (e.g., acquired by one or more camera devices 375) and associated projected rectilinear perspective images, information 325 about determined acquisition pose information for the target panorama images (optionally including both initial and updated pose information), information 322 about identified elements and their determined locations for the images 321 (e.g., as generated by the MIGM system during its automated operations), information 323 about determined 3D final room shapes for rooms from the visual data of the target images and optionally intermediate estimated partial room shapes (e.g., as generated by the MIGM system during its automated operations), various types of floor plan information and other building mapping information 326 (e.g., generated and saved 2D floor plans with 2D room shapes and positions of wall elements and other elements on those floor plans and optionally additional information such as building and room dimensions for use with associated floor plans, existing images with specified positions, annotation information, etc.; generated and saved 2.5D and/or 3D model floor plans that are similar to the 2D floor plans but further include height information and 3D room shapes; etc.), user information 328 about users of client computing devices 390 and/or operator users of mobile devices 360 who interact with the MIGM system, optionally training data for use with one or more convolutional neural networks and/or the resulting trained neural networks 327, and optionally various other types of additional information 329. The ICA system 387 may similarly store and/or retrieve various types of data on storage 385 (e.g., in one or more databases or other data structures) during its operation and provide some or all such information to the MIGM system 340 for its use (whether in a push and/or pull manner), such as images 393 (e.g., 360° target panorama images acquired by one or more camera devices 375 and transferred to the server computing systems 380 by those camera devices and/or by one or more intermediate associated mobile computing devices 360), and optionally various types of additional information 397 (e.g., various analytical information related to presentation or other use of one or more building interiors or other environments captured by an ICA system).

Some or all of the user client computing devices 390 (e.g., mobile devices), mobile computing devices 360, camera devices 375, other navigable devices 395 and other computing systems may similarly include some or all of the same types of components illustrated for server computing systems 300 and 380. As one non-limiting example, the mobile computing devices 360 are each shown to include one or more hardware CPU(s) 361, I/O components 362, storage 365, imaging system 364, IMU hardware sensors 369, optionally depth sensors 363, and memory 367, with one or both of a browser and one or more client applications 368 (e.g., an application specific to the MIGM system and/or ICA system) optionally executing within memory 367, such as to participate in communication with the MIGM system 340, ICA system 387, associated camera devices 375 and/or other computing systems. While particular components are not illustrated for the other navigable devices 395 or client computing systems 390, it will be appreciated that they may include similar and/or additional components.

It will also be appreciated that computing systems 300 and 380 and camera devices 375 and the other systems and devices included within FIG. 3 are merely illustrative and are not intended to limit the scope of the present invention. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, camera devices and accessories, and various other consumer products that include appropriate communication capabilities. In addition, the functionality provided by the illustrated MIGM system 340 may in some embodiments be distributed in various components, some of the described functionality of the MIGM system 340 may not be provided, and/or other additional functionality may be provided.

It will also be appreciated that, while various items are illustrated as being stored in memory or on storage while being used, these items or portions of them may be transferred between memory and other storage devices for purposes of memory management and data integrity. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the MIGM system 340 executing on server computing systems 300) and/or data structures, such as by execution of software instructions of the one or more software programs and/or by storage of such software instructions and/or data structures, and such as to perform algorithms as described in the flow charts and other disclosure herein. Furthermore, in some embodiments, some or all of the systems and/or components may be implemented or provided in other manners, such as by consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

FIG. 4 illustrates an example flow diagram of an embodiment of an ICA System routine 400. The routine may be performed by, for example, the ICA System 160 of FIG. 1A, the ICA System 387 of FIG. 3, and/or an ICA system as otherwise described herein, such as to acquire 360° target panorama images and/or other images within buildings or other structures (e.g., for use in subsequent generation of related floor plans and/or other mapping information, such as by an embodiment of an MIGM system routine, with one example of such a routine illustrated with respect to FIGS. 5A-5C; for use in subsequent determination of acquisition locations and optionally acquisition orientations of the target images; etc.). While portions of the example routine 400 are discussed with respect to acquiring particular types of images at particular locations, it will be appreciated that this or a similar routine may be used to acquire video or other data (e.g., audio) and/or other types of images that are not panoramic, whether instead of or in addition to such panorama images. In addition, while the illustrated embodiment acquires and uses information from the interior of a target building, it will be appreciated that other embodiments may perform similar techniques for other types of data, including for non-building structures and/or for information external to one or more target buildings of interest. Furthermore, some or all of the routine may be executed on a mobile device used by a user to participate in acquiring image information and/or related additional data, and/or by a system remote from such a mobile device.

The illustrated embodiment of the routine begins at block 405, where instructions or information are received. At block 410, the routine determines whether the received instructions or information indicate to acquire data representing a building (e.g., in the building interior), and if not continues to block 490. Otherwise, the routine proceeds to block 412 to receive an indication (e.g., from a user of a mobile computing device associated with one or more camera devices) to begin the image acquisition process at a first acquisition location. After block 412, the routine proceeds to block 415 in order to perform acquisition location image acquisition activities in order to acquire at least one 360° panorama image by at least one camera device (and optionally one or more additional images and/or other additional data by the mobile computing device, such as from IMU sensors and/or depth sensors) for the acquisition location at the target building of interest, such as to provide horizontal coverage of at least 360° around a vertical axis. The routine may also optionally obtain annotation and/or other information from a user regarding the acquisition location and/or the surrounding environment, such as for later use in presentation of information regarding that acquisition location and/or surrounding environment.

After block 415 is completed, the routine continues to block 425 to determine if there are more acquisition locations at which to acquire images, such as based on corresponding information provided by the user of the mobile computing device and/or to satisfy specified criteria (e.g., at least two panorama images to be captured in each of some or all rooms of the target building and/or in each of one or more areas external to the target building). If so, the routine continues to block 427 to optionally initiate the capture of linking information (such as visual data, acceleration data from one or more IMU sensors, etc.) during movement of the mobile device along a travel path away from the current acquisition location and towards a next acquisition location for the building. As described elsewhere herein, the captured linking information may include additional sensor data (e.g., from one or more IMU, or inertial measurement units, on the mobile computing device or otherwise carried by the user) and/or additional visual information (e.g., panorama images, other types of images, panoramic or non-panoramic video, etc.) recorded during such movement, and in some embodiments may be analyzed to determine a changing pose (location and orientation) of the mobile computing device during the movement, as well as information about a room shape of the enclosing room (or other area) and the path of the mobile computing device during the movement. Initiating the capture of such linking information may be performed in response to an explicit indication from a user of the mobile computing device or based on one or more automated analyses of information recorded from the mobile computing device. In addition, the routine in some embodiments may further optionally determine and provide one or more guidance cues to the user regarding the motion of the mobile device, quality of the sensor data and/or visual information being captured during movement to the next acquisition location (e.g., by monitoring the movement of the mobile device), including information about associated lighting/environmental conditions, advisability of capturing a next acquisition location, and any other suitable aspects of capturing the linking information. Similarly, the routine may optionally obtain annotation and/or other information from the user regarding the travel path, such as for later use in presentation of information regarding that travel path or a resulting inter-panorama image connection link. In block 429, the routine then determines that the mobile computing device (and one or more associated camera devices) arrived at the next acquisition location (e.g., based on an indication from the user, based on the forward movement of the user stopping for at least a predefined amount of time, etc.), for use as the new current acquisition location, and returns to block 415 in order to perform the image acquisition activities for the new current acquisition location.

If it is instead determined in block 425 that there are not any more acquisition locations at which to acquire image information for the current building or other structure, the routine proceeds to block 430 to optionally analyze the acquisition position information for the building or other structure, such as to identify possible additional coverage (and/or other information) to acquire within the building interior or otherwise associated with the building. For example, the ICA system may provide one or more notifications to the user regarding the information acquired during capture of the multiple acquisition locations and optionally corresponding linking information, such as if it determines that one or more segments of the recorded information are of insufficient or undesirable quality, or do not appear to provide complete coverage of the building. In addition, in at least some embodiments, if minimum criteria for images (e.g., a minimum quantity and/or type of images) have not been satisfied by the captured images (e.g., at least two panorama images in each room, panorama images within a maximum specified distance of each other, etc.), the ICA system may prompt or direct the acquisition of additional panorama images to satisfy such criteria. After block 430, the routine continues to block 435 to optionally preprocess the acquired 360° target panorama images before their subsequent use for generating related mapping information (e.g., to place them in a spherical format, to determine vanishing lines and vanishing points for the images, etc.). In block 480, the images and any associated generated or obtained information is stored for later use.

If it is instead determined in block 410 that the instructions or other information recited in block 405 are not to acquire images and other data representing a building, the routine continues instead to block 490 to perform any other indicated operations as appropriate, such as any housekeeping tasks, to configure parameters to be used in various operations of the system (e.g., based at least in part on information specified by a user of the system, such as a user of a mobile device who captures one or more building interiors, an operator user of the ICA system, etc.), to obtain and store other information about users of the system, to respond to requests for generated and stored information, etc.

Following blocks 480 or 490, the routine proceeds to block 495 to determine whether to continue, such as until an explicit indication to terminate is received, or instead only if an explicit indication to continue is received. If it is determined to continue, the routine returns to block 405 to await additional instructions or information, and if not proceeds to step 499 and ends.

FIGS. 5A-5C illustrate an example embodiment of a flow diagram for a Mapping Information Generation Manager (MIGM) System routine 500. The routine may be performed by, for example, execution of the MIGM system 140 of FIG. 1A, the MIGM system 340 of FIG. 3, and/or an MIGM system as described elsewhere herein, such as to determine a room shape for a room (or other defined area) by analyzing and combining information from multiple panorama images acquired in the room, to generate a floor plan for a building or other defined area based at least in part on one or more images of the area and optionally additional data captured by a mobile computing device, and/or to generate other mapping information for a building or other defined area based at least in part on one or more images of the area and optionally additional data captured by a mobile computing device. In the example of FIGS. 5A-5C, the determined room shape for a room is a 3D fully closed combination of planar surfaces to represent the walls and ceiling and floor of the room, and the generated mapping information for a building (e.g., a house) includes a 2D floor plan and/or 3D computer model floor plan, but in other embodiments, other types of room shapes and/or mapping information may be generated and used in other manners, including for other types of structures and defined areas, as discussed elsewhere herein.

The illustrated embodiment of the routine begins at block 505, where information or instructions are received. The routine continues to block 510 to determine whether image information is already available to be analyzed for one or more rooms (e.g., for some or all of an indicated building), or if such image information instead is to be currently acquired. If it is determined in block 510 to currently acquire some or all of the image information, the routine continues to block 512 to acquire such information, optionally waiting for one or more users or devices to move throughout one or more rooms of a building and acquire panoramas or other images at one or more acquisition locations in one or more of the rooms (e.g., at multiple acquisition locations in each room of the building), optionally along with metadata information regarding the acquisition and/or interconnection information related to movement between acquisition locations, as discussed in greater detail elsewhere herein—FIG. 4 provides one example embodiment of an ICA system routine for performing such image acquisition. If it is instead determined in block 510 not to currently acquire the images, the routine continues instead to block 515 to obtain existing panoramas or other images from one or more acquisition locations in one or more rooms (e.g., at multiple acquisition locations in each room of a building), optionally along with metadata information regarding the acquisition and/or interconnection information related to movement between the acquisition locations, such as may in some situations have been supplied in block 505 along with the corresponding instructions.

After blocks 512 or 515, the routine continues to block 520, where it determines whether to generate a linked set of target panorama images (or other images) for a building or other group of rooms, and if so continues to block 525. The routine in block 525 selects pairs of at least some of the images (e.g., based on the images of a pair having overlapping visual content), and determines, for each pair, relative directions between the images of the pair based on shared visual content and/or on other captured linking interconnection information (e.g., movement information) related to the images of the pair (whether movement directly from the acquisition location for one image of a pair to the acquisition location of another image of the pair, or instead movement between those starting and ending acquisition locations via one or more other intermediary acquisition locations of other images). The routine in block 525 further uses at least the relative direction information for the pairs of images to determine global relative positions of some or all of the images to each other in a common coordinate system, such as to create a virtual tour from which an end user may move from any one of the images to one or more other images to which that starting image is linked (e.g., via selection of user-selectable controls displayed for an image for each such other linked image), and similarly move from that next image to one or more additional images to which that next image is linked, etc. Additional details are included elsewhere herein regarding creating such a linked set of images.

After block 525, or if it is instead determined in block 520 that the instructions or other information received in block 505 are not to determine a linked set of images, the routine continues to block 530 to determine whether the instructions received in block 505 indicate to determine the shape of one or more rooms from previously or currently acquired images in the rooms (e.g., from multiple panorama images acquired in each of the rooms) without generating additional mapping-related information for the building(s) in which the room(s) are located, and if so continues to block 543. Otherwise, the routine continues to block 535 to determine whether the instructions received in block 505 indicate to generate a floor plan and optionally other mapping information for an indicated building, and if so the routine continues to perform blocks 537-585 to do so, and otherwise continues to block 590.

In block 537, the routine optionally obtains additional information about the building, such as from activities performed during acquisition and optionally analysis of the images, and/or from one or more external sources (e.g., online databases, information provided by one or more end users, etc.)—such additional information may include, for example, exterior dimensions and/or shape of the building, additional images and/or annotation information acquired corresponding to particular locations within the building (optionally for locations different from acquisition locations of the acquired panorama or other images), additional images and/or annotation information acquired corresponding to particular locations external to the building (e.g., surrounding the building and/or for other structures on the same property), etc.

After block 537, the routine continues to block 540 to determine whether to generate room shapes of rooms enclosing acquired images of a building for use in generating a floor plan for the building, and if not (e.g., if room shape information is already available for the rooms of the building) continues to block 570. Otherwise, if it is determined in block 540 to determine room shapes for generating a floor plan for the building, or in block 530 to determine one or more room shapes from acquired images without generating other mapping-related information, the routine continues to perform blocks 543-565 to generate the room shapes for one or more rooms.

In particular, the routine in block 543 proceeds to select the next room (beginning with the first) for which spherical panorama images acquired in the room are available, to determine initial pose information for each of those panorama images (e.g., as supplied with acquisition metadata for the panorama image), and to optionally obtain additional metadata for each panorama image (e.g., acquisition height information of the camera device or other image acquisition device used to acquire a panorama image relative to the floor and/or the ceiling). After block 543, the routine continues to block 545 where the routine, for each panorama image, uses the current pose information for the panorama image and optionally additional metadata to project one or more perspective images that are subsets of the panorama image, such as one or both of a floor view and a ceiling view for the room in which the panorama image was acquired. After block 545, the routine continues to block 547 where the routine, for each panorama image, analyzes the panorama image and its projected perspective images to identify locations of wall and floor and ceiling elements, as well as to determine an estimated room shape for the room based on the visual data of those images. The analysis of the visual data of a panorama image acquired in a room may include identifying wall structural elements features of that room (e.g., windows, doorways and stairways and other inter-room wall openings and connecting passages, wall borders between a wall and another wall and/or receiving and/or a floor, etc.) and determining positions of those identified features within the determined room shape of the room, optionally by generating a 3D point cloud of some or all of the room walls and optionally the ceiling and/or floor (e.g., by analyzing at least visual data of the panorama image and optionally additional data captured by an image acquisition device or associated mobile computing device, such as using one or more of SfM or SLAM or MVS analysis). Additional details are included elsewhere herein regarding determining room shapes and identifying additional information for the rooms, including initial estimated acquisition pose information for images acquired in the rooms.

After block 547, the routine continues to block 550, where it determines whether to identify differences between the visual data of the different panorama images (including their perspective image subsets) based on differences in identified element locations or based on differences in layouts of the floor and/or ceiling alignments (e.g., using differentiable rendering operations)—while the illustrated embodiment of the routine uses only one of the types of difference information at a time, other embodiments may use both types of difference information, whether simultaneously or serially. If it is determined in block 550 to use element location information, the routine continues to block 553, where it analyzes differences in the identified element locations generated from the first/reference panorama image's visual data (including the one or more perspective image subsets for the first panorama image) and from the one or more other second panorama image's visual data (including the one or more perspective image subsets for each second panorama image), such as by using one or more convolutional neural networks. If it is instead determined in block 550 to use floor/ceiling alignment information, the routine continues instead to block 557, where it analyzes differences in the layouts of the floor and/or ceiling generated from the first/reference panorama image's visual data (including the one or more perspective image subsets for the first panorama image) and from the visual data of the one or more other second panorama images (including the one or more perspective image subsets for each second panorama image), such as by using one or more convolutional neural networks. After blocks 553 or 557, the routine continues to block 560, where it determines whether the determined difference (e.g., an aggregation of multiple individual types of differences) is below a defined threshold (or otherwise satisfies one or more defined criteria), and if not continues to block 563, where it uses the difference information to update the pose information for the one or more other second panorama images relative to the pose information for the first panorama image, and returns to block 545. Otherwise, the routine continues to block 565, where it combines the current information generated from the first and second panorama images (such as the identified element locations and optionally estimated room shapes), and analyzes that combined information to generate a final room shape for the room, such as by using one or more convolutional neural networks. After block 565, the routine continues to block 567, where it determines whether there are more rooms for which to determine room shapes based on panorama images acquired in those rooms, and if so returns to block 543.

If it is instead determined in block 567 that there are not more rooms for which to generate room shapes, or in block 540 to not determine room shapes, the routine continues to block 570 to determine whether to further generate a floor plan for the building (e.g., based at least in part on the determined room shapes from blocks 543-565, and optionally further information regarding how to position the determined room shapes relative to each other). If not, such as when determining only room shapes without generating further mapping information for a building, the routine continues to block 588. Otherwise, the routine continues to block 575 to retrieve room shapes (e.g., room shapes generated in block 565) or otherwise obtain room shapes (e.g., based on human-supplied input) for rooms of the building, whether 2D or 3D room shapes, and then continues to block 577. In block 577, the routine uses the room shapes to create an initial 2D floor plan, such as by using wall location information for a 3D room shape to determine a corresponding 2D room shape, by connecting inter-room passages in their respective rooms, by optionally positioning room shapes around determined acquisition locations of the target images (e.g., if the acquisition location positions are interconnected), and by optionally applying one or more constraints or optimizations. Such a floor plan may include, for example, relative position and shape information for the various rooms without providing any actual dimension information for the individual rooms or building as a whole, and may further include multiple linked or associated sub-maps (e.g., to reflect different stories, levels, sections, etc.) of the building. The routine further associates positions of the doors, wall openings and other identified wall elements on the floor plan. After block 577, the routine optionally performs one or more steps 580-583 to determine and associate additional information with the floor plan. In block 580, the routine optionally estimates the dimensions of some or all of the rooms, such as from analysis of images and/or their acquisition metadata or from overall dimension information obtained for the exterior of the building, and associates the estimated dimensions with the floor plan—it will be appreciated that if sufficiently detailed dimension information were available, architectural drawings, blue prints, etc. may be generated from the floor plan. After block 580, the routine continues to block 583 to optionally associate further information with the floor plan (e.g., with particular rooms or other locations within the building), such as additional existing images with specified positions and/or annotation information. In block 585, if the room shapes from block 575 are not 3D room shapes, the routine further estimates heights of walls in some or all rooms, such as from analysis of images and optionally sizes of known objects in the images, as well as height information about a camera when the images were acquired, and uses that height information to generate 3D room shapes for the rooms—the routine further uses the 3D room shapes (whether from block 575 or block 585) to generate a 3D computer model floor plan of the building, with the 2D and 3D floor plans being associated with each other.

After block 585, or if it is instead determined in block 570 not to determine a floor plan, the routine continues to block 588 to store the determined room shape(s) and/or generated mapping information and/or other generated information, and to optionally further use some or all of the determined and generated information, such as to provide the generated 2D floor plan and/or 3D computer model floor plan for display on one or more client devices and/or to one or more other devices for use in automating navigation of those devices and/or associated vehicles or other entities, to similarly provide and use information about determined room shapes and/or a linked set of panorama images and/or about additional information determined about contents of rooms and/or passages between rooms, etc.

If it is instead determined in block 535 that the information or instructions received in block 505 are not to generate mapping information for an indicated building, the routine continues instead to block 590 to perform one or more other indicated operations as appropriate. Such other operations may include, for example, receiving and responding to requests for previously generated floor plans and/or previously determined room shapes and/or other generated information (e.g., requests for such information for display on one or more client devices, requests for such information to provide it to one or more other devices for use in automated navigation, etc.), obtaining and storing information about buildings for use in later operations (e.g., information about dimensions, numbers or types of rooms, total square footage, adjacent or nearby other buildings, adjacent or nearby vegetation, exterior images, etc.), etc.

After blocks 588 or 590, the routine continues to block 595 to determine whether to continue, such as until an explicit indication to terminate is received, or instead only if an explicit indication to continue is received. If it is determined to continue, the routine returns to block 505 to wait for and receive additional instructions or information, and otherwise continues to block 599 and ends.

While not illustrated with respect to the automated operations shown in the example embodiment of FIGS. 5A-5C, in some embodiments human users may further assist in facilitating some of the operations of the MIGM system, such as for operator users and/or end users of the MIGM system to provide input of one or more types that is further used in subsequent automated operations. As non-exclusive examples, such human users may provide input of one or more types as follows: to provide input to assist with the linking of a set of images, such as to provide input in block 525 that is used as part of the automated operations for that block (e.g., to specify or adjust initial automatically determined directions between one or more pairs of images, to specify or adjust initial automatically determined final global positions of some or all of the images relative to each other, etc.); to provide input in block 537 that is used as part of subsequent automated operations, such as one or more of the illustrated types of information about the building; to provide input with respect to block 543 that is used as part of subsequent automated operations, such as to specify or adjust initial automatically determined pose information (whether initial pose information or subsequent updated pose information) for one or more of the panorama images, to specify or adjust initial automatically determined information about acquisition height information and/or other metadata for one or more panorama images, etc.; to provide input with respect to block 545 that is used as part of subsequent automated operations, such as to adjust one or more initial automatically determined projected perspective images (e.g., locations of particular elements of the images); to provide input with respect to block 547 that is used as part of subsequent automated operations, such as to specify or adjust initial automatically determined element locations and/or estimated room shapes; to provide input with respect to blocks 553 and/or 557 that is used as part of subsequent automated operations, such as to adjust initial automatically determined information about differences between the visual data of the different panorama images; to provide input with respect to block 563 that is used as part of subsequent automated operations, such as to specify or adjust initial automatically determined information about updated pose information; to provide input with respect to block 565 that is used as part of subsequent operations, such as to manually combine information from multiple estimated room shapes to create a final room shape, to specify or adjust initial automatically determined information about a final room shape, etc.; to provide input with respect to block 577, that is used as part of subsequent operations, such as to specify or adjust initial automatically determined positions of room shapes within a floor plan being generated and/or to specify or adjust initial automatically determined room shapes themselves within such a floor plan; to provide input with respect to one or more of blocks 580 and 583 and 585 that is used as part of subsequent operations, such as to specify or adjust initial automatically determined information of one or more types discussed with respect to those blocks; etc. Additional details are included elsewhere herein regarding embodiments in which one or more human users provide input that is further used in additional automated operations of the MIGM system.

FIG. 6 illustrates an example embodiment of a flow diagram for a Building Map Viewer system routine 600. The routine may be performed by, for example, execution of a map viewer client computing device 175 and its software system(s) (not shown) of FIG. 1A, a client computing device 390 and/or mobile computing device 360 of FIG. 3, and/or a mapping information viewer or presentation system as described elsewhere herein, such as to receive and display determined room shapes and/or other mapping information (e.g., a 2D or 3D floor plan) for a defined area that optionally includes visual indications of one or more determined image acquisition locations, as well as to optionally display additional information (e.g., images) associated with particular locations in the mapping information. In the example of FIG. 6, the presented mapping information is for the interior of a building (such as a house), but in other embodiments, other types of mapping information may be presented for other types of buildings or environments and used in other manners, as discussed elsewhere herein.

The illustrated embodiment of the routine begins at block 605, where instructions or information are received. At block 610, the routine determines whether the received instructions or information indicate to display or otherwise present information representing a building interior, and if not continues to block 690. Otherwise, the routine proceeds to block 612 to retrieve one or more room shapes or a floor plan for a building or other generated mapping information for the building, and optionally indications of associated linked information for the building interior and/or a surrounding location external to the building, and selects an initial view of the retrieved information (e.g., a view of the floor plan, a particular room shape, etc.). In block 615, the routine then displays or otherwise presents the current view of the retrieved information, and waits in block 617 for a user selection. After a user selection in block 617, if it is determined in block 620 that the user selection corresponds to adjusting the current view for a current location (e.g., to change one or more aspects of the current view), the routine continues to block 622 to update the current view in accordance with the user selection, and then returns to block 615 to update the displayed or otherwise presented information accordingly. The user selection and corresponding updating of the current view may include, for example, displaying or otherwise presenting a piece of associated linked information that the user selects (e.g., a particular image associated with a displayed visual indication of a determined acquisition location, such as to overlay the associated linked information over at least some of the previous display), and/or changing how the current view is displayed (e.g., zooming in or out; rotating information if appropriate; selecting a new portion of the floor plan to be displayed or otherwise presented, such as with some or all of the new portion not being previously visible, or instead with the new portion being a subset of the previously visible information; etc.).

If it is instead determined in block 610 that the instructions or other information received in block 605 are not to present information representing a building interior, the routine continues instead to block 690 to perform other indicated operations as appropriate, such as any housekeeping tasks, to configure parameters to be used in various operations of the system (e.g., based at least in part on information specified by a user of the system, such as a user of a mobile device who captures one or more building interiors, an operator user of the MIGM system, etc., including for use in personalizing information display for a particular user in accordance with his/her preferences), to obtain and store other information about users of the system, to respond to requests for generated and stored information, etc.

Following block 690, or if it is determined in block 620 that the user selection does not correspond to the current building area, the routine proceeds to block 695 to determine whether to continue, such as until an explicit indication to terminate is received, or instead only if an explicit indication to continue is received. If it is determined to continue (including if the user made a selection in block 617 related to a new location to present), the routine returns to block 605 to await additional instructions or information (or to continue directly on to block 612 if the user made a selection in block 617 related to a new location to present), and if not proceeds to step 699 and ends.

Aspects of the present disclosure are described herein with reference to flowchart illustrations and/or block diagrams of methods, apparatus (systems), and computer program products according to embodiments of the present disclosure. It will be appreciated that each block of the flowchart illustrations and/or block diagrams, and combinations of blocks in the flowchart illustrations and/or block diagrams, can be implemented by computer readable program instructions. It will be further appreciated that in some implementations the functionality provided by the routines discussed above may be provided in alternative ways, such as being split among more routines or consolidated into fewer routines. Similarly, in some implementations illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures and/or by having multiple data structures consolidated into a single data structure. Similarly, in some implementations illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited by those claims. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A computer-implemented method comprising:
    obtaining, by a computing device, a first panorama image captured in a first area of a room of a building by an image acquisition device and a second panorama image captured in a second area of the room by the image acquisition device, wherein each of the first and second panorama images is in a spherical format and includes 360 degrees of horizontal visual coverage around a vertical axis, and wherein the first and second panorama images each individually has visual coverage of a subset of walls and a floor and a ceiling of the room and together have visual coverage of all of the walls and the floor and the ceiling;
    generating, by the computing device, and from the first panorama image by using first acquisition pose information for the image acquisition device during capturing of the first panorama image, multiple first rectilinear images that are in a perspective format and that each includes visual coverage of a subset of the first panorama image, wherein the multiple first rectilinear images include a first ceiling image that includes visual coverage of a ceiling of the room and further include a first floor image that includes visual coverage of a floor of the room;
    adjusting, by the computing device, and during multiple iterations until the visual coverages of the first and second panorama images are aligned, estimated second acquisition pose information for the image acquisition device during capturing of the second panorama image, including, for each of the multiple iterations:
        generating, by the computing device, and from the second panorama image by using current values for the estimated second acquisition pose information, multiple second rectilinear images for a current iteration of the multiple iterations that are in a perspective format and that each includes visual coverage of a subset of the second panorama image, wherein the multiple second rectilinear images include a second ceiling image that includes visual coverage of the ceiling of the room and further include a second floor image that includes visual coverage of the floor of the room;
        determining, by the computing device, and using at least one trained convolutional neural network, differences between first and second positions of structural features identified in the room, wherein the first positions are identified from analysis of the first rectilinear images and the first panorama image, and wherein the second positions are identified from analysis of the second rectilinear images for the current iteration and the second panorama image; and
        determining, by the computing device, that the visual coverages of the first and second panorama images are aligned if the determined differences are below a defined threshold, and otherwise updating the current values for the estimated second acquisition pose information for the second panorama image based on the determined differences and initiating a next of the multiple iterations;
    generating, by the computing device, an estimated three-dimensional ("3D") room shape of the room based on a combination of the aligned visual coverages of the first and second panorama images, including using the first positions from the one or more first non-panorama images and the first panorama image, and further using the second positions from the one or more second non-panorama images for a last iteration of the multiple iterations and from the second panorama image, and wherein the estimated 3D room shape is a fully closed shape with connected planar surfaces for the walls and the floor and the ceiling of the room; and
    displaying, by the computing device, at least a partial floor plan for the building that includes the generated estimated 3D room shape of the room.

2. The computer-implemented method of claim 1 wherein the image acquisition device has one or more inertial measurement unit (IMU) sensors that capture motion data, and wherein the method further comprises:
    determining, by the computing device, the first acquisition pose information based at least in part on first motion data captured by the one or more IMU sensors during the capturing of the first panorama image and on visual data of the first panorama image; and
    determining, by the computing device, initial values of the estimated second acquisition pose information based at least in part on second motion data captured by the one or more IMU sensors during the capturing of the second panorama image and on visual data of the second panorama image, and wherein the current values of the estimated second acquisition pose information for a first iteration of the multiple iterations are the determined initial values of the estimated second acquisition pose information.

3. The computer-implemented method of claim 1 wherein, for each of the multiple iterations, the determining of the differences between the first and second positions of the structural features identified in the room for that iteration includes determining changes in location and rotation of the current values for the estimated second acquisition pose information for that iteration relative to the first acquisition pose information, and the updating of the current values for the estimated second acquisition pose information for that iteration includes updating those current values based on the determined changes in location and rotation for that iteration to cause centers of the second ceiling image and the second floor image generated in a next iteration to be shifted to correspond to the determined changes in location and rotation for that iteration.

4. The computer-implemented method of claim 1 wherein, for each of the multiple iterations, the determining of the differences between the first and second positions of the structural features identified in the room for that iteration includes determining differences in alignment of the floor and ceiling of the room for that iteration, and the updating of the current values for the estimated second acquisition pose information for that iteration includes determining new current values for the estimated second acquisition pose information to cause the second ceiling image and the second floor image generated in a next iteration to be shifted to reduce the differences in the alignment of the floor and ceiling.

5. A computer-implemented method comprising:

obtaining, by a computing device, first and second panorama images captured in respective first and second areas of a room of a building, wherein each of the first and second panorama images is in an equirectangular format and has visual coverage of at least some walls and floor and ceiling of the room;

generating, by the computing device, and from the first panorama image by using first acquisition pose information for capturing of the first panorama image, one or more first non-panorama images that are in a rectilinear format and that each includes visual coverage of a subset of the first panorama image;

adjusting, by the computing device, and during multiple iterations until the visual coverages of the first and second panorama images are aligned, estimated second acquisition pose information for capturing of the second panorama image, including, for each of the multiple iterations:

generating, by the computing device, and from the second panorama image by using current values for the estimated second acquisition pose information, one or more second non-panorama images for a current iteration of the multiple iterations that are in a rectilinear format and that each includes visual coverage of a subset of the second panorama image;

determining, by the computing device, and using one or more trained neural networks, differences between first and second positions of structural features identified in the room, wherein the first positions are identified from analysis of the one or more first non-panorama images and the first panorama image, and wherein the second positions are identified from analysis of the one or more second non-panorama images for the current iteration and the second panorama image; and determining, by the computing device, that the visual coverages of the first and second panorama images are aligned if the determined differences satisfy one or more defined criteria, and otherwise updating the current values for the estimated second acquisition pose information for the second panorama image based on the determined differences and initiating a next of the multiple iterations;

generating, by the computing device, an estimated room shape of the room based on a combination of the aligned visual coverages of the first and second panorama images, including using the first positions from the one or more first non-panorama images and the first panorama image, and further using the second positions from the one or more second non-panorama images for a last iteration of the multiple iterations and from the second panorama image, and wherein the estimated room shape is a fully closed shape with connected planar surfaces for at least the walls of the room; and displaying, by the computing device, the estimated room shape of the room.

6. The computer-implemented method of claim 5 wherein the first and second panorama images include visual coverage of at least some of a floor of the room and of a ceiling of the room, wherein the one or more second non-panorama images generated for each of the multiple iterations include visual coverage of the at least some of the floor and the ceiling, and wherein the method further comprises, for each of the multiple iterations:

identifying features in the room based in part on the one or more second non-panorama images generated for that iteration and that correspond to one or more of the walls or the floor or the ceiling of the room, and wherein the determining of the differences between the first and second positions of the features identified in the room for that iteration includes determining changes in location and rotation of the current values for the estimated second acquisition pose information for that iteration relative to the first acquisition pose information, and wherein the updating of the current values for the estimated second acquisition pose information for that iteration includes updating those current values based on the determined changes in location and rotation for that iteration to cause centers of the one or more second non-panorama images generated in a next iteration to be shifted to correspond to the determined changes in location and rotation for that iteration.

7. The computer-implemented method of claim 5 wherein the first and second panorama images include visual coverage of at least some of a floor of the room and of a ceiling of the room, wherein the one or more second non-panorama images generated for each of the multiple iterations include visual coverage of the at least some of the floor and the ceiling, and wherein the method further comprises, for each of the multiple iterations:

identifying features in the room based in part on the one or more second non-panorama images generated for that iteration, and wherein the determining of the differences between the first and second positions of the features identified in the room for that iteration includes determining differences in alignment of the floor and ceiling of the room for that iteration, and wherein the updating of the current values for the estimated second acquisition pose information for that iteration includes determining new current values for the estimated second acquisition pose information to cause the one or more second non-panorama images generated in a next iteration to include visual coverage of the at least some of the floor and the ceiling that is shifted to reduce the differences in the alignment of the floor and ceiling.

8. The computer-implemented method of claim 5 wherein the first and second panorama images each includes 360 degrees of horizontal visual coverage around a vertical axis, wherein the adjusting of the estimated second acquisition pose information and the generating of the estimated room shape are performed without using any depth information from any depth-sensing sensors for distances to surrounding surfaces from the first and second areas of the room, wherein the generating of the one or more first non-panorama images includes using the first acquisition pose information to generate a first projected ceiling image that includes visual coverage of a ceiling of the room and to generate a first projected floor image that includes visual coverage of a floor of the room, wherein the generating of the one or more second non-panorama images for each of the multiple iterations includes using the current values for the estimated second acquisition pose information for that iteration to generate a second projected ceiling image that includes visual coverage of a ceiling of the room and to generate a second projected floor image that includes visual coverage of a floor of the room, and wherein the method further comprises:

determining, by the computing device and for each of the multiple iterations, that the determined differences for that iteration satisfy the one or more defined criteria if those determined differences are below a defined threshold;

generating, by the computing device, a first three-dimensional (3D) estimated room shape of the room from visual data of the first panorama image;

generating, by the computing device, a second 3D estimated room shape of the room that is generated from visual data of the second panorama image; and combining, by the computing device and using the aligned visual coverages of the first and second panorama images, the first and second 3D estimated room shapes to produce the generated estimated room shape of the room, wherein the generated estimated room shape of the room is a 3D shape.

9. A non-transitory computer-readable medium having stored contents that cause a computing system to perform automated operations including at least:

obtaining, by the computing system, first and second panorama images captured in respective first and second areas of a room, wherein each of the first and second panorama images is in a spherical format and has visual coverage of at least some walls of the room;

generating, by the computing system, and from the first panorama image by using first acquisition pose information for capturing of the first panorama image, one or more first non-panorama images that each is in a perspective format and includes visual coverage of a subset of the first panorama image;

adjusting, by the computing system, and during multiple iterations until the visual coverages of the first and second panorama images are aligned, estimated second acquisition pose information for capturing of the second panorama image, including, for each of the multiple iterations:

generating, by the computing system, and from the second panorama image by using current values for the estimated second acquisition pose information, one or more second non-panorama images for a current iteration of the multiple iterations that each is in a perspective format and includes visual coverage of a subset of the second panorama image;

determining, by the computing system, differences between first and second positions of features identified in the room, wherein the first positions are identified from visual data of the one or more first non-panorama images and the first panorama image, and wherein the second positions are identified from visual data of the one or more second non-panorama images for the current iteration and the second panorama image; and determining, by the computing system, that the visual coverages of the first and second panorama images are aligned if the determined differences for the current iteration satisfy one or more defined criteria, and otherwise updating the current values for the estimated second acquisition pose information for the second panorama image based on the determined differences and initiating a next of the multiple iterations;

generating, by the computing system, an estimated room shape of the room based on a combination of the aligned visual coverages of the first and second panorama images, including using the first positions from the one or more first non-panorama images and the first panorama image, and further using the second positions from the one or more second non-panorama images for a last iteration of the multiple iterations and from the second panorama image; and providing, by the computing system, information about the room that includes the generated estimated room shape of the room, to enable display of the provided information.

10. The non-transitory computer-readable medium of claim 9 wherein the features identified in the room for the multiple iterations include structural elements that are part of at least one of a wall or a floor or a ceiling of the room, wherein the determining of the differences between the first and second positions of the features identified in the room for each of at least one iteration of the multiple iterations includes using one or more trained neural networks to analyze information about structural elements identified from visual data of the one or more second non-panorama images for that iteration and of the one or more first non-panorama images and of the first panorama image and of the second panorama image, and wherein the providing of the information about the room includes transmitting, by the computing system and to one or more client devices over one or more networks, the generated estimated room shape of the room to cause display of the generated estimated room shape of the room on the one or more client devices.

11. The non-transitory computer-readable medium of claim 9 wherein the visual coverages of the first and second panorama images include at least some of a ceiling of the room and of a floor of the room, wherein the spherical format of the first and second panorama images is an equirectangular format, wherein the perspective format of the one or more first non-panorama images and of the one or more second non-panorama images for each of the multiple iterations is a rectilinear format, wherein the room is one of multiple rooms of a building, wherein the generating of the estimated shape of the room includes generating a fully closed three-dimensional (3D) room shape that includes and further includes constructing at least a partial floor plan of the building that includes the generated 3D room shape, and wherein the providing of the information about the room includes providing the constructed at least partial floor plan of the building.

12. The non-transitory computer-readable medium of claim 9 wherein the first and second panorama images include visual coverage of at least some of a floor of the room and of a ceiling of the room, wherein the one or more second non-panorama images generated for each of the multiple iterations include visual coverage of the at least some of the floor and the ceiling, wherein the automated operations further include identifying features in the room for each of the multiple iterations based in part on the one or more second non-panorama images generated for that iteration and that correspond to one or more of the walls or the floor or the ceiling of the room, and wherein, for each of the multiple iterations:
the determining of the differences between the first and second positions of the features identified in the room for that iteration includes determining changes in location and rotation of the current values for the estimated second acquisition pose information for that iteration relative to the first acquisition pose information; and
the updating of the current values for the estimated second acquisition pose information for that iteration includes updating those current values based on the determined changes in location and rotation for that iteration to cause centers of the one or more second non-panorama images generated in a next iteration to be shifted to correspond to the determined changes in location and rotation for that iteration.

13. The non-transitory computer-readable medium of claim 9 wherein the first and second panorama images include visual coverage of at least some of a floor of the room and of a ceiling of the room, wherein the one or more second non-panorama images generated for each of the multiple iterations include visual coverage of the at least some of the floor and the ceiling, wherein the automated operations further include identifying features in the room for each of the multiple iterations based in part on the one or more second non-panorama images generated for that iteration, and wherein, for each of the multiple iterations:
the determining of the differences between the first and second positions of the features identified in the room for that iteration includes determining differences in alignment of the floor and ceiling of the room for that iteration; and
the updating of the current values for the estimated second acquisition pose information for that iteration includes determining new current values for the estimated second acquisition pose information to cause the one or more second non-panorama images generated in a next iteration to include visual coverage of the at least some of the floor and the ceiling that is shifted to reduce the differences in the alignment of the floor and ceiling.

14. The non-transitory computer-readable medium of claim 9 wherein the obtaining of the first and second panorama images is performed by an image acquisition device with one or more inertial measurement unit (IMU) sensors and includes using the one or more IMU sensors to capture motion data, and wherein the stored contents include software instructions that, when executed by the computing system, cause the computing system to perform further automated operations including:
determining, by the computing system, the first acquisition pose information based at least in part on first motion data captured by the one or more IMU sensors during the capturing of the first panorama image and on visual data of the first panorama image; and
determining, by the computing system, initial values of the estimated second acquisition pose information based at least in part on second motion data captured by the one or more IMU sensors during the capturing of the second panorama image and on visual data of the second panorama image,
and wherein the current values of the estimated second acquisition pose information for a first iteration of the multiple iterations are the determined initial values of the estimated second acquisition pose information.

15. The non-transitory computer-readable medium of claim 9 wherein the obtaining of the first and second panorama images and the generating of the one or more first non-panorama images and the adjusting of the estimated second acquisition pose information and the generating of the estimated room shape are performed for each of multiple rooms of a building, wherein the generating of the estimated room shape for each of the multiple rooms includes analyzing visual data of first and second panorama images captured in that room to identify one or more locations of one or more wall openings from that room to one or more other rooms, and wherein the automated operations further include generating, by the computing system, at least a partial floor plan based at least in part on fitting together the generated estimated room shapes for the multiple rooms using the identified locations of wall openings for the multiple rooms.

16. The non-transitory computer-readable medium of claim 9
wherein the automated operations further include receiving first information from one or more users to specify at least one of the first acquisition pose information, or of initial values for the estimated second acquisition pose information that are used as the current values for the estimated second acquisition pose information for a first iteration of the multiple iterations; and/or
wherein the determining of the differences between the first and second positions of the features identified in the room for each of at least one of the multiple iterations includes receiving second information from one or more users to specify at least some of the first and second positions of the features identified in the room for that iteration; and/or
wherein the determining of the differences between the first and second positions of the features identified in the room for each of at least one of the multiple iterations includes receiving third information from one or more users to specify at least some of the differences between the first and second positions of the features identified in the room for that iteration; and/or
wherein the updating of the current values for the estimated second acquisition pose information for each of at least one of the multiple iterations includes receiving fourth information from one or more users to specify at least some of the current values for the estimated second acquisition pose information that iteration; and/or
wherein the generating of the estimated room shape of the room includes obtaining a first estimated room shape of the room that is generated from visual data of the first panorama image, and further includes obtaining a second estimated room shape of the room that is generated from visual data of the second panorama image, and further includes receiving fifth information from one or more users to specify how to combine at least some of the first and second estimated room shapes to produce the generated estimated room shape of the room.

17. The non-transitory computer-readable medium of claim 16 wherein the automated operations further include using, by the computing system, and to provide constraints during the adjusting of the estimated second acquisition pose information for each of at least one iteration of the multiple iterations, at least one of the received first information or the received second information or the received third information or the received fourth information or the received fifth information.

18. The non-transitory computer-readable medium of claim 9 wherein the generating of the one or more first non-panorama images includes using the first acquisition pose information to generate first projected ceiling visual data that includes visual coverage of a ceiling of the room and to generate first projected floor visual data that includes visual coverage of a floor of the room, and further includes using a first height of an image acquisition device above the floor of the room during capturing of the first panorama image to adjust at least a size of at least one of the ceiling or the floor in the generated first projected ceiling and floor visual data to match each other, and wherein the generating of the one or more second non-panorama images for each of the multiple iterations includes using the current values for the estimated second acquisition pose information for that iteration to generate second projected ceiling visual data that includes visual coverage of the ceiling of the room and to generate second projected floor visual data that includes visual coverage of the floor of the room, and further includes using a second height of an image acquisition device above the floor of the room during capturing of the second panorama image to adjust at least a size of at least one of the ceiling or the floor in the generated second projected ceiling and floor visual data to match each other.

19. The non-transitory computer-readable medium of claim 9 wherein the automated operations further include:
determining, by the computing system and for each of the multiple iterations, that the determined differences for that iteration satisfy the one or more defined criteria if those determined differences are below a defined threshold;
generating, by the computing system, a first estimated room shape of the room from visual data of the first panorama image;
generating, by the computing system, a second estimated room shape of the room that is generated from visual data of the second panorama image; and
combining, by the computing system and using the aligned visual coverages of the first and second panorama images, the first and second estimated room shapes to produce the generated estimated room shape of the room.

20. The non-transitory computer-readable medium of claim 9 wherein the first and second panorama images each includes 360 degrees of horizontal visual coverage around a vertical axis, and wherein the adjusting of the estimated second acquisition pose information and the generating of the estimated room shape are performed without using any depth information from any depth-sensing sensors for distances to surrounding surfaces from the first and second areas of the room.

21. A system comprising:
one or more hardware processors of one or more computing devices; and
one or more memories with stored instructions that, when executed by at least one of the one or more hardware processors, cause at least one of the one or more computing devices to perform automated operations including at least:
obtaining first and second panorama images captured in respective first and second areas of a room, wherein each of the first and second panorama images is in a spherical format and has visual coverage of at least some walls of the room;
generating, from the first panorama image by using first acquisition pose information for capturing of the first panorama image, one or more first non-panorama images that each is in a perspective format and includes visual coverage of a subset of the first panorama image;
adjusting, during one or more iterations until the visual coverages of the first and second panorama images are aligned, estimated second acquisition pose information for capturing of the second panorama image, including, for each of the one or more iterations:
generating, from the second panorama image by using current values for the estimated second acquisition pose information, one or more second non-panorama images for a current iteration of the one or more iterations that each is in a perspective format and includes visual coverage of a subset of the second panorama image;
determining, using one or more trained neural networks, differences between first and second positions of features identified in the room, wherein the first positions are identified from visual data of the one or more first non-panorama images and the first panorama image, and wherein the second positions are identified from visual data of the one or more second non-panorama images for the current iteration and the second panorama image; and
determining that the visual coverages of the first and second panorama images are aligned if the determined differences satisfy one or more defined criteria, and otherwise updating the current values for the estimated second acquisition pose information for the second panorama image based on the determined differences and initiating a next iteration;
generating one or more estimated shapes of one or more structural elements that are part of at least one of the walls of the room based on a combination of the aligned visual coverages of the first and second panorama images, including using the first positions from the one or more first non-panorama images and the first panorama image, and further using the second positions from the one or more second non-panorama images for a last iteration of the one or more iterations and from the second panorama image; and
providing information about the room that includes the generated estimated room shape of the room.

22. The system of claim 21 wherein the one or more iterations include multiple iterations, wherein the features identified in the room for the multiple iterations include multiple structural elements that are part of at least one of a wall or a floor or a ceiling of the room, wherein the determining of the differences between the first and second positions of the features identified in the room for each of at least one iteration of the multiple iterations includes analyzing information about at least some of the multiple structural elements identified from visual data of the one or more second non-panorama images for that iteration and of the one or more first non-panorama images and of the first panorama image and of the second panorama image, and wherein the providing of the information about the room includes transmitting, to one or more client devices over one or more networks, the generated one or more estimated shapes to cause display of the generated one or more estimated shapes on the one or more client devices.

23. The system of claim 22 wherein the stored instructions include software instructions that further cause the at least one computing device to generate an estimated room shape of the room based on a combination of the aligned visual coverages of the first and second panorama images, including using the first positions from the one or more first non-panorama images and the first panorama image, and further using the second positions from the one or more second non-panorama images for a last iteration of the one or more iterations and from the second panorama image, and wherein the transmitting of the generated one or more estimated shapes further includes transmitting the generated estimated room shape of the room to cause display, on the one or more client devices, of the generated one or more estimated shapes on a display of the generated estimated room shape of the room.

24. The system of claim 23 wherein the visual coverages of the first and second panorama images include at least some of a ceiling of the room and of a floor of the room, wherein the spherical format of the first and second panorama images is an equirectangular format, wherein the perspective format of the one or more first non-panorama images and of the one or more second non-panorama images for each of the one or more iterations is a rectilinear format, wherein the room is one of multiple rooms of a building, wherein the generating of the estimated shape of the room includes generating a fully closed three-dimensional (3D) room shape that includes connected planar surfaces for the walls and the floor and the ceiling of the room and further includes constructing at least a partial floor plan of the building that includes the generated 3D room shape, and wherein the providing of the information about the room includes providing the constructed at least partial floor plan of the building.

25. The system of claim 21 wherein the one or more iterations include multiple iterations, wherein the first and second panorama images include visual coverage of at least some of a floor of the room and of a ceiling of the room, wherein the one or more second non-panorama images generated for each of the multiple iterations include visual coverage of the at least some of the floor and the ceiling, wherein the automated operations further include identifying features in the room for each of the multiple iterations based in part on the one or more second non-panorama images generated for that iteration and that correspond to one or more of the walls or the floor or the ceiling of the room, and wherein, for each of the multiple iterations:
  the determining of the differences between the first and second positions of the features identified in the room for that iteration includes determining changes in location and rotation of the current values for the estimated second acquisition pose information for that iteration relative to the first acquisition pose information; and
  the updating of the current values for the estimated second acquisition pose information for that iteration includes updating those current values based on the determined changes in location and rotation for that iteration to cause centers of the one or more second non-panorama images generated in a next iteration to be shifted to correspond to the determined changes in location and rotation for that iteration.

26. The system of claim 21 wherein the one or more iterations include multiple iterations, wherein the first and second panorama images include visual coverage of at least some of a floor of the room and of a ceiling of the room, wherein the one or more second non-panorama images generated for each of the multiple iterations include visual coverage of the at least some of the floor and the ceiling, wherein the automated operations further include identifying features in the room for each of the multiple iterations based in part on the one or more second non-panorama images generated for that iteration, and wherein, for each of the multiple iterations:
  the determining of the differences between the first and second positions of the features identified in the room for that iteration includes determining differences in alignment of the floor and ceiling of the room for that iteration; and
  the updating of the current values for the estimated second acquisition pose information for that iteration includes determining new current values for the estimated second acquisition pose information to cause the one or more second non-panorama images generated in a next iteration to include visual coverage of the at least some of the floor and the ceiling that is shifted to reduce the differences in the alignment of the floor and ceiling.

27. The system of claim 21 wherein the generating of the one or more estimated shapes of the one or more structural elements in the walls of the room includes at least one of generating an estimated door shape of a door in at least one of the walls of the room, or generating an estimated window shape of a window in at least one of the walls of the room, or generating an estimated opening shape of a non-door and non-window opening in at least one of the walls of the room.

28. The system of claim 21 wherein the generating of the one or more estimated shapes of the one or more structural elements in the walls of the room includes estimating a location of each of the one or more estimated shapes of the one or more structural elements within an estimated shape of the room.

* * * * *